US012529088B2

(12) United States Patent
Gasser et al.

(10) Patent No.: US 12,529,088 B2
(45) Date of Patent: Jan. 20, 2026

(54) HELPER FACTORS FOR EXPRESSING PROTEINS IN YEAST

(71) Applicant: LONZA LTD, Visp (CH)

(72) Inventors: Brigitte Gasser, Vienna (AT); Rebecca Göngrich, Graz (AT); Diethard Mattanovich, Vienna (AT); Christoph Kiziak, Visp (CH)

(73) Assignee: LONZA LTD, Visp (CH)

( * ) Notice: Subject to any disclaimer, the term of this patent is extended or adjusted under 35 U.S.C. 154(b) by 665 days.

(21) Appl. No.: 17/915,875

(22) PCT Filed: Apr. 1, 2021

(86) PCT No.: PCT/EP2021/058644
§ 371 (c)(1),
(2) Date: Sep. 29, 2022

(87) PCT Pub. No.: WO2021/198431
PCT Pub. Date: Oct. 7, 2021

(65) Prior Publication Data

US 2023/0126246 A1 Apr. 27, 2023

(30) Foreign Application Priority Data

Apr. 1, 2020 (EP) .................................... 20167590

(51) Int. Cl.
*C12P 21/00* (2006.01)
*C12N 15/81* (2006.01)

(52) U.S. Cl.
CPC ............ *C12P 21/00* (2013.01); *C12N 15/815* (2013.01)

(58) Field of Classification Search
CPC .................................................... C12N 15/815
See application file for complete search history.

(56) References Cited

U.S. PATENT DOCUMENTS

| | | | |
|---|---|---|---|
| 6,153,424 | A | 11/2000 | Raymond et al. |

FOREIGN PATENT DOCUMENTS

| | | | |
|---|---|---|---|
| EP | 2210940 | B1 | 7/2010 |
| EP | 3196304 | A1 | 7/2017 |
| WO | 1992017595 | A1 | 10/1992 |
| WO | 2006136831 | A2 | 12/2006 |
| WO | 2008128701 | A2 | 10/2008 |
| WO | 2009105357 | A1 | 8/2009 |
| WO | 2010099195 | A1 | 9/2010 |
| WO | 2012152823 | A1 | 11/2012 |
| WO | 2013050551 | A1 | 4/2013 |
| WO | 2014011723 | A1 | 1/2014 |
| WO | 2014067926 | A1 | 5/2014 |
| WO | 2014093950 | A1 | 6/2014 |
| WO | 2014139608 | A1 | 9/2014 |
| WO | 2015158800 | A1 | 10/2015 |
| WO | 2017021541 | A1 | 2/2017 |
| WO | 2020002494 | A1 | 1/2020 |

OTHER PUBLICATIONS

Bai et al., "A gene optimization strategy that enhances production of fully functional P-glycoprotein in Pichia pastoris," PLOS One, 6(8):e22577 (2011).
Delic et al., "Monitoring intracellular redox conditions in the endoplasmic reticulum of living yeasts," FEMS Microbiology Letters, 306(1):61-66 (2010).
Delic et al., "Engineering of protein folding and secretion-strategies to overcome bottlenecks for efficient production of recombinant proteins," Antioxidants & Redox Signaling, 21(3):414-437 (2014).
De Ruijter et al., "Enhancing antibody folding and secretion by tailoring the *Saccharomyces cerevisiae* endoplasmic reticulum," Microbial Cell Factories, 15:87 (2016).
Freeman et al., "Analysis of molecular chaperone activities using in vitro and in vivo approaches," Methods in Molecular Biology, 99:393-419 (2000).
Gasser et al., "Pichia pastoris: protein production host and model organism for biomedical research," Future Microbiology, 8(2):191-208 (2013).
Gasser et al., "Methanol regulated yeast promoters: production vehicles and toolbox for synthetic biology," Microbial Cell Factories, 14:196 (2015).
Heiss et al., "Multistep processing of the secretion leader of the extracellular protein Epx1 in Pichia pastoris and implications for protein localization," Microbiology, 161(7):1356-1368 (2015).
Koskela et al., "Following nature's roadmap: folding factors from plasma cells led to improvements in antibody secretion in *S. cerevisiae*," Biotechnology Journal, 12(8):1600631 (2017).
Mattanovich et al., "Recombinant protein production in yeasts," Methods in Molecular Biology, 824:329-358 (2012).
Payne et al., "Modulation of chaperone gene expression in mutagenized *Saccharomyces cerevisiae* strains developed for recombinant human albumin production results in increased production of multiple heterologous proteins," Applied and Environmental Microbiology, 74(24):7759-7766 (2008).
Prielhofer et al., "GoldenPICS: a Golden Gate-derived modular cloning system for applied synthetic biology in the yeast Pichia pastoris," BMC Systems Biology, 11(1):123 (2017).

(Continued)

*Primary Examiner* — Suzanne M Noakes
(74) *Attorney, Agent, or Firm* — MEDLER FERRO WOODHOUSE & MILLS PLLC

(57) ABSTRACT

A method for producing of a protein of interest (POI) in a yeast host cell that is modified to comprise within one or more expression cassettes heterologous nucleic acid molecules encoding helper factors and a gene of interest (GOI) encoding the POI, wherein: a) a first helper factor comprises at least 90% sequence identity to SEQ ID NO:1; b) a second helper factor comprises at east 90% sequence identity to SEQ ID NO:3; and c) a third helper factor comprises at least 90% sequence identity to SEQ ID NO:5; which method comprises (i) culturing said host cell in a culture medium under conditions to co-express said heterologous nucleic acid molecules and to secrete said POI into the host cell culture; and (ii) recovering the POI from the host cell culture.

22 Claims, 16 Drawing Sheets

Specification includes a Sequence Listing.

(56) References Cited

OTHER PUBLICATIONS

Shusta et al., "Increasing the secretory capacity of *Saccharomyces cerevisiae* for production of single-chain antibody fragments," Nature Biotechnology, 16(8):773-777 (1998).
Stadlmayr et al., "Identification and characterisation of novel Pichia pastoris promoters for heterologous protein production," Journal of Biotechnology, 150(4):519-529 (2010).

SEQ ID NO:1: human BiP

EEEDKKEDVGTVVGIDLGTTYSCVGVFKNGRVEIIANDQGNRITPSYVAFTPEGERLIGDAAKNQLTSNPENTVFD
AKRLIGRTWNDPSVQQDIKFLPFKVVEKKTKPYIQVDIGGGQTKTFAPEEISAMVLTKMKETAEAYLGKKVTHAVV
TVPAYFNDAQRQATKDAGTIAGLNVMRIINEPTAAAIAYGLDKREGEKNILVFDLGGGTFDVSLLTIDNGVFEVVA
TNGDTHLGGEDFDQRVMEHFIKLYKKKTGKDVRKDNRAVQKLRREVEKAKRALSSQHQARIEIESFYEGEDFSETL
TRAKFEELNMDLFRSTMKPVQKVLEDSDLKKSDIDEIVLVGGSTRIPKIQQLVKEFFNGKEPSRGINPDEAVAYGA
AVQAGVLSGDQDTGDLVLLDVCPLTLGIETVGGVMTKLIPRNTVVPTKKSQIFSTASDNQPTVTIKVYEGERPLTK
DNHLLGTFDLTGIPPAPRGVPQIEVTFEIDVNGILRVTAEDKGTGNKNKITITNDQNRLTPEEIERMVNDAEKFAE
EDKKLKERIDTRNELESYAYSLKNQIGDKEKLGGKLSSEDKETMEKAVEEKIEWLESHQDADIEDFKAKKKELEEI
VQPIISKLYGSAGPPPTGEEDTAEKDEL

SEQ ID NO:2: human BiP, nucleotide sequence
>NM_005347.5:218-2182 Homo sapiens heat shock protein family A (Hsp70) member 5 (HSPA5), mRNA; the first 54 nts encoding signal sequence are *underlined and in italics*

*ATGAAGCTCTCCCTGGTGGCCGCGATGCTGCTGCTGCTCAGCGCGGCGCGGGCC*GAGGAGGAGGACAAGA
AGGAGGACGTGGGCACGGTGGTCGGCATCGACCTGGGGACCACCTACTCCTGCGTCGGCGTGTTCAAGAA
CGGCCGCGTGGAGATCATCGCCAACGATCAGGGCAACCGCATCACGCCGTCCTATGTCGCCTTCACTCCT
GAAGGGGAACGTCTGATTGGCGATGCCGCCAAGAACCAGCTCACCTCCAACCCCGAGAACACGGTCTTTG
ACGCCAAGCGGCTCATCGGCCGCACGTGGAATGACCCGTCTGTGCAGCAGGACATCAAGTTCTTGCCGTT
CAAGGTGGTTGAAAAGAAAACTAAACCATACATTCAAGTTGATATTGGAGGTGGGCAAACAAAGACATTT
GCTCCTGAAGAAATTTCTGCCATGGTTCTCACTAAAATGAAAGAAACCGCTGAGGCTTATTTGGGAAAGA
AGGTTACCCATGCAGTTGTTACTGTACCAGCCTATTTTAATGATGCCCAACGCCAAGCAACCAAAGACGC
TGGAACTATTGCTGGCCTAAATGTTATGAGGATCATCAACGAGCCTACGGCAGCTGCTATTGCTTATGGC
CTGGATAAGAGGGAGGGGGAGAAGAACATCCTGGTGTTTGACCTGGGTGGCGGAACCTTCGATGTGTCTC
TTCTCACCATTGACAATGGTGTCTTCGAAGTTGTGGCCACTAATGGAGATACTCATCTGGGTGGAGAAGA
CTTTGACCAGCGTGTCATGGAACACTTCATCAAACTGTACAAAAAGAAGACGGGCAAAGATGTCAGGAAA
GACAATAGAGCTGTGCAGAAACTCCGGCGCGAGGTAGAAAAGGCCAAACGGGCCCTGTCTTCTCAGCATC
AAGCAAGAATTGAAATTGAGTCCTTCTATGAAGGAGAAGACTTTTCTGAGACCCTGACTCGGGCCAAATT
TGAAGAGCTCAACATGGATCTGTTCCGGTCTACTATGAAGCCCGTCCAGAAAGTGTTGGAAGATTCTGAT
TTGAAGAAGTCTGATATTGATGAAATTGTTCTTGTTGGTGGCTCGACTCGAATTCCAAAGATTCAGCAAC
TGGTTAAAGAGTTCTTCAATGGCAAGGAACCATCCCGTGGCATAAACCCAGATGAAGCTGTAGCGTATGG
TGCTGCTGTCCAGGCTGGTGTGCTCTCTGGTGATCAAGATACAGGTGACCTGGTACTGCTTGATGTATGT
CCCCTTACACTTGGTATTGAAACTGTGGGAGGTGTCATGACCAAACTGATTCCAAGGAACACAGTGGTGC
CTACCAAGAAGTCTCAGATCTTTTCTACAGCTTCTGATAATCAACCAACTGTTACAATCAAGGTCTATGA
AGGTGAAAGACCCCTGACAAAAGACAATCATCTTCTGGGTACATTTGATCTGACTGGAATTCCTCCTGCT
CCTCGTGGGGTCCCACAGATTGAAGTCACCTTTGAGATAGATGTGAATGGTATTCTTCGAGTGACAGCTG
AAGACAAGGGTACAGGGAACAAAAATAAGATCACAATCACCAATGACCAGAATCGCCTGACACCTGAAGA
AATCGAAAGGATGGTTAATGATGCTGAGAAGTTTGCTGAGGAAGACAAAAAGCTCAAGGAGCGCATTGAT
ACTAGAAATGAGTTGGAAAGCTATGCCTATTCTCTAAAGAATCAGATTGGAGATAAAGAAAAGCTGGGAG
GTAAACTTTCCTCTGAAGATAAGGAGACCATGGAAAAAGCTGTAGAAGAAAAGATTGAATGGCTGGAAAG
CCACCAAGATGCTGACATTGAAGACTTCAAAGCTAAGAAGAAGGAACTGGAAGAAATTGTTCAACCAATT
ATCAGCAAACTCTATGGAAGTGCAGGCCCTCCCCCAACTGGTGAAGAGGATACAGCAGAAAAAGATGAGT
TGTAG

SEQ ID NO:3: human GRP170

LAVMSVDLGSESMKVAIVKPGVPMEIVLNKESRRKTPVIVTLKENERFFGDSAASMAIKN
PKATLRYFQHLLGKQADNPHVALYQARFPEHELTFDPQRQTVHFQISSQLQFSPEEVLGM
VLNYSRSLAEDFAEQPIKDAVITVPVFFNQAERRAVLQAARMAGLKVLQLINDNTATALS
YGVFRRKDINTTAQNIMFYDMGSGSTVCTIVTYQMVKTKEAGMQPQLQIRGVGFDRTLGG
LEMELRLRERLAGLFNEQRKGQRAKDVRENPRAMAKLLREANRLKTVLSANADHMAQIEG
LMDDVDFKAKVTRVEFEELCADLFERVPGPVQQALQSAEMSLDEIEQVILVGGATRVPRV
QEVLLKAVGKEELGKNINADEAAAMGAVYQAAALSKAFKVKPFVVRDAVVYPILVEFTRE
VEEEPGIHSLKHNKRVLFSRMGPYPQRKVITFNRYSHDFNFHINYGDLGFLGPEDLRVFG
SQNLTTVKLKGVGDSFKKYPDYESKGIKAHFNLDESGVLSLDRVESVFETLVEDSAEEES
TLTKLGNTISSLFGGGTTPDAKENGTDTVQEEEESPAEGSKDEPGEQVELKEEAEAPVED
GSQPPPPEPKGDATPEGEKATEKENGDKSEAQKPSEKAEAGPEGVAPAPEGEKKQKPARK
RRMVEEIGVELVVLDLPDLPEDKLAQSVQKLQDLTLRDLEKQEREKAANSLEAFIFETQD
KLYQPEYQEVSTEEQREEISGKLSAASTWLEDEGVGATTVMLKEKLAELRKLCQGLFFRV
EERKKWPERLSALDNLLNHSSMFLKGARLIPEMDQIFTEVEMTTLEKVINETWAWKNATL
AEQAKLPATEKPVLLSKDIEAKMMALDREVQYLLNKAKFTKPRPRPKDKNGTRAEPPLNA
SASDQGEKVIPPAGQTEDAEPISEPEKVETGSEPGDTEPLELGGPGAEPEQKEQSTGQKR
PLKNDEL

SEQ ID NO:4: human GRP170, nucleotide sequence
>NM_001130991.3:61-3060 Homo sapiens hypoxia up-regulated 1 (HYOU1), transcript variant 2, mRNA; the first 96 nts encoding signal sequence are *underlined and in italics*

*ATGGCAGACAAAGTTAGGAGGCAGAGGCCGAGGAGGCGAGTCTGTTGGGCCTTGGTGGCTGTGCTCTTGG*
*CAGACCTGTTGGCACTGAGTGATACA*CTGGCAGTGATGTCTGTGGACCTGGGCAGTGAGTCCATGAAGGT
GGCCATTGTCAAACCTGGAGTGCCCATGGAAATTGTCTTGAATAAGGAATCTCGGAGGAAAACACCGGTG
ATCGTGACCCTGAAAGAAAATGAAAGATTCTTTGGAGACAGTGCAGCAAGCATGGCGATTAAGAATCCAA
AGGCTACGCTACGTTACTTCCAGCACCTCCTGGGGAAGCAGGCAGATAACCCCCATGTAGCTCTTTACCA
GGCCCGCTTCCCGGAGCACGAGCTGACTTTCGACCCACAGAGGCAGACTGTGCACTTTCAGATCAGCTCG
CAGCTGCAGTTCTCACCTGAGGAAGTGTTGGGCATGGTTCTCAATTATTCTCGTTCTCTAGCTGAAGATT
TTGCAGAGCAGCCCATCAAGGATGCAGTGATCACCGTGCCAGTCTTCTTCAACCAGGCCGAGCGCCGAGC
TGTGCTGCAGGCTGCTCGTATGGCTGGCCTCAAAGTGCTGCAGCTCATCAATGACAACACCGCCACTGCC
CTCAGCTATGGTGTCTTCCGCCGGAAAGATATTAACACCACTGCCCAGAATATCATGTTCTATGACATGG
GCTCAGGCAGCACCGTATGCACCATTGTGACCTACCAGATGGTGAAGACTAAGGAAGCTGGGATGCAGCC
ACAGCTGCAGATCCGGGGAGTAGGATTTGACCGTACCCTGGGGGGCCTGGAGATGGAGCTCCGGCTTCGA
GAACGCCTGGCTGGGCTTTTCAATGAGCAGCGCAAGGGTCAGAGAGCAAAGGATGTGCGGGAGAACCCGC
GTGCCATGGCCAAGCTGCTGCGTGAGGCTAATCGGCTCAAAACCGTCCTCAGTGCCAACGCTGACCACAT
GGCACAGATTGAAGGCCTGATGGATGATGTGGACTTCAAGGCAAAAGTGACTCGTGTGGAATTTGAGGAG
TTGTGTGCAGACTTGTTTGAGCGGGTGCCTGGGCCTGTACAGCAGGCCCTCCAGAGTGCCGAAATGAGTC
TGGATGAGATTGAGCAGGTGATCCTGGTGGGTGGGGCCACTCGGGTCCCCAGAGTTCAGGAGGTGCTGCT
GAAGGCCGTGGGCAAGGAGGAGCTGGGGAAGAACATCAATGCAGATGAAGCAGCCGCCATGGGGGCAGTG
TACCAGGCAGCTGCGCTCAGCAAAGCCTTTAAAGTGAAGCCATTTGTCGTCCGAGATGCAGTGGTCTACC
CCATCCTGGTGGAGTTCACGAGGGAGGTGGAGGAGGAGCCTGGGATTCACAGCCTGAAGCACAATAAACG
GGTACTCTTCTCTCGGATGGGGCCCTACCCTCAACGCAAAGTCATCACCTTTAACCGCTACAGCCATGAT
TTCAACTTCCACATCAACTACGGCGACCTGGGCTTCCTGGGGCCTGAAGATCTTCGGGTATTTGGCTCCC
AGAATCTGACCACAGTGAAGCTAAAAGGGGTGGGTGACAGCTTCAAGAAGTATCCTGACTACGAGTCCAA
GGGCATCAAGGCTCACTTCAACCTGGATGAGAGTGGCGTGCTCAGTCTAGACAGGGTGGAGTCTGTATTT
GAGACACTGGTAGAGGACAGCGCAGAAGAGGAATCTACTCTCACCAAACTTGGCAACACCATTTCCAGCC
TGTTTGGAGGCGGTACCACACCAGATGCCAAGGAGAATGGTACTGATACTGTCCAGGAGGAAGAGGAGAG
CCCTGCAGAGGGGAGCAAGGACGAGCCTGGGGAGCAGGTGGAGCTCAAGGAGGAAGCTGAGGCCCCAGTG
GAGGATGGCTCTCAGCCCCCACCCCCTGAACCTAAGGGAGATGCAACCCCTGAGGGAGAAAAGGCCACAG
AAAAAGAAAATGGGGACAAGTCTGAGGCCCAGAAACCAAGTGAGAAGGCAGAGGCAGGGCCTGAGGGCGT
CGCTCCAGCCCCAGAGGGAGAGAAGAAGCAGAAGCCCGCCAGGAAGCGGCGAATGGTAGAGGAGATCGGG
GTGGAGCTGGTTGTTCTGGACCTGCCTGACTTGCCAGAGGATAAGCTGGCTCAGTCGGTGCAGAAACTTC
AGGACTTGACACTCCGAGACCTGGAGAAGCAGGAACGGGAAAAAGCTGCCAACAGCTTGGAAGCATTCAT
ATTTGAGACCCAGGACAAGCTGTACCAGCCCGAGTACCAGGAAGTGTCCACAGAGGAGCAGCGTGAGGAG
TGAAGGAGAAGCTGGCTGAGCTGAGGAAGCTGTGCCAAGGGCTGTTTTTTCGGGTAGAGGAGCGCAAGAA
GTGGCCCGAACGGCTGTCTGCCCTCGATAATCTCCTCAACCATTCCAGCATGTTCCTCAAGGGGGCCCGG
CTCATCCCAGAGATGGACCAGATCTTCACTGAGGTGGAGATGACAACGTTAGAGAAAGTCATCAATGAGA (Continued)

CCTGGGCCTGGAAGAATGCAACTCTGGCCGAGCAGGCTAAGCTGCCCGCCACAGAGAAGCCTGTGTTGCT
CTCAAAAGACATTGAAGCTAAGATGATGGCCCTGGACCGAGAGGTGCAGTATCTGCTCAATAAGGCCAAG
TTTACCAAGCCCCGGCCCCGGCCTAAGGACAAGAATGGGACCCGGGCAGAGCCACCCCTCAATGCCAGTG
CCAGTGACCAGGGGGAGAAGGTCATCCCTCCAGCAGGCCAGACTGAAGATGCAGAGCCCATTTCAGAACC
TGAGAAAGTAGAGACTGGATCCGAGCCAGGAGACACTGAGCCTTTGGAGTTAGGAGGTCCTGGAGCAGAA
CCTGAACAGAAAGAACAATCGACAGGACAGAAGCGGCCTTTGAAGAACGACGAACTATAA

SEQ ID NO:5: human ERdj3 (358 AA)
>sp|Q9UBS4|DJB11_HUMAN DnaJ homolog subfamily B member 11 OS=Homo sapiens GN=DNAJB11 PE=1 SV=1

GRDFYKILGVPRSASIKDIKKAYRKLALQLHPDRNPDDPQAQEKFQDLGAAYEVLSDSEKRKQYDTYGEEGLKDGH
QSSHGDIFSHFFGDFGFMFGGTPRQQDRNIPRGSDIIVDLEVTLEEVYAGNFVEVVRNKPVARQAPGKRKCNCRQE
MRTTQLGPGRFQMTQEVVCDECPNVKLVNEERTLEVEIEPGVRDGMEYPFIGEGEPHVDGEPGDLRFRIKVVKHPI
FERRGDDLYTNVTISLVESLVGFEMDITHLDGHKVHISRDKITRPGAKLWKKGEGLPNFDNNNIKGSLIITFDVDF
PKEQLTEEAREGIKQLLKQGSVQKVYNGLQGY

SEQ ID NO:6: human ERdj3, nucleotide sequence
>NM_016306.6:179-1255 Homo sapiens DnaJ heat shock protein family (Hsp40) member B11 (DNAJB11), transcript variant 1, mRNA; the first 66 nts encoding signal sequence are *underlined and in italics*

*ATGGCTCCGCAGAACCTGAGCACCTTTTGCCTGTTGCTGCTATACCTCATCGGGGCGGTGATTGCC*GGAC
GAGATTTCTATAAGATCTTGGGGGTGCCTCGAAGTGCCTCTATAAAGGATATTAAAAAGGCCTATAGGAA
ACTAGCCCTGCAGCTTCATCCCGACCGGAACCCTGATGATCCACAAGCCCAGGAGAAATTCCAGGATCTG
GGTGCTGCTTATGAGGTTCTGTCAGATAGTGAGAAACGGAAACAGTACGATACTTATGGTGAAGAAGGAT
TAAAAGATGGTCATCAGAGCTCCCATGGAGACATTTTTTCACACTTCTTTGGGGATTTTGGTTTCATGTT
TGGAGGAACCCCTCGTCAGCAAGACAGAAATATTCCAAGAGGAAGTGATATTATTGTAGATCTAGAAGTC
ACTTTGGAAGAAGTATATGCAGGAAATTTTGTGGAAGTAGTTAGAAACAAACCTGTGGCAAGGCAGGCTC
CTGGCAAACGGAAGTGCAATTGTCGGCAAGAGATGCGGACCACCCAGCTGGGCCCTGGGCGCTTCCAAAT
GACCCAGGAGGTGGTCTGCGACGAATGCCCTAATGTCAAACTAGTGAATGAAGAACGAACGCTGGAAGTA
GAAATAGAGCCTGGGGTGAGAGACGGCATGGAGTACCCCTTTATTGGAGAAGGTGAGCCTCACGTGGATG
GGGAGCCTGGAGATTTACGGTTCCGAATCAAAGTTGTCAAGCACCCAATATTTGAAAGGAGAGGAGATGA
TTTGTACACAAATGTGACAATCTCATTAGTTGAGTCACTGGTTGGCTTTGAGATGGATATTACTCACTTG
GATGGTCACAAGGTACATATTTCCCGGGATAAGATCACCAGGCCAGGAGCGAAGCTATGGAAGAAAGGGG
AAGGGCTCCCCAACTTTGACAACAACAATATCAAGGGCTCTTTGATAATCACTTTTGATGTGGATTTTCC
AAAAGAACAGTTAACAGAGGAAGCGAGAGAAGGTATCAAACAGCTACTGAAACAAGGGTCAGTGCAGAAG
GTATACAATGGACTGCAAGGATATTGA (Continued)

SEQ ID NO:7 Codon optimized nucleotide sequence of human BiP as used in Examples; the first 54 nts encoding signal sequence are *underlined and in italics*

*ATGAAGTTGTCCTTGGTCGCTGCTATGCTGTTGTTGTTGTCTGCTGCTAGAGCT*GAGGAAGAGGACAAGAAAGAGG
ACGTTGGTACTGTTGTTGGTATCGACTTGGGTACTACCTACTCCTGTGTCGGTGTTTTCAAGAACGGTAGAGTCGA
GATTATCGCTAACGACCAAGGTAACAGAATCACCCCATCCTACGTTGCTTTCACTCCAGAGGGTGAGAGATTGATT
GGTGACGCTGCTAAGAACCAATTGACCTCCAACCCAGAGAACACCGTTTTCGACGCTAAGAGATTGATCGGTAGAA
CCTGGAACGACCCATCCGTTCAACAAGACATCAAGTTCTTGCCATTCAAGGTCGTCGAGAAGAAGACCAAGCCTTA
CATCCAAGTTGACATCGGTGGTGGTCAAACTAAGACCTTCGCTCCTGAAGAGATCTCCGCTATGGTTTTGACCAAG
ATGAAAGAAACCGCTGAGGCTTACTTGGGTAAGAAGGTTACTCACGCTGTTGTTACCGTCCCAGCTTACTTCAACG
ACGCTCAAAGACAAGCTACTAAGGACGCTGGTACTATCGCTGGTTTGAACGTCATGAGAATCATCAACGAGCCAAC
CGCTGCTGCTATTGCTTACGGTTTGGACAAAAGAGAAGGAGAGAAGAACATCTTGGTTTTCGACTTGGGTGGTGGT
ACTTTCGACGTTTCCTTGTTGACTATCGACAACGGTGTTTTCGAGGTCGTTGCTACCAACGGTGATACTCACTTGG
GTGGTGAGGACTTCGACCAAAGAGTTATGGAACACTTCATCAAGTTGTACAAGAAGAAGACTGGTAAGGACGTCAG
AAAGGACAACAGAGCTGTCCAAAAGTTGAGAAGAGAGGTCGAGAAGGCTAAGAGAGCTTTGTCCTCTCAACACCAA
GCTAGAATCGAGATCGAGTCCTTCTACGAGGGTGAGGATTTCTCTGAGACTTTGACCAGAGCTAAGTTCGAGGAAT
TGAACATGGACTTGTTCAGATCCACCATGAAGCCAGTCCAAAAGGTTTTGGAGGACTCCGACTTGAAGAAGTCTGA
CATCGACGAGATCGTTTTGGTTGGTGGTTCTACCAGAATCCCAAAGATCCAACAATTGGTCAAAGAATTCTTCAAC
GGTAAAGAACCATCCAGAGGTATCAACCCAGACGAGGCTGTTGCTTACGGTGCTGCTGTTCAAGCTGGTGTTTTGT
CTGGTGACCAAGACACTGGTGACTTGGTTTTGTTGGACGTCTGTCCATTGACCTTGGGTATCGAGACTGTTGGTGG
TGTCATGACCAAGTTGATCCCAAGAAACACCGTCGTCCCAACTAAGAAGTCCCAAATCTTCTCTACCGCTTCCGAC
AACCAACCTACCGTTACCATTAAGGTTTACGAGGGTGAAAGACCATTGACTAAGGACAACCACTTGTTGGGTACTT
TCGATTTGACTGGTATCCCACCAGCTCCAAGAGGTGTTCCACAAATCGAGGTTACTTTCGAGATCGACGTCAACGG
TATCTTGAGAGTTACTGCTGAGGACAAGGGTACTGGTAACAAGAACAAGATCACCATCACCAACGACCAAAACAGA
TTGACCCCTGAAGAGATTGAGAGAATGGTCAACGACGCTGAGAAGTTCGCTGAGGAAGATAAGAAGTTGAAAGAAA
GAATCGACACCAGAAACGAGTTGGAGTCCTACGCTTACTCCTTGAAGAACCAAATCGGTGACAAAGAAAAGTTGGG
AGGTAAGTTGTCCTCCGAGGATAAAGAAACCATGGAAAAGGCTGTCGAAGAGAAGATCGAGTGGTTGGAGTCTCAC
CAAGACGCTGACATTGAGGACTTCAAGGCTAAGAAGAAAGAATTGGAGGAAATCGTCCAACCTATCATCTCCAAGT
TGTACGGTTCTGCTGGTCCACCACCAACTGGTGAAGAAGATACTGCTGAGAAGGACGAGTTGTAATAG (Continued)

SEQ ID NO:8: Codon optimized nucleotide sequence of human Grp170 as used in Examples TTGGCTGTCATGTCTGTTGACTTGGGTTCCGAGTCTATGAAGGTCGCTATCGTTAAGCCAGGTGTCCCAATGGAAA
TCGTCTTGAACAAGGAATCCAGAAGAAAGACCCCAGTCATCGTCACCTTGAAGGAAAACGAGAGATTCTTCGGTGA
CTCCGCTGCTTCTATGGCTATCAAGAACCCAAAGGCTACCTTGAGATACTTCCAACACTTGTTGGGTAAGCAAGCT
GACAACCCACACGTCGCCTTGTACCAAGCTAGATTCCCAGAGCACGAGTTGACTTTCGACCCACAAAGACAAACCG
TCCACTTCCAAATCTCTTCCCAATTGCAATTCTCCCCAGAGGAAGTCTTGGGTATGGTCTTGAACTACTCCAGATC
TTTGGCTGAGGACTTCGCTGAGCAACCTATTAAGGACGCTGTTATCACCGTCCCAGTTTTCTTCAACCAGGCTGAG
AGAAGAGCTGTCTTGCAAGCTGCTAGAATGGCTGGTTTGAAGGTCTTGCAATTGATCAACGACAACACCGCTACCG
CTTTGTCCTACGGTGTTTTCAGAAGAAAGGACATCAACACCACCGCTCAAAACATCATGTTCTACGACATGGGTTC
TGGTTCCACCGTCTGTACTATCGTCACCTACCAAATGGTCAAGACCAAGGAAGCTGGTATGCAACCACAATTGCAA
ATCAGAGGTGTCGGTTTCGACAGAACCTTGGGTGGTTTGGAGATGGAATTGAGATTGAGAGAGAGATTGGCTGGTT
TGTTCAACGAGCAAAGAAAGGGTCAAAGAGCTAAGGACGTCAGAGAAAACCCAAGAGCTATGGCTAAGTTGTTGAG
AGAGGCTAACAGATTGAAGACCGTCTTGTCTGCTAACGCTGACCACATGGCTCAAATCGAGGGTTTGATGGACGAC
GTTGACTTCAAGGCTAAGGTTACCAGAGTCGAGTTCGAGGAATTGTGTGCTGACTTGTTCGAGAGAGTTCCAGGTC
CAGTTCAACAAGCCTTGCAATCTGCTGAGATGTCCTTGGACGAGATCGAGCAAGTTATCTTGGTTGGTGGTGCTAC
CAGAGTCCCAAGAGTTCAAGAGGTTTTGTTGAAGGCTGTCGGTAAGGAAGAGTTGGGTAAGAACATTAACGCTGAC
GAGGCTGCTGCTATGGGTGCTGTTTACCAAGCTGCTGCTTTGTCCAAGGCTTTCAAGGTTAAGCCATTCGTCGTCA
GAGATGCTGTCGTCTACCCAATCTTGGTTGAGTTCACCAGAGAGGTCGAGGAAGAACCAGGTATCCACTCTTTGAA
GCACAACAAGAGAGTCTTGTTCTCCAGAATGGGTCCATACCCACAAAGAAAGGTCATCACCTTCAACAGATACTCC
CACGACTTCAACTTCCACATCAACTACGGTGACTTGGGTTTCTTGGGTCCAGAGGACTTGAGAGTTTTCGGTTCCC
AAAACTTGACCACCGTCAAGTTGAAGGGTGTTGGTGACTCCTTCAAGAAGTACCCAGACTACGAGTCCAAGGGTAT
CAAGGCTCACTTCAACTTGGACGAGTCTGGTGTTTTGTCCTTGGACAGAGTTGAGTCCGTTTTCGAGACTTTGGTT
GAGGACTCTGCTGAAGAGGAATCCACCTTGACTAAGTTGGGTAACACCATCTCTTCCTTGTTCGGTGGTGGTACTA
CTCCAGACGCTAAGGAAAACGGTACTGACACCGTTCAAGAGGAAGAGGAATCTCCAGCTGAGGGTTCTAAGGACGA
ACCAGGTGAGCAAGTTGAGTTGAAGGAAGAGGCTGAAGCTCCAGTTGAGGACGGTTCTCAACCACCACCACCAGAA
CCTAAGGGTGATGCTACTCCAGAAGGTGAGAAGGCTACTGAGAAGGAAAACGGTGACAAGTCCGAGGCTCAAAAGC
CATCTGAAAAGGCTGAAGCTGGTCCAGAAGGTGTTGCTCCAGCTCCTGAAGGTGAAAAGAAGCAAAAGCCAGCTAG
AAAGAGAAGAATGGTCGAAGAGATCGGTGTCGAGTTGGTCGTTTTGGACTTGCCAGATTTGCCAGAGGACAAGTTG
GCTCAATCCGTCCAAAAGTTGCAAGACTTGACCTTGAGAGACTTGGAGAAGCAAGAGAGAGAGAAGGCTGCTAACT
CTTTGGAGGCTTTCATCTTCGAGACTCAAGACAAGTTGTACCAACCTGAGTACCAAGAGGTTTCCACCGAGGAACA
AAGAGAGGAAATCTCCGGTAAGTTGTCTGCTGCTTCTACTTGGTTGGAGGACGAAGGTGTTGGTGCTACTACCGTT
ATGTTGAAGGAAAAGTTGGCTGAGTTGAGAAAGTTGTGTCAAGGTTTGTTCTTCAGAGTCGAAGAAAGAAAGAAGT
GGCCAGAGAGATTGTCCGCTTTGGACAACTTGTTGAACCACTCTTCCATGTTCTTGAAGGGTGCTAGATTGATCCC
AGAGATGGACCAAATCTTCACCGAGGTTGAGATGACCACCTTGGAGAAGGTTATCAACGAGACTTGGGCTTGGAAG
AACGCTACTTTGGCTGAGCAAGCTAAGTTGCCAGCTACCGAGAAGCCAGTTTTGTTGTCTAAGGACATCGAGGCTA
AGATGATGGCTTTGGACAGAGAGGTCCAATACTTGTTGAACAAGGCTAAGTTCACCAAGCCAAGACCAAGACCTAA
GGACAAGAACGGTACTAGAGCTGAGCCTCCTTTGAACGCTTCTGCTTCTGACCAAGGTGAAAAGGTTATTCCACCA
GCTGGTCAAACTGAGGACGCTGAGCCAATTTCTGAGCCAGAGAAGGTTGAGACTGGTTCTGAACCAGGTGACACTG
AGCCATTGGAATTGGGTGGTCCAGGTGCTGAACCAGAGCAAAAGGAACAATCCACTGGTCAAAAGAGACCATTGAA
GAACGACGAGTTGTAATAG (Continued)

SEQ ID NO:9: Codon optimized nucleotide sequence of human ERdj3 as used in Examples; the first 66 nts encoding signal sequence are *underlined and in italics*

*ATGGCTCCACAAAACTTGTCCACTTTCTGTTTGTTGTTGTTGTACTTGATCGGTGCTGTTATCGCT*GGTAGAGACT
TCTACAAGATCTTGGGTGTTCCAAGATCCGCTTCCATCAAGGACATCAAGAAGGCTTACAGAAAGTTGGCTTTGCA
ATTGCACCCAGACAGAAACCCAGACGACCCACAAGCTCAAGAGAAGTTCCAAGATTTGGGTGCTGCTTACGAGGTT
TTGTCTGACTCCGAGAAGAGAAAGCAATACGACACCTACGGTGAGGAAGGTTTGAAGGACGGTCACCAATCTTCTC
ACGGTGATATCTTCTCCCACTTCTTCGGTGACTTCGGTTTCATGTTCGGTGGTACTCCAAGACAACAAGACAGAAA
CATCCCAAGAGGTTCCGACATCATCGTTGACTTGGAGGTTACCTTGGAGGAAGTCTACGCTGGTAACTTCGTTGAG
GTCGTCAGAAACAAGCCAGTCGCTAGACAAGCTCCAGGTAAGAGAAAGTGTAACTGTAGACAAGAGATGAGAACCA
CTCAATTGGGTCCAGGTAGATTCCAAATGACCCAAGAGGTTGTCTGTGACGAGTGTCCAAACGTCAAGTTGGTCAA
CGAGGAAAGAACCTTGGAGGTTGAGATTGAGCCAGGTGTCAGAGATGGTATGGAATACCCATTCATTGGTGAGGGT
GAGCCACACGTTGATGGTGAACCAGGTGACTTGAGATTCAGAATCAAGGTCGTCAAGCACCCAATCTTCGAGAGAA
GAGGTGACGACTTGTACACCAACGTCACCATTTCTTTGGTCGAGTCCTTGGTCGGTTTCGAGATGGACATTACTCA
CTTGGACGGTCACAAGGTCCACATCTCTAGAGACAAGATTACCAGACCAGGTGCTAAGTTGTGGAAGAAGGGTGAG
GGTTTGCCAAACTTCGATAACAACAACATCAAGGGTTCCTTGATCATCACCTTCGACGTCGACTTCCCAAAGGAAC
AATTGACCGAGGAAGCTAGAGAGGGTATCAAGCAATTGTTGAAGCAAGGTTCCGTCCAAAAGGTCTACAACGGTTT
GCAAGGTTACTAATAG

SEQ ID NO:10, Signal sequence:

MKXSTNLILAIAAASXVVSA, wherein
X at position 3 is either F or L; and
X at position 16 is either A or T.

SEQ ID NO:11, EpxLA: MKFSTNLILAIAAASAVVSA

SEQ ID NO:12, EpxLA coding sequence:

ATGAAGTTCTCCACCAATTTGATTCTAGCTATTGCAGCAGCTTCCGCCGTTGTCTCAGCT

SEQ ID NO:13, Leader sequence:

MKXSTNLILAIAAASXVVSAAPVAPAEEAANHLHKR, wherein
X at position 3 is either F or L
X at position 16 is either A or T SEQ ID NO:14, Signal sequence, aMF, *S. cerevisiae*:

MRFPSIFTAVLFAASSALAAPVNTTTEDETAQIPAEAVIGYSDLEGDFDVAVLPFSNSTNNGLLFINTTIASIAAK
EEGVSLEKR

SEQ ID NO:15, Signal sequence, native to hBIP, homo sapiens:

MKLSLVAAMLLLLSAARA

SEQ ID NO:16: Signal sequence, native to hGrp170, homo sapiens:

MADKVRRQRPRRRVCWALVAVLLADLLALSDT

SEQ ID NO:17, Signal sequence, Kar2, *S. cerevisiae*:

MFFNRLSAGKLLVPLSVVLYALFVVILPLQNSFHSSNVLVRGADD (Continued)

SEQ ID NO:18: Nucleotide sequence encoding the Kar2 signal sequence, *S. cerevisiae*:

ATGTTTTTCAACAGACTAAGCGCTGGCAAGCTGCTGGTACCACTCTCCGTGGTCCTGTACGCCCTTTTCGTGGTAA
TATTACCTTTACAGAATTCTTTCCACTCCTCCAATGTTTTAGTTAGAGGTGCCGATGAT

SEQ ID NO:19, Signal sequence, native to hERdj3, homo sapiens:

MAPQNLSTFCLLLLYLIGAVIA

SEQ ID NO:20, ER retention sequence: homo sapiens: KDEL

SEQ ID NO:21, ER retention sequence: homo sapiens: NDEL

SEQ ID NO:22: RDEL

SEQ ID NO:23: DDEL

SEQ ID NO:24, pGAP, P. pastoris/ Komagataella phaffii (GS115), originating from PPUZZLE vectors:

CTTTTTTGTAGAAATGTCTTGGTGTCCTCGTCCAATCAGGTAGCCATCTCTGAAATATCTGGCTCCGTTGCAACTC
CGAACGACCTGCTGGCAACGTAAAATTCTCCGGGGTAAAACTTAAATGTGGAGTAATGGAACCAGAAACGTCTCTT
CCCTTCTCTCTCCTTCCACCGCCCGTTACCGTCCCTAGGAAATTTTACTCTGCTGGAGAGCTTCTTCTACGGCCCC
CTTGCAGCAATGCTCTTCCCAGCATTACGTTGCGGGTAAAACGGAGGTCGTGTACCCGACCTAGCAGCCCAGGGAT
GGAAAAGTCCCGGCCGTCGCTGGCAATAATAGCGGGCGGACGCATGTCATGAGATTATTGGAAACCACCAGAATCG
AATATAAAAGGCGAACACCTTTCCCAATTTTGGTTTCTCCTGACCCAAAGACTTTAAATTTAATTTATTTGTCCCT
ATTTCAATCAATTGAACAACTATCACCTGCAGGCC

SEQ ID NO:25: pGAP, P. pastoris/ Komagataella phaffii (GS115), originating from GoldenPiCS vectors CTTTTTTGTAGAAATGTCTTGGTGTCCTCGTCCAATCAGGTAGCCATCTCTGAAATATCTGGCTCCGTTGCAACTC
CGAACGACCTGCTGGCAACGTAAAATTCTCCGGGGTAAAACTTAAATGTGGAGTAATGGAACCAGAAACGTCTCTT
CCCTTCTCTCTCCTTCCACCGCCCGTTACCGTCCCTAGGAAATTTTACTCTGCTGGAGAGCTTCTTCTACGGCCCC
CTTGCAGCAATGCTCTTCCCAGCATTACGTTGCGGGTAAAACGGAGGTCGTGTACCCGACCTAGCAGCCCAGGGAT
GGAAAAGTCCCGGCCGTCGCTGGCAATAATAGCGGGCGGACGCATGTCATGAGATTATTGGAAACCACCAGAATCG
AATATAAAAGGCGAACACCTTTCCCAATTTTGGTTTCTCCTGACCCAAAGACTTTAAATTTAATTTATTTGTCCCT
ATTTCAATCAATTGAACAACTATCAAAACACA (Continued)

SEQ ID NO:26, pCS1 P. pastoris/ Komagataella phaffii:

AGGGCATCATTGAGGTTTCCACAAAAGGAAGAAACATGGATCCAGAGACATCAACAGAGAGGAAAGCGGGTAGTGA
AGCCGAAGCCACAACACAGCCCGATTTGGAAGGGAGTTCACAATCAAGGTGAGTCCAGCCATTTTTTTTCTTTTTT
TTTTTTTTATTCAGGTGAACCCACCTAACTATTTTTAACTGGGATCCAGTGAGCTCGCTGGGTGAAAGCCAACCAT
CTTTTGTTTCGGGGAACCGTGCTCGCCCCGTAAAGTTAATTTTTTTTTCCCGCGCAGCTTTAATCTTTCGGCAGAG
AAGGCGTTTTCATCGTAGCGTGGGAACAGAATAATCAGTTCATGTGCTATACAGGCACATGGCAGCAGTCACTATT
TTGCTTTTTAACCTTAAAGTCGTTCATCAATCATTAACTGACCAATCAGATTTTTTGCATTTGCCACTTATCTAAA
AATACTTTTGTATCTCGCAGATACGTTCAGTGGTTTCCAGGACAACACCCAAAAAAAGGTATCAATGCCACTAGGC
AGTCGGTTTTATTTTTGGTCACCCACGCAAAGAAGCACCCACCTCTTTTAGGTTTTAAGTTGTGGGAACAGTAACA
CCGCCTAGAGCTTCAGGAAAAACCAGTACCTGTGACCGCAATTCACCATGATGCAGAATGTTAATTTAAACGAGTG
CCAAATCAAGATTTCAACAGACAAATCAATCGATCCATAGTTACCCATTCCAGCCTTTTCGTCGTCGAGCCTGCTT
CATTCCTGCCTCAGGTGCATAACTTTGCATGAAAAGTCCAGATTAGGGCAGATTTTGAGTTTAAAATAGGAAATAT
AAACAAATATACCGCGAAAAAGGTTTGTTTATAGCTTTTCGCCTGGTGCCGTACGGTATAAATACATACTCTCCTC
CCCCCCCTGGTTCTCTTTTTCTTTTGTTACTTACATTTTACCGTTCCGTCACTCGCTTCACTCAACAACAAAA

SEQ ID NO:27, pAOX1 promoter P. pastoris/ Komagataella phaffii, CBS7435:

CATGTTGGTATTGTGAAATAGACGCAGATCGGGAACACTGAAAAATAACAGTTATTATTCGAGATCTAACATCCAA
AGACGAAAGGTTGAATGAAACCTTTTTGCCATCCGACATCCACAGGTCCATTCTCACACATAAGTGCCAAACGCAA
CAGGAGGGGATACACTAGCAGCAGACCGTTGCAAACGCAGGACCTCCACTCCTCTTCTCCTCAACACCCACTTTTG
CCATCGAAAAACCAGCCCAGTTATTGGGCTTGATTGGAGCTCGCTCATTCCAATTCCTTCTATTAGGCTACTAACA
CCATGACTTTATTAGCCTGTCTATCCTGGCCCCCCTGGCGAGGTTCATGTTTGTTTATTTCCGAATGCAACAAGCT
CCGCATTACACCCGAACATCACTCCAGATGAGGGCTTTCTGAGTGTGGGGTCAAATAGTTTCATGTTCCCCAAATG
GCCCAAAACTGACAGTTTAAACGCTGTCTTGGAACCTAATATGACAAAAGCGTGATCTCATCCAAGATGAACTAAG
TTTGGTTCGTTGAAATGCTAACGGCCAGTTGGTCAAAAAGAAACTTCCAAAAGTCGGCATACCGTTTGTCTTGTTT
GGTATTGATTGACGAATGCTCAAAAATAATCTCATTAATGCTTAGCGCAGTCTCTCTATCGCTTCTGAACCCCGGT
GCACCTGTGCCGAAACGCAAATGGGGAAACACCCGCTTTTTGGATGATTATGCATTGTCTCCACATTGTATGCTTC
CAAGATTCTGGTGGGAATACTGCTGATAGCCTAACGTTCATGATCAAAATTTAACTGTTCTAACCCCTACTTGACA
GCAATATATAAACAGAAGGAAGCTGCCCTGTCTTAAACCTTTTTTTTTATCATCATTATTAGCTTACTTTCATAAT
TGCGACTGGTTCCAATTGACAAGCTTTTGATTTTAACGACTTTTAACGACAACTTGAGAAGATCAAAAAACAACTA
ATTATTCGAAACG

SEQ ID NO:28, pAOX2 promoter P. pastoris/ Komagataella phaffii, CBS7435:

GCTTAAAGGACTCCATTTCCTAAAATTTCAAGCAGTCCTCTCAACTAAATTTTTTTCCATTCCTCTGCACCCAGCC
CTCTTCATCAACCGTCCAGCCTTCTCAAAAGTCCAATGTAAGTAGCCTGCAAATTCAGGTTACAACCCCTCAATTT
TCCATCCAAGGGCGATCCTTACAAAGTTAATATCGAACAGCAGAGACTAAGCGAGTCATCATCACCACCCAACGAT
GGTGAAAAACTTTAAGCATAGATTGATGGAGGGTGTATGGCACTTGGCGGCTGCATTAGAGTTTGAAACTATGGGG
TAATACATCACATCCGGAACTGATCCGACTCCGAGATCATATGCAAAGCACGTGATGTACCCCGTAAACTGCTCGG
ATTATCGTTGCAATTCATCGTCTTAAACAGTACAAGAAACTTTATTCATGGGTCATTGGACTCTGATGAGGGGCAC
ATTTCCCCAATGATTTTTTGGGAAAGAAAGCCGTAAGAGGACAGTTAAGCGAAAGAGACAAGACAACGAACAGCAA
AAGTGACAGCTGTCAGCTACCTAGTGGACAGTTGGGAGTTTCCAATTGGTTGGTTTTGAATTTTTACCCATGTTGA
GTTGTCCTTGCTTCTCCTTGCAAACAATGCAAGTTGATAAGACATCACCTTCCAAGATAGGCTATTTTTGTCGCAT
AAATTTTTGTCTCGGAGTGAAAACCCCTTTTATGTGAACAGATTACAGAAGCGTCCTACCCTTCACCGGTTGAGAT
GGGGAGAAAATTAAGCGATGAGGAGACGATTATTGGTATAAAAGAAGCAACCAAAATCCCTTATTGTCCTTTTCTG
ATCAGCATCAAAGAATATTGTCTTAAAACGGGCTTTTAACTACATTGTTCTTACACATTGCAAACCTCTTCCTTCT
ATTTCGGATCAACTGTATTGACTACATTGATCTTTTTTAACGAAGTTTACGACTTACTAAATCCCCACAAACAAAT
CAACTGAGAAAA

SEQ ID NO:29: pMDH3 promoter P. pastoris/ Komagataella phaffii, CBS7435

GTAGCTTGGGTAGGACTTGACAAGTACGGCTTCCGTGGTCATACCAAACGCCTTTGTTACCGTTGGCTATACCTAA
TGACCAAGGCATTTGTGGATTATAACGGTATCGTAGTTGAAAAATATGACGTAACCACTGGTACTAGCCCCCACAA
GGTTGATGCTGAATACGGGAATCAAGGTGCCGATTTTAAAGGAGTAGCCACTGAAGGGTTTGGCTGGGTCAATGCC
TCTTTTATTTTGGGATTAACCTACTTAGATGTCCAAGGCATCCGTGCGATAGGCGCCGTTACGTCCCCTGATGTAT
TTTTCAGGAAGCTCAAACCTTGGGAACGCGCAAGTTATGGCCTAAGGCCATGTAACGAGATAGTCAAGTCAAACTA
GAAGTATACGGTTTCCCCGCAGAAATAGCAGAAATAGGCGACAAATACATACAACATTTTCATTGTGATAGGGGGC
GGCGGTTCCTAGGAGGGACAACCCCCAGAAACCTTGTAGACTACGTTTTCACGACGATGGGTTATTACTGTAAAGG
AAGAATATACTACCCACCAGTTGAATGTTTGAACGGATCAAAGGTCGAAGGGAGTACACGGCCCAACCAACGTAGC
TACCGGAGAAAGCAAGACTTTCCCAAACCAAATAGCTCCGGGTTTCTTCTCCGGCAACCCGTCAGTTTTTGTGTGG
CCGGACAAAAATTCGCACCCTCAGTCTAATTGAAAGGTCGGGCTCCGAGCTCTAGGCGTTTGCGCATGTAATATTG
CATCCCCTCCCATAGATAATACTGCGCGAACACAGGGTGCAAATTATGATGACCACACATGCCAGTGACCAAAACA
GTTTTTTAGTCTTTAAAAACCCTCGGAACTTCTGAGTATATAAAGGCTTCTCATTTCCTACAAGCAAACAAAGAAG
AAACTTCCACTTTCTAACTTTTTATCTATAGACTTTAGAGTTACAACCAACGAACAATAACAA

SEQ ID NO:30: pPOR1 promoter P. pastoris/ Komagataella phaffii, CBS7435

CGCATTATTTGGGTCGGCTACTGTCATTGGTTATGATGGCCTTACCGAGCACGAAGGTGGTTGGATAGACCACAAC
TGGAAACAGTTGTACAAACAGATTGCATTCATTTTTGCTTGTATTGGATACTCGATGGCCATCACCGCTCTTATCT
GTTTCATCCTCAACCGTATTCCATTTTTGCAACTGCGAGCTTCAGAAGAGGCTGAGGAGAAAGGTATGGATGAGGA
TCAGATTGGAGAGTTCGCTTATGACTACGTGGAAGTACGTCGTGATTTTTTGGCTTGGGGATCAGGCCCAAACAAT
GGCTTCAAGGAGCCGGAAGTTCTGGATCAGGTAGTTCCGGTTAATGATTTCAGCAGTGACCAGAATGTGACTAATC
AGACCAACGAATCTGAGAAGCAGTAGAGTAAATATAGAGATGATATTTAGTGTATTCTAATGCTTATGTAATGTAT
TAAGCAAAAAGTTGTGTTTATGAGTTAGCATTTGTCTTAGCAAACATAAAATTATGTCGACATTTGCAACCCGCAT
GTCTAGTGTTTTTAGATCGATCTTCGATGTGTAGAATAATGCCTCCACGTGATGCCCCGCGATTTTGTTGGGTCGC
AATGCCTCCAACATAAACCCATCACGTATAAAAAGCCCTCTTAACCCTCCCCCCTGTTTCGTTTGCTTCATCACTT
AACCTGAACTATCAA

SEQ ID NO:31-44, Methanol inducible promoters and their respective chromosomal positions in the strain P. pastoris CBS7435 (Gasser, Steiger, & Mattanovich, 2015)

| | | |
|---|---|---|
| $P_{SHB17}$ | PP7435_chr2 (340616...341606) | (SEQ ID NO:31)<br>GCAAGGCAACTGAGAAATTGAATAGTGGTTTCAAGCCCGCTGACTTTTT<br>GTATTATCTCAATGTCGGTGTTTCACAGTCCCCAGAAGGGGGCTTTGCC<br>TTCAAGGGAGACGGAAGAGACATCGTCAACCCTGGGGAGAAGTATTTCA<br>AATGGCGCAAGTTCGCTAATTTTTACGATTAAGCAGTGCTGTATGGGGT<br>AGTTAATAAATCGGGAATATCCTTCTGACGTGACTGTAACAAATCTCTT<br>TTTACGTGGTGCGCATACTGGACAGAGGCAGAGTCTCAATTTCTTCTTT<br>TGAGACAGGCTACTACAGCCTGTGATTCCTCTTGGTACTTGGATTTGCT<br>TTTATCTGGCTCCGTTGGGAACTGTGCCTGGGTTTTGAAGTATCTTGTG<br>GATGTGTTTCTAACACTTTTTCAATCTTCTTGGAGTGAGAATGCAGGAC<br>TTTGAACATCGTCTAGCTCGTTGGTAGGTGAACCGTTTTACCTTGCATG<br>TGGTTAGGAGTTTTCTGGAGTAACCAAGACCGTCTTATCATCGCCGTAA<br>AATCGCTCTTACTGTCGCTAATAATCCCGCTGGAAGAGAAGTTCGAACA<br>GAAGTAGCACGCAAAGCTCTTGTCAAATGAGAATTGTTAATCGTTTGAC<br>AGGTCACACTCGTGGGCTATGTACGATCAACTTGCCGGCTGTTGCTGGA<br>GAGATGACACCAGTTGTGGCATGGCCAATTGGTATTCAGCCGTACCACT<br>GTATGGAAAATGAGATTATCTTGTTCTTGATCTAGTTTCTTGCCATTTT<br>AGAGTTGCCACATTCGTAGGTTTCAGTACCAATAATGGTAACTTCCAAA<br>CTTCCAACGCAGATACCAGAGATCTGCCGATCCTTCCCCAACAATAGGA<br>GCTTACTACGCCATACATATAGCCTATCTATTTTCACTTTCGCGTGGGT<br>GCTTCTATATAAACGGTTCCCCATCTTCCGTTTCATACTACTTGAATTT<br>TAAGCACTAAA |
| $P_{ALD4}$ | PP7435_chr2 (1466285...1467148) | (SEQ ID NO:32)<br>CTTTTCTTTGGGCAAGGAAAAATCAAGAAAAAGCAGAGGTTAAAGTTTT<br>CAGGGGAATGGCAATTGCTTTATATATGGGAGAAAGTTAACTACGTCGG<br>TGCTGTAGGCGTAGAGAGCGACTGGAGAATGCGTGATGAGGTCGTCTCT<br>TTTCGCCCCCCCTTGGCGGGGTAAAAATTGCACTACTGCAGAATTACTA<br>CACCCCTATTCCGAGGAGACGGAGTGCGACAAAAATGGTAAAGTTCACC<br>CTAGTCTGCGACTTTTAATTGACGGACACCGGCGTTTACATGCGAAAAA |

(Continued)

| | | |
|---|---|---|
| | | AACTAAAGTGCGCGCATTTCACGGCCGAGGGGGGTCCCACTTGGGACTG AGAGGGGGTGGGATCTGAAATCGAGGAGGTATCAAGACCCCCCGTTTCT CAACTCCCTAATCAAAAATTACGAAGTCCTCGTTGGAAAGGAGTTAAAA TAATTAAGCGGGGTCGGACGCCATACCGAGGTTATCTTGCAGGCATTTT ACTAATATTGGAATTCGGAGCTCAACTTGCAACCAGGCAGGGTTTAGCT ATGTAATCAATGTAATCAATATAATAAAGCACTACCACATCGAAGGTTT GGGAGGGAGGCCAATAGTGTCCCCCACAGGGTGCTGATATCGCGATTCT TGGGTGAGGAGACACATATTTCACTCCTCTCACCAACCAACCAAGCGGC TCCTCGCAAGATGATTTATCCGATTATCCGGACACTATACTCCCATCCA GTTTGATGCCGATTTCATCGATTGTCCTAAATAATCCTTAAATATGTAT AGAACGGTACCCTGGGGTTACATAATCCTTATTTAATAATCCCTCCCCC ACCGCTTTTCTTTTTTTTTCTTCTTATTGTC |
| $P_{FDH1}$ | PP7435_chr3 (423504...424503) | (SEQ ID NO:33) AAATGGCAGAAGGATCAGCCTGGACGAAGCAACCAGTTCCAACTGCTAA GTAAAGAAGATGCTAGACGAAGGAGACTTCAGAGGTGAAAAGTTTGCAA GAAGAGAGCTGCGGGAAATAAATTTTCAATTTAAGGACTTGAGTGCGTC CATATTCGTGTACGTGTCCAACTGTTTTCCATTACCTAAGAAAAACATA AAGATTAAAAAGATAAACCCAATCGGGAAACTTTAGCGTGCCGTTTCGG ATTCCGAAAAACTTTTGGAGCGCCAGATGACTATGGAAAGAGGAGTGTA CCAAAATGGCAAGTCGGGGGCTACTCACCGGATAGCCAATACATTCTCT AGGAACCAGGGATGAATCCAGGTTTTTGTTGTCACGGTAGGTCAAGCAT TCACTTCTTAGGAATATCTCGTTGAAAGCTACTTGAAATCCCATTGGGT GCGGAACCAGCTTCTAATTAAATAGTTCGATGATGTTCTCTAAGTGGGA CTCTACGGCTCAAACTTCTACACAGCATCATCTTAGTAGTCCCTTCCCA AAACACCATTCTAGGTTTCGGAACGTAACGAAACAATGTTCCTCTCTTC ACATTGGGCCGTTACTCTAGCCTTCCGAAGAACCAATAAAAGGGACCGG CTGAAACGGGTGTGGAAACTCCTGTCCAGTTTATGGCAAAGGCTACAGA AATCCCAATCTTGTCGGGATGTTGCTCCTCCCAAACGCCATATTGTACT GCAGTTGGTGCGCATTTTAGGGAAAATTTACCCCAGATGTCCTGATTTT CGAGGGCTACCCCCAACTCCCTGTGCTTATACTTAGTCTAATTCTATTC AGTGTGCTGACCTACACGTAATGATGTCGTAACCCAGTTAAATGGCCGA AAAACTATTTAAGTAAGTTTATTTCTCCTCCAGATGAGACTCTCCTTCT TTTCTCCGCTAGTTATCAAACTATAAACCTATTTTACCTCAAATACCTC CAACATCACCCACTTAAACA |
| $P_{DAS1}$ | PP7435_chr3 (634140...634688) | (SEQ ID NO:34) AATGATATAAACAACAATTGAGTGACAGGTCTACTTTGTTCTCAAAAGG CCATAACCATCTGTTTGCATCTCTTATCACCACACCATCCTCCTCATCT GGCCTTCAATTGTGGGGAACAACTAGCATCCCAACACCAGACTAACTCC ACCCAGATGAAACCAGTTGTCGCTTACCAGTCAATGAATGTTGAGCTAA CGTTCCTTGAAACTCGAATGATCCCAGCCTTGCTGCGTATCATCCCTCC GCTATTCCGCCGCTTGCTCCAACCATGTTTCCGCCTTTTTCGAACAAGT TCAAATACCTATCTTTGGCAGGACTTTTCCTCCTGCCTTTTTTAGCCTC AGGTCTCGGTTAGCCTCTAGGCAAATTCTGGTCTTCATACCTATATCAA CTTTTCATCAGATAGCCTTTGGGTTCAAAAAAGAACTAAAGCAGGATGC CTGATATATAAATCCCAGATGATCTGCTTTTGAAACTATTTTCAGTATC TTGATTCGTTTACTTACAAACAACTATTGTTGATTTTATCTGGAGAATA ATCGAACAAA |
| $P_{DAS2}$ | PP7435_chr3 (632201...633200) | (SEQ ID NO:35) ATTACTGTTTTGGGCAATCCTGTTGATAAGACGCATTCTAGAGTTGTTT CATGAAAGGGTTACGGGTGTTGATTGGTTTGAGATATGCCAGAGGACAG ATCAATCTGTGGTTTGCTAAACTGGAAGTCTGGTAAGGACTCTAGCAAG TCCGTTACTCAAAAAGTCATACCAAGTAAGATTACGTAACACCTGGGCA TGACTTTCTAAGTTAGCAAGTCACCAAGAGGGTCCTATTTAACGTTTGG CGGTATCTGAAACACAAGACTTGCCTATCCCATAGTACATCATATTACC TGTCAAGCTATGCTACCCCACAGAAATACCCCAAAAGTTGAAGTGAAAA AATGAAAATTACTGGTAACTTCACCCCATAACAAACTTAATAATTTCTG TAGCCAATGAAAGTAAACCCCATTCAATGTTCCGAGATTTAGTATACTT GCCCCTATAAGAAACGAAGGATTTCAGCTTCCTTACCCCATGAACAGAA ATCTTCCATTTACCCCCCACTGGAGAGATCCGCCCAAACGAACAGATAA TAGAAAAAAGAAATTCGGACAAATAGAACACTTTCTCAGCCAATTAAAG TCATTCCATGCACTCCCTTTAGCTGCCGTTCCATCCCTTTGTTGAGCAA |

(Continued)

| | | |
|---|---|---|
| | | CACCATCGTTAGCCAGTACGAAAGAGGAAACTTAACCGATACCTTGGAG AAATCTAAGGCGCGAATGAGTTTAGCCTAGATATCCTTAGTGAAGGGTT GTTCCGATACTTCTCCACATTCAGTCATAGATGGGCAGCTTTGTTATCA TGAAGAGACGGAAACGGGCATTAAGGGTTAACCGCCAAATTATATAAAG ACAACATGTCCCCAGTTTAAAGTTTTTCTTTCCTATTCTTGTATCCTGA GTGACCGTTGTGTTTAATATAACAAGTTCGTTTTAACTTAAGACCAAAA CCAGTTACAACAAATTATAACCCCTCTAAACACTAAAGTTCACTCTTAT CAAACTATCAAACATCAAAA |
| $P_{PMP20}$ | PP7435_ Chr1 (2418090...2419089) | (SEQ ID NO:36) GTCAACTGCGTACTCTTTTGTCGAATGGACTACTGAATCTGCCTCGATA GCCACTATAGGAAGGTCCATAGAGGCCAGTTTTTCAACTAGTCTTGGTG GAAAGAAACCGACAAAGCCTTTCATGGAGTCACCGATACTGAAAGGTTC AAACAAAGAATGCTTGGGTAGTCTCTTAATACCCATGGCAACGAAAAAG GGGTCTTCATTGTTCAACATGAATTCGTATCCACCTTTAATGTAGTCAT AAAGCTGCTGAAGTTCCGAATCAGTGATGGAACTGTCTACAGTGACAAT ATAGGAGTTCTCAATCACCTTATATCCAGTCGAATATATCTGGATAGGG TCGGGTCTCACTGTGGAAGATTCAAATGGGTTAGATCCCTGTAATTTCA GCGATGGAGACTCAGTATGATGGGGCAAGGAAAACGGCAATTGGATATT CAATTGGTCAAGAGATGGTATCAAAAGCGAGTGTGCCAGGGTAGCCACG GTAGCCACTGATGCTAATCTGATAATTTTCATTTCTGGAGTGTCAAAAC AGTAGTGATAAAAGGCTATGAAGGAGGTTGTCTAGGGGCTCGCGGAGGA AAGTGATTCAAACAGACCTGCCAAAAAGAGAAAAAAGAGGGAATCCCTG TTCTTTCCAATGGAAATGACGTAACTTTAACTTGAAAAATACCCCAACC AGAAGGGTTCAAACTCAACAAGGATTGCGTAATTCCTACAAGTAGCTTA GAGCTGGGGGAGAGACAACTGAAGGCAGCTTAACGATAACGCGGGGGGA TTGGTGCACGACTCGAAAGGAGGTATCTTAGTCTTGTAACCTCTTTTTT CCAGAGGCTATTCAAGATTCATAGGCGATATCGATGTGGAGAAGGGTGA ACAATATAAAAGGCTGGAGAGATGTCAATGAAGCAGCTGGATAGATTTC AAATTTTCTAGATTTCAGAGTAATCGCACAAAACGAAGGAATCCCACCA AGCAAAAAAAAAAAATCTAAG |
| $P_{FBA1-2}$ | PP7435_Chr1 (1162918...1163621) | (SEQ ID NO:37) AAATTAATCCATAAGATAAGGCAAATGTGCTTAAGTAATTGAAAACAGT GTTGTGATTATATAAGCATGGTATTTGAATAGAACTACTGGGGTTAACT TATCTAGTAGGATGGAAGTTGAGGGAGATCAAGATGCTTAAAGAAAAGG ATTGGCCAATATGAAAGCCATAATTAGCAATACTTATTTAATCAGATAA TTGTGGGGCATTGTGACTTGACTTTTACCAGGACTTCAAACCTCAACCA TTTAAACAGTTATAGAAGACGTACCGTCACTTTTGCTTTTAATGTGATC TAAATGTGATCACATGAACTCAAACTAAAATGATATCTTTTACTGGACA AAAATGTTATCCTGCAAACAGAAAGCTTTCTTCTATTCTAAGAAGAACA TTTACATTGGTGGGAAACCTGAAAACAGAAAATAAATACTCCCCAGTGA CCCTATGAGCAGGATTTTTGCATCCCTATTGTAGGCCTTTCAAACTCAC ACCTAATATTTCCCGCCACTCACACTATCAATGATCACTTCCCAGTTCT CTTCTTCCCCTATTCGTACCATGCAACCCTTACACGCCTTTTCCATTTC GGTTCGGATGCGACTTCCAGTCTGTGGGGTACGTAGCCTATTCTCTTAG CCGGTATTTAAACATACAAATTCACCCAAATTCTACCTTGATAAGGTAA TTGATTAATTTCATAAAT |
| $P_{PMP47}$ | PP7435_Chr3 (2033196...2034195) | (SEQ ID NO:38) AGCTCAGATTGGAAATGATTTTTGATCCTACCAAGAAGCCTTTGATTTC CAGAATCTCCGCTAAGTAAGTAACCCCCGCAAACGCATGCATCCATGCA AACAAAATACTAACAATTTTAGCCCCGTTGTTGAGAAACCCAGAAAATT GAATGTTCAACCAATCCAGACGATCAATAAGAAAAAAGGCCCAAAGGCT ACTTCCAAACCTGCTGCCGCCAAACCTGCTCCTTCAAAAGCCGGTCCCA AGGGAGGTAAGAAGGTGAGAAAGCCAAAGAAGACAGTTGAAGAATTGGA TCAGGAAATGGCTGACTACTTTGAAAATAAGAATTAGCCCAACAAAATA TGTACAAGTATTATATAAATGAATCTACATGGTGTGTTTTATTTAGATC CTCCAAACCAAGGAAAGAAACTAAACTTATCTCCGGACTTACGAGTCAA ATAACTATCCGCAGTTCCTTGGAACTCAGACTTTCTTCCATAAGCGGTC ATATCATCTTTGGACTGTGGGAATCCTGGACGAATCTTTGAAATGTCAT AATCTTGCTCTCTATCTCCAAGCACAGCGTCCGGTAAATGCTGGTTCTT CTTTCTCAGATGAATCTTGGATTTAACAAATAAAGCCGTGCCTATGGCT AATGTACTCAAAAACAAAGTCTGCTTCCAGAATTTCGCAAACGATGGAA |

(Continued)

| | | |
|---|---|---|
| | | TGCCATTTCCTGTAAATGTACTCATTGAACCTATGTTTGATTAAAGTTG<br>GTGTGAAGTCATCAAACGAGAGTAAAATCAGATACTCGTGCACCGGCCA<br>AAATTGACTGAGCTAATCTCTGCAGGCTTGACATCCGAACACAACAAAT<br>AGGCGACAAATCTTAACTATCTAATCGTAGGCTATGGTAGAACTTTGTG<br>GGGGTAGAGGAAGACTACAACAGCAAGACAAAACAAAAGAGTCATAGTT<br>TGACTCTCTGCTTTTTTCTTCTTTCTCTTCTTTTTCTTCCTCCATATTC<br>GTTATTTATTTCGAACTGGA |
| $P_{FLD}$ | PP7435_Chr3<br>(262519...263518) | (SEQ ID NO:39)<br>CAGCCATTAATCTCACCTCAGTTTTTGAATCAGTAGAATTTTTAATGAA<br>ACAAACGGTTGGTATATTATTTGATAGAGTTGCCAAATTTCCAAAGATA<br>AATTTTTCATCAGGTAATATCCTGAATACCGTAACATAGTGACTATTGG<br>AAGACACTGCTATCATATTATATTTCGGATAAAAATCCAAACCCCAGAC<br>CGACCTCTTGAGTCTCAACTCCAAGTCAGCCGCAACTTTAATTATCCGT<br>GGATTGGGAGCTAGTTTGGACAACGCATCAGTATAATATAACTTTACGG<br>TTCCATTATCAGACGCTATTGCAAGAACTTCCTTTCCATTGATCTCGCC<br>AATGCGGCAGTAATTGATATCGTAGGGTAGGTCTGGAAAGACGCTGGCG<br>CTTGTGTCCCATTCTGCAGGAATCTCTGGCACGGTGCTAATGGTAGTTA<br>TCCAACGGAGCTGAGGTAGTCGATATATCTGGATATGCCGCCTATAGGA<br>TAAAAACAGGAGAGGGTGAACCTTGCTTATGGCTACTAGATTGTTCTTG<br>TACTCTGAATTCTCATTATGGGAAACTAAACTAATCTCATCTGTGTGTT<br>GCAGTACTATTGAATCGTTGTAGTATCTACCTGGAGGGCATTCCATGAA<br>TTAGTGAGATAACAGAGTTGGGTAACTAGAGAGAATAATAGACGTATGC<br>ATGATTACTACACAACGGATGTCGCACTCTTTCCTTAGTTAAAACTATC<br>ATCCAATCACAAGATGCGGGCTGGAAAGACTTGCTCCCGAAGGATAATC<br>TTCTGCTTCTATCTCCCTTCCTCATATGGTTTCGCAGGGCTCATGCCCC<br>TTCTTCCTTCGAACTGCCCGATGAGGAAGTCCTTAGCCTATCAAAGAAT<br>TCGGGACCATCATCGATTTTTAGAGCCTTACCTGATCGCAATCAGGATT<br>TCACTACTCATATAAATACATCGCTCAAAGCTCCAACTTTGCTTGTTCA<br>TACAATTCTTGATATTCACA |
| $P_{FGH1}$ | PP7435_Chr3<br>(555587...556586) | (SEQ ID NO:40)<br>TGGTTCCCTCTCGGTCCAATACCAAAAATATTATCACCATACAGGTCTC<br>CCTTCGATACCAGTGCAAAGTTGAACCGTGGGATTACCTTGGAATCTAC<br>AAAAATAGTGTCACTCACAAGTTTGTCATCAACCACGCTGCCGCTTGCA<br>AAGGAGAACTGAACATGAAGGTTGTTAGGGTTTGTTATATTGGAATAAG<br>TGGTGGATTTGTTGAAGGCGAACGCACCAAAGCTACATCCGTCCTGAGC<br>ACACTGTGAATTTGTCACGGAATTGACCAAGAGGTCAGACGATCCTGTA<br>TCCCATTGAGCCGTTATGCTTTGTGGGGGAAACCCTATTTCTATCGTAC<br>TAAGAAAACCAATGGTGAACTCATATTCGGTATCAATGGCGACGATTCC<br>AGCATAGCCTGTAGACAGTAACAACACTAGGGCAACAGCAACTAACATA<br>TCTTCATTGATGAAACGTTGTGATCGGTGTGACTTTTATAGTAAAAGCT<br>ACAACTGTTTGAAATACCAAGATATCATTGTGAATGGCTCAAAAGGGTA<br>ATACATCTGAAAAACCTGAAGTGTGGAAAATTCCGATGGAGCCAACTCA<br>TGATAACGCAGAAGTCCCATTTTGCCATCTTCTCTTGGTATGAAACGGT<br>AGAAAATGATCCGAGTATGCCAATTGATACTCTTGATTCATGCCCTATA<br>GTTTGCGTAGGGTTTAATTGATCTCCTGGTCTATCGATCTGGGACGCAA<br>TGTAGACCCCATTAGTGGAAACACTGAAAGGGATCCAACACTCTAGGCG<br>GACCCGCTCACAGTCATTTCAGGACAATCACCACAGGAATCAACTACTT<br>CTCCCAGTCTTCCTTGCGTGAAGCTTCAAGCCTACAACATAACACTTCT<br>TACTTAATCTTTGATTCTCGAATTGTTTACCCAATCTTGACAACTTAGC<br>CTAAGCAATACTCTGGGGTTATATATAGCAATTGCTCTTCCTCGCTGTA<br>GCGTTCATTCCATCTTTCTA |
| $P_{TAL1-2}$ | PP7435_Chr2<br>(644082...645082) | (SEQ ID NO:41)<br>GATATCGATCTACACTTAATAGTAGATGACGAGGCATCTCTCCAATAGG<br>TACCATATCTGGTGTTTCTTGTAATTTAAGAATCTGTTGGTCTATGAAT<br>GTAGATTTGTCATGAACAATGATATATGGGTCAGGAGGACAAGATGGTT<br>TCTCTGAGTTGGGTTGTTGAGGTGCCTGGCAAGACTTCGGAGCGTTGAT<br>ATCCCCAAGACTTGTAGTGACCGATAGTTGAAGCGTGTGTTTGCAGGAA<br>CGGCACATCAATGCAACTTTCGTAACTTTGGAATTGAGAGTTGATGCAC<br>TGATGACGATACCCGAAATTTTGACGATTTTACCAATATGACTTGAAGA<br>CAAGTCTCTCATTGAAACCTTATTATCGTTACTAAGCAAAACGAGCTGA<br>CAAGAAGGGAAGGTGGTCGGTATTTCCTCGTTGTTCAAATATATGATTC |

(Continued)

| | | |
|---|---|---|
| | | TCCTGGCAATATCTGTGATGGCCTGTTCAAAAAGTGGAATCATTTCTGC<br>AGGATCATCTACCAACTTTTTATTGAGCTCCTCATTGAATACGATTAAG<br>TGGTCATTTTGAATCGTCAGTAAGTACTTGTTTACAAGTAAATTCTGTC<br>TGAGTTGTTCTCTGTAGATGTACTGATTTTCCATACGAAACTCCAAAAT<br>GAACGAACGGAATGCCTTAATGACCTCACTGAACTGGTCATCGTTCTGT<br>TCTCCGGGAAGGACACTTGTGTTAAAGACTGATGCTCTATCAAAGGACA<br>TTGCAACAAAGTATAAACGGTTGTGAGCGGGAAAAAGATGTGTAGGTAA<br>TTGTCGTAGATGAGACTGATTCAGTAGAAAACGCGTCCTGCACTATTTT<br>TTTCTTTCTTCATTACATTTCCTAATCGGGACAAAATGAATCTAAAGAC<br>GTGGTTATGTAGTACACGCATCGATAGGCTATCCCCATACCAAAACACT<br>ATTTTACCCCATCCTTGACAGGTTATAAATATGCGATAGTATGAGTATC<br>TTCAAATTCAGCTGAAATATC |
| $P_{DAS2}$ | PP7435_Chr3<br>(633689-634688) | SEQ ID NO:42)<br>AATAAAAAAACGTTATAGAAAGAAATTGGACTACGATATGCTCCAATCC<br>AAATTGTCAAAATTGACCACCGAAAAAGAACAATTGGAATTTGACAAGA<br>GGAACAACTCACTAGATTCTCAAACGGAGCGTCACCTAGAGTCAGTTTC<br>CAAGTCAATTACAGAAAGTTTGGAAACAGAAGAGGAGTATCTACAATTG<br>AATTCCAAACTTAAAGTCGAGCTGTCCGAATTCATGTCGCTAAGGCTTT<br>CTTACTTGGACCCCATTTTTGAAAGTTTCATTAAAGTTCAGTCAAAAAT<br>TTTCATGGACATTTATGACACATTAAAGAGCGGACTACCTTATGTTGAT<br>TCTCTATCCAAAGAGGATTATCAGTCCAAGATCTTGGACTCTAGAATAG<br>ATAACATTCTGTCGAAAATGGAAGCGCTGAACCTTCAAGCTTACATTGA<br>TGATTAGAGCAATGATATAAACAACAATTGAGTGACAGGTCTACTTTGT<br>TCTCAAAAGGCCATAACCATCTGTTTGCATCTCTTATCACCACACCATC<br>CTCCTCATCTGGCCTTCAATTGTGGGGAACAACTAGCATCCCAACACCA<br>GACTAACTCCACCCAGATGAAACCAGTTGTCGCTTACCAGTCAATGAAT<br>GTTGAGCTAACGTTCCTTGAAACTCGAATGATCCCAGCCTTGCTGCGTA<br>TCATCCCTCCGCTATTCCGCCGCTTGCTCCAACCATGTTTCCGCCTTTT<br>TCGAACAAGTTCAAATACCTATCTTTGGCAGGACTTTTCCTCCTGCCTT<br>TTTTAGCCTCAGGTCTCGGTTAGCCTCTAGGCAAATTCTGGTCTTCATA<br>CCTATATCAACTTTTCATCAGATAGCCTTTGGGTTCAAAAAAGAACTAA<br>AGCAGGATGCCTGATATATAAATCCCAGATGATCTGCTTTTGAAACTAT<br>TTTCAGTATCTTGATTCGTTTACTTACAAACAACTATTGTTGATTTTAT<br>CTGGAGAATAATCGAACAAA |
| $P_{CAM1}$ | PP7435_Chr3<br>(178828-179827) | SEQ ID NO:43)<br>ATTGTTGTGAATACTCTCCTTCATTTGGATTTCTTGGACTTCGGACTCT<br>CTTGATCTCTCTTCGAAAGTTTTAACTCTGTTCATGTATAATTTTACCC<br>GCTGTAGGTCGCTCATAATACCATGAGTATGCACATCTTTTACTCCATT<br>AACTTTCAGGTATGCAAAATACAATGAAGATAGTATATAGCTCAAAGAA<br>TTTAGCATTTTGCATTGATCTAATTGTGACATTTTCTCTATGATATCAT<br>CTAGCTTCTTAAACTCGAGAATCTCGTCCAACGAGGCAGAAACATTGTC<br>CAGTCTTACGTCAAGATTATTCACGAGTTTCTGGACCGTATCAACGTTT<br>TCCATCTTAAGATTACAGTAAGTATCGTCCTTTTGAACTGCAAAGGTAG<br>AAAAGTTAATTTTTGATTTGGTAGTACACTATGAAACTTGCTCACCCCA<br>ATCTTTCCTCCTGACAGGTTGATCTTTATCCCTCTACTAAATTGCCCCA<br>AGTGTATCAAGTAGACTAGATCTCGCGAAAGAACAGCCTAATAAACTCC<br>GAAGCATGATGGCCTCTATCCGGAAAACGTTAAGAGATGTGGCAACAGG<br>AGGGCACATAGAATTTTTAAAGACGCTGAAGAATGCTATCATAGTCCGT<br>AAAAATGTGATAGTACTTTGTTTAGTGCGTACGCCACTTATTCGGGGCC<br>AATAGCTAAACCCAGGTTTGCTGGCAGCAAATTCAACTGTAGATTGAAT<br>CTCTCTAACAATAATGGTGTTCAATCCCCTGGCTGGTCACGGGGAGGAC<br>TATCTTGCGTGATCCGCTTGGAAAATGTTGTGTATCCCTTTCTCAATTG<br>CGGAAAGCATCTGCTACTTCCCATAGGCACCAGTTACCCAATTGATATT<br>TCCAAAAAAGATTACCATATGTTCATCTAGAAGTATAAATACAAGTGGA<br>CATTCAATGAATATTTCATTCAATTAGTCATTGACACTTTCATCAACTT<br>ACTACGTCTTATTCAACAAT |
| $P_{PP7435\_Chr1-0336}$ | PP7435_Chr1<br>(615194-615193) | SEQ ID NO:44)<br>TATACGGTCTATCCACTTTGGAAACGATGTAGTTGAAACGGGGAAGTAA<br>TAGTGGTTCCCAAACGACATGAAGAGGTTATATAAGTTTGCAAGAGGGT<br>GACACCATTTTAGTTGTGGTTCCCGGGTATTTTTTTAATCTTTTTAGTC<br>TAAGATAGCCTCCCCAGATATTACCGAGTTGGGCCATTTGGGGCGGTAT |

(Continued)

| | | |
|---|---|---|
| | | CGGTGGTATCTGATGGTAGCGCGTTTTTACATGCCTGTGCATTGAACTG<br>GCAAAGAGTATACTATCGTGGGGCCCTGAAGGAGGCAGCAAATGGACCG<br>TCAATTGGTTGATCAGGGACTCAAGACAGGTATTGAGCTTTTCAAACAA<br>AAAGAGTATAGGCGCTGCTACAAGGCATTTACTTCTACTATCAATTTCA<br>TTGAGAATGATCCCGAGTTGGCCGCCAGCTGTGTATCTCAACTGATATC<br>TCTGTTAGATTGTAGGGCAGCCTGTTTGGAAAAGCTAGATCAATTGAAT<br>ATGGCCTTGAAAGATGGTCTTAAAATGATCAAGAGAGAGTGCCACAACT<br>GCAAGGGTTATTTGAGAACTTGCAAAATTTTAGACCTACAAGGGAAGAT<br>CAGTGAGGCTTTGTCTACAGCAAGAGAAGGGATCTCCATAATAGAAACT<br>AGAAGAGATCAGGATAATCAATTTAGATATTCCAAGGTTCTTTTGGAAC<br>AATTAAAGGAACTGAAAAATGCACTGAAAATCAAATTGGACAAGAAAAA<br>TCAGCTACACTTCAAAGTTTTAAAGTTTGACGCACCAGTGCCTTGTACA<br>AAGAAACTAAGATTAGTCACTCCAAGAACAATAGATCCTTCCATTTTTT<br>TGCCGATAGAGCTAGTGAAGCTGATCTTTCGCCTGTTGAATTTCTCAGA<br>CATGTATGCCTGTTTATTGGTCTCAACAAAATGGAACTCAATTATATCC<br>TCATCACCGGAACTGTTTCGAAAACTTCAGTTGAAATCCCAACTGTCCA<br>ACAAGGCGTTAAACAATTGT |

SEQ ID NO:45
pG1 ($P_{GTR1}$) comprising the TA(T)$_x$ motif, x=14-16
CAAACATTTGCTCCCCCTAGTCTCCAGGGAAATGTAAAATATACTGCTAATAGAAAACAGTAAGACGCTCAGTTGT
CAGGATAATTACGTTCGACTGTAGTAAAACAGGAATCTGTATTGTTAGAAAGAACGAGAGTTTTTTACGGCGCCGC
CATATTGGGCCGTGTGAAAACAGCTTGAAACCCCACTACTTTCAAAGGTTCTGTTGCTATACACGAACCATGTTTA
ACCAACCTCGCTTTTGACTTGACTGAAGTCATCGGTTAACAATCAAGTACCCTAGTCTGTCTGAATGCTCCTTTCC
ATATTCAGTAGGTGTTTCTTGCACTTTTGCATGCACTGCGGAAGAATTAGCCAATAGCGCGTTTCATATGCGCTTT
TACCCCCTCTTTTGTCAAGCGCAAAATGCCTGTAAGATTTGGTGGGGGTGTGAGCCGTTAGCTGAAGTACAACAGG
CTAATTCCCTGAAAAAACTGCAGATAGACTTCAAGATCTCAGGGATTCCCACTATTTGGTATTCTGATATGTTTTT
CCTGATATGCATCAAAACTCTAATCTAAAACCTGAATCTCCGCTAnGATGACCCCGTTTTCGTGACAAATTAATTT
CCAACGGGGTCTTGTCCGGATAAGAGAATTTTGTTTGATTATCCGTTCGGATAAATGGACGCCTGCTCCATATTTT
TCCGGTTATTACCCCACCTGGAAGTGCCCAGAATTTTCCGGGGATTACGGATAATACGGTGGTCTGGATTAATTAA
TACGCCAAGTCTTACATTTTGTTGCAGTCTCGTGCGAGTATGTGCAATAATAAACAAGATGAGCCAATTTATTGGA
TTAGTTGCAGCTTGACCCCGCCATAGCTAGGCATAGCCAAGTGCTATGGGTGTTAGATGATGCACTTGGATGCAGT
GAGTTTTGGAGTATAAAAGATCCTTAAAATTCCACCCTT
n…(T)x wherein x is 14-16 pG1-x sequences Figure legend:

- Main regulatory region: bold
- Core regulatory region: *bold, italic and underlined*, or double underlined
- T motif: *italic and underlined*, may be optionally extended (at the 5'-terminal end of the T motif) by a preceding TA sequence, or (at the 3'-terminal end of the T motif) by a succeeding AT sequence
- 3'-terminal region: underlined with dotted line (Continued)

SEQ ID NO:46
pG1-3 (PG1-D1240-2xTA(T)₁₄): Example comprising two T motifs which are (T)ₓ
(x=14), each extended by preceding TA (extending the T motif at its 5'-end to
become a TA(T)ₓ motif)
CAAACATTTGCTCCCCCTAGTCTCCAGGGAAATGTAAAATATACTGCTAATAGAAAACAGTAAGACGCTCAGTTGT
CAGGATAATTACGTTCGACTGTAGTAAAACAGGAATCTGTATTGTTAGAAAGAACGAGAGTTTTTTACGGCGCCGC
CATATTGGGCCGTGTGAAAACAGCTTGAAACCCCACTACTTTCAAAGGTTCTGTTGCTATACACGAACCATGTTTA
ACCAACCTCGCTTTTGACTTGACTGAAGTCATCGGTTAACAATCAAGTACCCTAGTCTGTCTGAATGCTCCTTTCC
ATATTCAGTAGGTGTTTCTTGCACTTTTGCATGCACTGCGGAAGAATTAGCCAATAGCGCGTTTCATATGCGCTTT
TACCCCCTCTTTTGTCAAGCGCAAAATGCCTGTAAGATTTGGTGGGGGTGTGAGCCGTTAGCTGAAGTACAACAGG
CTAATTCCCTGAAAAAACTGCAGCTCAGGGATTCCCACTATTTGGTATTCTGATATGTTTTTCCTGATATGCATCA
AAACTCTAATCTAAAACCTGAATCTCCGC*TATTTTTTTTTTTTTT*GATGACCCCGTTTTCGTGACAAATTAATTTC
CAACGGGGTCTTGTCCGGATAAGAGAATTTTGTTTGATTATCCGTTCGG*ATAAATGGA*CGCCTGCTC*CATATTTTT*
*CCGGTT*ATTACCCCACCTGGAAGTGCCCAGAATTTTCCGGGGATTACGGATAATA**CGGTGGTCTGGATTAATTAAT
ACGAGATCTCAGGGATTCCCACTATTTGGTATTCTGATATGTTTTTCCTGATATGCATCAAAACTCTAATCTAAAA
CCTGAATCTCCGC*TATTTTTTTTTTTTTT*GATGACCCCGTTTTCGTGACAAATTAATTTCCAACGGGGTCTTGT**CC
GGATAAGAGAATTTTGTTTGATTATCCGTTCGG***ATAAATGGA*CGCCTGCTC*CATATTTTTCCGGTT*ATTACCCCAC
CTGGAAGTGCCCAGAATTTTCCGGGGATTACGGATAATAC**GGTGGTCTGGATTAATTAATACGCCAAGTCTTACAT
TTTGTTGCAGTCTCGTGCGAGTATGTGCAATAATAAACAAGATGAGCCAATTTATTGGATTAGTTGCAGCTTGACC
CCGCCATAGCTAGGCATAGCCAAGTGCTATGGGTGTTAGATGATGCACTTGGATGCAGTGAGTTTTGGAGTATAAA
AGATCCTTAAAATTCCACCCTT SEQ ID NO:47
pG1-4 (PG1-D1427-2xTA(T)₁₄): Example comprising two T motifs which are (T)ₓ
(x=14), each extended by preceding TA (extending the T motif at its 5'-end to
become a TA(T)ₓ motif)
CAAACATTTGCTCCCCCTAGTCTCCAGGGAAATGTAAAATATACTGCTAATAGAAAACAGTAAGACGCTCAGTTGT
CAGGATAATTACGTTCGACTGTAGTAAAACAGGAATCTGTATTGTTAGAAAGAACGAGAGTTTTTTACGGCGCCGC
CATATTGGGCCGTGTGAAAACAGCTTGAAACCCCACTACTTTCAAAGGTTCTGTTGCTATACACGAACCATGTTTA
ACCAACCTCGCTTTTGACTTGACTGAAGTCATCGGTTAACAATCAAGTACCCTAGTCTGTCTGAATGCTCCTTTCC
ATATTCAGTAGGTGTTTCTTGCACTTTTGCATGCACTGCGGAAGAATTAGCCAATAGCGCGTTTCATATGCGCTTT
TACCCCCTCTTTTGTCAAGCGCAAAATGCCTGTAAGATTTGGTGGGGGTGTGAGCCGTTAGCTGAAGTACAACAGG
CTAATTCCCTGAAAAAACTGCAGCTCAGGGATTCCCACTATTTGGTATTCTGATATGTTTTTCCTGATATGCATCA
AAACTCTAATCTAAAACCTGAATCTCCGC*TATTTTTTTTTTTTTT*GATGACCCCGTTTTCGTGACAAATTAATTTC
CAACGGGGTCTTGTCCGGATAAGAGAATTTTGTTTGATTATCCGTTCGG*ATAAATGGA*CGCCTGCTC*CATATTTTT*
*CCGGTT*ATTACCCCACCTGGAAGTGCCCAGAATTTTCCGGGGATTACGGATAATA**CGGTGGTCTGGATTAATTAAT
ACGCCAAGTCTTACATTTTGTTGCAGTCTCGTGCGAGTATGTGCAATAATAAACAAGATGAGCCAATTTATTGGAT
TAGTTGCAGCTTGACCCCGCCATAGCTAGGCATAGCCAAGTGCTATGGGTGTTAGATGATGCACTTGGATGCAGTG
AGTTTTGGAGTATAAAAGATCCTTAAAATTCCACCCTTAGATCTCAGGGATTCCCACTATTTGGTATTCTGATATG
TTTTTCCTGATATGCATCAAAACTCTAATCTAAAACCTGAATCTCCGC*TATTTTTTTTTTTTTT*GATGACCCCGTT
TTCGTGACAAATTAATTTCCAACGGGGTCTTGTCCGGATAAGAGAATTTTGTTTGATTATCCGTTCGG*ATAAATGG
A*CGCCTGCTC*CATATTTTTCCGGTT*ATTACCCCACCTGGAAGTGCCCAGAATTTTCCGGGGATTACGGATAATAC**G
GTGGTCTGGATTAATTAATACGCCAAGTCTTACATTTTGTTGCAGTCTCGTGCGAGTATGTGCAATAATAAACAAG
ATGAGCCAATTTATTGGATTAGTTGCAGCTTGACCCCGCCATAGCTAGGCATAGCCAAGTGCTATGGGTGTTAGAT
GATGCACTTGGATGCAGTGAGTTTTGGAGTATAAAAGATCCTTAAAATTCCACCCTT (Continued)

SEQ ID NO:48, >H28K2_HC
EVQLVQSGAEVKKPGESLKISCKGSGYSFTSYWIGWVRQMPGKGLEWMGIIYPGDSDTRYSPSFQGQVTISADKSI
STAYLQWSSLKASDTAMYYCARFFDADMDSWGQGTLVTVSSASTKGPSVFPLAPSSKSTSGGTAALGCLVKDYFPE
PVTVSWNSGALTSGVHTFPAVLQSSGLYSLSSVVTVPSSSLGTQTYICNVNHKPSNTKVDKRVEPKSCDK

SEQ ID NO:49, >H28K2_LC
EIVLTQSPATLSLSPGERATLSCGASQSVSSSYLAWYQQKPGLAPRLLIYDASSRATGIPDRFSGSGSGTDFTLTI
SRLEPEDFAVYYCQQYSNNSVTFGQGTKVEIKRTVAAPSVFIFPPSDEQLKSGTASVVCLLNNFYPREAKVQWKVD
NALQSGNSQESVTEQDSKDSTYSLSSTLTLSKADYEKHKVYACEVTHQGLSSPVTKSFNRGEC

SEQ ID NO:50, >HyHEL_HC
DVQLQESGPSLVKPSQTLSLTCSVTGDSITSDYWSWIRKFPGNRLEYMGYVSYSGSTYYNPSLKSRISITRDTSKN
QYYLDLNSVTTEDTATYYCANWDGDYWGQGTLVTVSSASTKGPSVFPLAPSSKSTSGGTAALGCLVKDYFPEPVTV
SWNSGALTSGVHTFPAVLQSSGLYSLSSVVTVPSSSLGTQTYICNVNHKPSNTKVDKRVEPKSCDK

SEQ ID NO:51, >HyHEL_LC
DIVLTQSPATLSVTPGNSVSLSCRASQSIGNNLHWYQQKSHESPRLLIKYASQSISGIPSRFSGSGSGTDFTLSIN
SVETEDFGMYFCQQSNSWPYTFGGGTKLEIKRTVAAPSVFIFPPSDEQLKSGTASVVCLLNNFYPREAKVQWKVDN
ALQSGNSQESVTEQDSKDSTYSLSSTLTLSKADYEKHKVYACEVTHQGLSSPVTKSFNRGEC (Continued)

SEQUENCE LISTING

```
<160> NUMBER OF SEQ ID NOS: 52

<210> SEQ ID NO 1
<211> LENGTH: 636
<212> TYPE: PRT
<213> ORGANISM: Homo sapiens

<400> SEQUENCE: 1

Glu Glu Glu Asp Lys Lys Glu Asp Val Gly Thr Val Val Gly Ile Asp
1               5                   10                  15

Leu Gly Thr Thr Tyr Ser Cys Val Gly Val Phe Lys Asn Gly Arg Val
            20                  25                  30

Glu Ile Ile Ala Asn Asp Gln Gly Asn Arg Ile Thr Pro Ser Tyr Val
        35                  40                  45
```

-continued

```
Ala Phe Thr Pro Glu Gly Glu Arg Leu Ile Gly Asp Ala Ala Lys Asn
    50                  55                  60

Gln Leu Thr Ser Asn Pro Glu Asn Thr Val Phe Asp Ala Lys Arg Leu
65                  70                  75                  80

Ile Gly Arg Thr Trp Asn Asp Pro Ser Val Gln Gln Asp Ile Lys Phe
                85                  90                  95

Leu Pro Phe Lys Val Val Glu Lys Lys Thr Lys Pro Tyr Ile Gln Val
            100                 105                 110

Asp Ile Gly Gly Gly Gln Thr Lys Thr Phe Ala Pro Glu Glu Ile Ser
        115                 120                 125

Ala Met Val Leu Thr Lys Met Lys Glu Thr Ala Glu Ala Tyr Leu Gly
    130                 135                 140

Lys Lys Val Thr His Ala Val Val Thr Val Pro Ala Tyr Phe Asn Asp
145                 150                 155                 160

Ala Gln Arg Gln Ala Thr Lys Asp Ala Gly Thr Ile Ala Gly Leu Asn
                165                 170                 175

Val Met Arg Ile Ile Asn Glu Pro Thr Ala Ala Ala Ile Ala Tyr Gly
            180                 185                 190

Leu Asp Lys Arg Glu Gly Glu Lys Asn Ile Leu Val Phe Asp Leu Gly
        195                 200                 205

Gly Gly Thr Phe Asp Val Ser Leu Leu Thr Ile Asp Asn Gly Val Phe
    210                 215                 220

Glu Val Val Ala Thr Asn Gly Asp Thr His Leu Gly Gly Glu Asp Phe
225                 230                 235                 240

Asp Gln Arg Val Met Glu His Phe Ile Lys Leu Tyr Lys Lys Lys Thr
                245                 250                 255

Gly Lys Asp Val Arg Lys Asp Asn Arg Ala Val Gln Lys Leu Arg Arg
            260                 265                 270

Glu Val Glu Lys Ala Lys Arg Ala Leu Ser Ser Gln His Gln Ala Arg
        275                 280                 285

Ile Glu Ile Glu Ser Phe Tyr Glu Gly Glu Asp Phe Ser Glu Thr Leu
    290                 295                 300

Thr Arg Ala Lys Phe Glu Glu Leu Asn Met Asp Leu Phe Arg Ser Thr
305                 310                 315                 320

Met Lys Pro Val Gln Lys Val Leu Glu Asp Ser Asp Leu Lys Lys Ser
                325                 330                 335

Asp Ile Asp Glu Ile Val Leu Val Gly Gly Ser Thr Arg Ile Pro Lys
            340                 345                 350

Ile Gln Gln Leu Val Lys Glu Phe Phe Asn Gly Lys Glu Pro Ser Arg
        355                 360                 365

Gly Ile Asn Pro Asp Glu Ala Val Ala Tyr Gly Ala Ala Val Gln Ala
    370                 375                 380

Gly Val Leu Ser Gly Asp Gln Asp Thr Gly Asp Leu Val Leu Leu Asp
385                 390                 395                 400

Val Cys Pro Leu Thr Leu Gly Ile Glu Thr Val Gly Gly Val Met Thr
                405                 410                 415

Lys Leu Ile Pro Arg Asn Thr Val Val Pro Thr Lys Lys Ser Gln Ile
            420                 425                 430

Phe Ser Thr Ala Ser Asp Asn Gln Pro Thr Val Thr Ile Lys Val Tyr
        435                 440                 445

Glu Gly Glu Arg Pro Leu Thr Lys Asp Asn His Leu Leu Gly Thr Phe
    450                 455                 460

Asp Leu Thr Gly Ile Pro Pro Ala Pro Arg Gly Val Pro Gln Ile Glu
```

```
465                 470                 475                 480

Val Thr Phe Glu Ile Asp Val Asn Gly Ile Leu Arg Val Thr Ala Glu
                485                 490                 495

Asp Lys Gly Thr Gly Asn Lys Asn Lys Ile Thr Ile Thr Asn Asp Gln
            500                 505                 510

Asn Arg Leu Thr Pro Glu Glu Ile Glu Arg Met Val Asn Asp Ala Glu
        515                 520                 525

Lys Phe Ala Glu Glu Asp Lys Lys Leu Lys Glu Arg Ile Asp Thr Arg
    530                 535                 540

Asn Glu Leu Glu Ser Tyr Ala Tyr Ser Leu Lys Asn Gln Ile Gly Asp
545                 550                 555                 560

Lys Glu Lys Leu Gly Gly Lys Leu Ser Ser Glu Asp Lys Glu Thr Met
                565                 570                 575

Glu Lys Ala Val Glu Glu Lys Ile Glu Trp Leu Glu Ser His Gln Asp
            580                 585                 590

Ala Asp Ile Glu Asp Phe Lys Ala Lys Lys Lys Glu Leu Glu Glu Ile
        595                 600                 605

Val Gln Pro Ile Ile Ser Lys Leu Tyr Gly Ser Ala Gly Pro Pro Pro
    610                 615                 620

Thr Gly Glu Glu Asp Thr Ala Glu Lys Asp Glu Leu
625                 630                 635


<210> SEQ ID NO 2
<211> LENGTH: 1965
<212> TYPE: DNA
<213> ORGANISM: Homo sapiens

<400> SEQUENCE: 2

atgaagctct ccctggtggc cgcgatgctg ctgctgctca gcgcggcgcg ggccgaggag      60

gaggacaaga aggaggacgt gggcacggtg gtcggcatcg acctggggac cacctactcc     120

tgcgtcggcg tgttcaagaa cggccgcgtg gagatcatcg ccaacgatca gggcaaccgc     180

atcacgccgt cctatgtcgc cttcactcct gaaggggaac gtctgattgg cgatgccgcc     240

aagaaccagc tcacctccaa ccccgagaac acggtctttg acgccaagcg gctcatcggc     300

cgcacgtgga atgacccgtc tgtgcagcag gacatcaagt tcttgccgtt caaggtggtt     360

gaaaagaaaa ctaaaccata cattcaagtt gatattggag gtgggcaaac aaagacattt     420

gctcctgaag aaatttctgc catggttctc actaaaatga aagaaaccgc tgaggcttat     480

ttgggaaaga aggttaccca tgcagttgtt actgtaccag cctattttaa tgatgcccaa     540

cgccaagcaa ccaaagacgc tggaactatt gctggcctaa atgttatgag gatcatcaac     600

gagcctacgg cagctgctat tgcttatggc ctggataaga gggaggggga gaagaacatc     660

ctggtgtttg acctgggtgg cggaaccttc gatgtgtctc ttctcaccat tgacaatggt     720

gtcttcgaag ttgtggccac taatggagat actcatctgg gtggagaaga ctttgaccag     780

cgtgtcatgg aacacttcat caaactgtac aaaaagaaga cgggcaaaga tgtcaggaaa     840

gacaatagag ctgtgcagaa actccggcgc gaggtagaaa aggccaaacg ggccctgtct     900

tctcagcatc aagcaagaat tgaaattgag tccttctatg aaggagaaga cttttctgag     960

accctgactc gggccaaatt tgaagagctc aacatggatc tgttccggtc tactatgaag    1020

cccgtccaga aagtgttgga agattctgat ttgaagaagt ctgatattga tgaaattgtt    1080

cttgttggtg gctcgactcg aattccaaag attcagcaac tggttaaaga gttcttcaat    1140

ggcaaggaac catcccgtgg cataaaccca gatgaagctg tagcgtatgg tgctgctgtc    1200
```

-continued caggctggtg tgctctctgg tgatcaagat acaggtgacc tggtactgct tgatgtatgt 1260
ccccttacac ttggtattga aactgtggga ggtgtcatga ccaaactgat tccaaggaac 1320
acagtggtgc ctaccaagaa gtctcagatc ttttctacag cttctgataa tcaaccaact 1380
gttacaatca aggtctatga aggtgaaaga cccctgacaa aagacaatca tcttctgggt 1440
acatttgatc tgactggaat tcctcctgct cctcgtgggg tcccacagat tgaagtcacc 1500
tttgagatag atgtgaatgg tattcttcga gtgacagctg aagacaaggg tacagggaac 1560
aaaaataaga tcacaatcac caatgaccag aatcgcctga cacctgaaga aatcgaaagg 1620
atggttaatg atgctgagaa gtttgctgag gaagacaaaa agctcaagga gcgcattgat 1680
actagaaatg agttggaaag ctatgcctat tctctaaaga atcagattgg agataaagaa 1740
aagctgggag gtaaactttc ctctgaagat aaggagacca tggaaaaagc tgtagaagaa 1800
aagattgaat ggctggaaag ccaccaagat gctgacattg aagacttcaa agctaagaag 1860
aaggaactgg aagaaattgt tcaaccaatt atcagcaaac tctatggaag tgcaggccct 1920
cccccaactg gtgaagagga tacagcagaa aaagatgagt tgtag 1965

<210> SEQ ID NO 3
<211> LENGTH: 967
<212> TYPE: PRT
<213> ORGANISM: Homo sapiens

<400> SEQUENCE: 3

Leu Ala Val Met Ser Val Asp Leu Gly Ser Glu Ser Met Lys Val Ala
1 5 10 15

Ile Val Lys Pro Gly Val Pro Met Glu Ile Val Leu Asn Lys Glu Ser
20 25 30

Arg Arg Lys Thr Pro Val Ile Val Thr Leu Lys Glu Asn Glu Arg Phe
35 40 45

Phe Gly Asp Ser Ala Ala Ser Met Ala Ile Lys Asn Pro Lys Ala Thr
50 55 60

Leu Arg Tyr Phe Gln His Leu Leu Gly Lys Gln Ala Asp Asn Pro His
65 70 75 80

Val Ala Leu Tyr Gln Ala Arg Phe Pro Glu His Glu Leu Thr Phe Asp
85 90 95

Pro Gln Arg Gln Thr Val His Phe Gln Ile Ser Ser Gln Leu Gln Phe
100 105 110

Ser Pro Glu Glu Val Leu Gly Met Val Leu Asn Tyr Ser Arg Ser Leu
115 120 125

Ala Glu Asp Phe Ala Glu Gln Pro Ile Lys Asp Ala Val Ile Thr Val
130 135 140

Pro Val Phe Phe Asn Gln Ala Glu Arg Arg Ala Val Leu Gln Ala Ala
145 150 155 160

Arg Met Ala Gly Leu Lys Val Leu Gln Leu Ile Asn Asp Asn Thr Ala
165 170 175

Thr Ala Leu Ser Tyr Gly Val Phe Arg Arg Lys Asp Ile Asn Thr Thr
180 185 190

Ala Gln Asn Ile Met Phe Tyr Asp Met Gly Ser Gly Ser Thr Val Cys
195 200 205

Thr Ile Val Thr Tyr Gln Met Val Lys Thr Lys Glu Ala Gly Met Gln
210 215 220

Pro Gln Leu Gln Ile Arg Gly Val Gly Phe Asp Arg Thr Leu Gly Gly
225 230 235 240

```
Leu Glu Met Glu Leu Arg Leu Arg Glu Arg Leu Ala Gly Leu Phe Asn
                245                 250                 255

Glu Gln Arg Lys Gly Gln Arg Ala Lys Asp Val Arg Glu Asn Pro Arg
            260                 265                 270

Ala Met Ala Lys Leu Leu Arg Glu Ala Asn Arg Leu Lys Thr Val Leu
        275                 280                 285

Ser Ala Asn Ala Asp His Met Ala Gln Ile Glu Gly Leu Met Asp Asp
    290                 295                 300

Val Asp Phe Lys Ala Lys Val Thr Arg Val Glu Phe Glu Glu Leu Cys
305                 310                 315                 320

Ala Asp Leu Phe Glu Arg Val Pro Gly Pro Val Gln Gln Ala Leu Gln
                325                 330                 335

Ser Ala Glu Met Ser Leu Asp Glu Ile Glu Gln Val Ile Leu Val Gly
            340                 345                 350

Gly Ala Thr Arg Val Pro Arg Val Gln Glu Val Leu Leu Lys Ala Val
        355                 360                 365

Gly Lys Glu Glu Leu Gly Lys Asn Ile Asn Ala Asp Glu Ala Ala Ala
    370                 375                 380

Met Gly Ala Val Tyr Gln Ala Ala Ala Leu Ser Lys Ala Phe Lys Val
385                 390                 395                 400

Lys Pro Phe Val Val Arg Asp Ala Val Val Tyr Pro Ile Leu Val Glu
                405                 410                 415

Phe Thr Arg Glu Val Glu Glu Glu Pro Gly Ile His Ser Leu Lys His
            420                 425                 430

Asn Lys Arg Val Leu Phe Ser Arg Met Gly Pro Tyr Pro Gln Arg Lys
        435                 440                 445

Val Ile Thr Phe Asn Arg Tyr Ser His Asp Phe Asn Phe His Ile Asn
    450                 455                 460

Tyr Gly Asp Leu Gly Phe Leu Gly Pro Glu Asp Leu Arg Val Phe Gly
465                 470                 475                 480

Ser Gln Asn Leu Thr Thr Val Lys Leu Lys Gly Val Gly Asp Ser Phe
                485                 490                 495

Lys Lys Tyr Pro Asp Tyr Glu Ser Lys Gly Ile Lys Ala His Phe Asn
            500                 505                 510

Leu Asp Glu Ser Gly Val Leu Ser Leu Asp Arg Val Glu Ser Val Phe
        515                 520                 525

Glu Thr Leu Val Glu Asp Ser Ala Glu Glu Glu Ser Thr Leu Thr Lys
    530                 535                 540

Leu Gly Asn Thr Ile Ser Ser Leu Phe Gly Gly Gly Thr Thr Pro Asp
545                 550                 555                 560

Ala Lys Glu Asn Gly Thr Asp Thr Val Gln Glu Glu Glu Glu Ser Pro
                565                 570                 575

Ala Glu Gly Ser Lys Asp Glu Pro Gly Glu Gln Val Glu Leu Lys Glu
            580                 585                 590

Glu Ala Glu Ala Pro Val Glu Asp Gly Ser Gln Pro Pro Pro Pro Glu
        595                 600                 605

Pro Lys Gly Asp Ala Thr Pro Glu Gly Glu Lys Ala Thr Glu Lys Glu
    610                 615                 620

Asn Gly Asp Lys Ser Glu Ala Gln Lys Pro Ser Glu Lys Ala Glu Ala
625                 630                 635                 640

Gly Pro Glu Gly Val Ala Pro Ala Pro Glu Gly Glu Lys Lys Gln Lys
                645                 650                 655
```

```
Pro Ala Arg Lys Arg Arg Met Val Glu Glu Ile Gly Val Glu Leu Val
            660                 665                 670

Val Leu Asp Leu Pro Asp Leu Pro Glu Asp Lys Leu Ala Gln Ser Val
        675                 680                 685

Gln Lys Leu Gln Asp Leu Thr Leu Arg Asp Leu Glu Lys Gln Glu Arg
    690                 695                 700

Glu Lys Ala Ala Asn Ser Leu Glu Ala Phe Ile Phe Glu Thr Gln Asp
705                 710                 715                 720

Lys Leu Tyr Gln Pro Glu Tyr Gln Glu Val Ser Thr Glu Glu Gln Arg
                725                 730                 735

Glu Glu Ile Ser Gly Lys Leu Ser Ala Ala Ser Thr Trp Leu Glu Asp
            740                 745                 750

Glu Gly Val Gly Ala Thr Thr Val Met Leu Lys Glu Lys Leu Ala Glu
        755                 760                 765

Leu Arg Lys Leu Cys Gln Gly Leu Phe Phe Arg Val Glu Glu Arg Lys
    770                 775                 780

Lys Trp Pro Glu Arg Leu Ser Ala Leu Asp Asn Leu Leu Asn His Ser
785                 790                 795                 800

Ser Met Phe Leu Lys Gly Ala Arg Leu Ile Pro Glu Met Asp Gln Ile
                805                 810                 815

Phe Thr Glu Val Glu Met Thr Thr Leu Glu Lys Val Ile Asn Glu Thr
            820                 825                 830

Trp Ala Trp Lys Asn Ala Thr Leu Ala Glu Gln Ala Lys Leu Pro Ala
        835                 840                 845

Thr Glu Lys Pro Val Leu Leu Ser Lys Asp Ile Glu Ala Lys Met Met
    850                 855                 860

Ala Leu Asp Arg Glu Val Gln Tyr Leu Leu Asn Lys Ala Lys Phe Thr
865                 870                 875                 880

Lys Pro Arg Pro Arg Pro Lys Asp Lys Asn Gly Thr Arg Ala Glu Pro
                885                 890                 895

Pro Leu Asn Ala Ser Ala Ser Asp Gln Gly Glu Lys Val Ile Pro Pro
            900                 905                 910

Ala Gly Gln Thr Glu Asp Ala Glu Pro Ile Ser Glu Pro Glu Lys Val
        915                 920                 925

Glu Thr Gly Ser Glu Pro Gly Asp Thr Glu Pro Leu Glu Leu Gly Gly
    930                 935                 940

Pro Gly Ala Glu Pro Glu Gln Lys Glu Gln Ser Thr Gly Gln Lys Arg
945                 950                 955                 960

Pro Leu Lys Asn Asp Glu Leu
                965
```

<210> SEQ ID NO 4
<211> LENGTH: 3000
<212> TYPE: DNA
<213> ORGANISM: Homo sapiens

<400> SEQUENCE: 4

```
atggcagaca aagttaggag gcagaggccg aggaggcgag tctgttgggc cttggtggct      60

gtgctcttgg cagacctgtt ggcactgagt gatacactgg cagtgatgtc tgtggacctg     120

ggcagtgagt ccatgaaggt ggccattgtc aaacctggag tgcccatgga aattgtcttg     180

aataaggaat ctcggaggaa aacaccggtg atcgtgaccc tgaaagaaaa tgaaagattc     240

tttggagaca gtgcagcaag catggcgatt aagaatccaa aggctacgct acgttacttc     300

cagcacctcc tggggaagca ggcagataac ccccatgtag ctctttacca ggcccgcttc     360
```

```
ccggagcacg agctgacttt cgacccacag aggcagactg tgcactttca gatcagctcg    420
cagctgcagt tctcacctga ggaagtgttg ggcatggttc tcaattattc tcgttctcta    480
gctgaagatt ttgcagagca gcccatcaag gatgcagtga tcaccgtgcc agtcttcttc    540
aaccaggccg agcgccgagc tgtgctgcag gctgctcgta tggctggcct caaagtgctg    600
cagctcatca atgacaacac cgccactgcc ctcagctatg gtgtcttccg ccggaaagat    660
attaacacca ctgcccagaa tatcatgttc tatgacatgg gctcaggcag caccgtatgc    720
accattgtga cctaccagat ggtgaagact aaggaagctg ggatgcagcc acagctgcag    780
atccggggag taggatttga ccgtaccctg gggggcctgg agatggagct ccggcttcga    840
gaacgcctgg ctgggctttt caatgagcag cgcaagggtc agagagcaaa ggatgtgcgg    900
gagaacccgc gtgccatggc caagctgctg cgtgaggcta atcggctcaa aaccgtcctc    960
agtgccaacg ctgaccacat ggcacagatt gaaggcctga tggatgatgt ggacttcaag   1020
gcaaaagtga ctcgtgtgga atttgaggag ttgtgtgcag acttgtttga gcgggtgcct   1080
gggcctgtac agcaggccct ccagagtgcc gaaatgagtc tggatgagat tgagcaggtg   1140
atcctggtgg gtggggccac tcgggtcccc agagttcagg aggtgctgct gaaggccgtg   1200
ggcaaggagg agctggggaa gaacatcaat gcagatgaag cagccgccat gggggcagtg   1260
taccaggcag ctgcgctcag caaagccttt aaagtgaagc catttgtcgt ccgagatgca   1320
gtggtctacc ccatcctggt ggagttcacg agggaggtgg aggaggagcc tgggattcac   1380
agcctgaagc acaataaacg ggtactcttc tctcggatgg ggccctaccc tcaacgcaaa   1440
gtcatcacct ttaaccgcta cagccatgat ttcaacttcc acatcaacta cggcgacctg   1500
ggcttcctgg ggcctgaaga tcttcgggta tttggctccc agaatctgac cacagtgaag   1560
ctaaaagggg tgggtgacag cttcaagaag tatcctgact acgagtccaa gggcatcaag   1620
gctcacttca acctggatga gagtggcgtg ctcagtctag acagggtgga gtctgtattt   1680
gagacactgg tagaggacag cgcagaagag gaatctactc tcaccaaact tggcaacacc   1740
atttccagcc tgtttggagg cggtaccaca ccagatgcca aggagaatgg tactgatact   1800
gtccaggagg aagaggagag ccctgcagag gggagcaagg acgagcctgg ggagcaggtg   1860
gagctcaagg aggaagctga ggccccagtg gaggatggct ctcagccccc acccccctgaa  1920
cctaagggag atgcaacccc tgagggagaa aaggccacag aaaaagaaaa tggggacaag   1980
tctgaggccc agaaaccaag tgagaaggca gaggcagggc ctgagggcgt cgctccagcc   2040
ccagagggag agaagaagca gaagcccgcc aggaagcggc gaatggtaga ggagatcggg   2100
gtggagctgg ttgttctgga cctgcctgac ttgccagagg ataagctggc tcagtcggtg   2160
cagaaacttc aggacttgac actccgagac ctggagaagc aggaacggga aaaagctgcc   2220
aacagcttgg aagcattcat atttgagacc caggacaagc tgtaccagcc cgagtaccag   2280
gaagtgtcca cagaggagca gcgtgaggag atctctggga agctcagcgc cgcatccacc   2340
tggctggagg atgagggtgt tggagccacc acagtgatgt tgaaggagaa gctggctgag   2400
ctgaggaagc tgtgccaagg gctgtttttt cgggtagagg agcgcaagaa gtggcccgaa   2460
cggctgtctg ccctcgataa tctcctcaac cattccagca tgttcctcaa gggggcccgg   2520
ctcatcccag agatggacca gatcttcact gaggtggaga tgacaacgtt agagaaagtc   2580
atcaatgaga cctgggcctg gaagaatgca actctggccg agcaggctaa gctgcccgcc   2640
acagagaagc ctgtgttgct ctcaaaagac attgaagcta agatgatggc cctggaccga   2700
```

gaggtgcagt atctgctcaa taaggccaag tttaccaagc cccggccccg gcctaaggac 2760
aagaatggga cccgggcaga gccacccctc aatgccagtg ccagtgacca gggggagaag 2820
gtcatccctc cagcaggcca gactgaagat gcagagccca tttcagaacc tgagaaagta 2880
gagactggat ccgagccagg agacactgag cctttggagt taggaggtcc tggagcagaa 2940
cctgaacaga aagaacaatc gacaggacag aagcggcctt tgaagaacga cgaactataa 3000

<210> SEQ ID NO 5
<211> LENGTH: 336
<212> TYPE: PRT
<213> ORGANISM: Homo sapiens

<400> SEQUENCE: 5

```
Gly Arg Asp Phe Tyr Lys Ile Leu Gly Val Pro Arg Ser Ala Ser Ile
1               5                   10                  15

Lys Asp Ile Lys Lys Ala Tyr Arg Lys Leu Ala Leu Gln Leu His Pro
            20                  25                  30

Asp Arg Asn Pro Asp Asp Pro Gln Ala Gln Glu Lys Phe Gln Asp Leu
        35                  40                  45

Gly Ala Ala Tyr Glu Val Leu Ser Asp Ser Glu Lys Arg Lys Gln Tyr
    50                  55                  60

Asp Thr Tyr Gly Glu Glu Gly Leu Lys Asp Gly His Gln Ser Ser His
65                  70                  75                  80

Gly Asp Ile Phe Ser His Phe Phe Gly Asp Phe Gly Phe Met Phe Gly
                85                  90                  95

Gly Thr Pro Arg Gln Gln Asp Arg Asn Ile Pro Arg Gly Ser Asp Ile
            100                 105                 110

Ile Val Asp Leu Glu Val Thr Leu Glu Glu Val Tyr Ala Gly Asn Phe
        115                 120                 125

Val Glu Val Val Arg Asn Lys Pro Val Ala Arg Gln Ala Pro Gly Lys
    130                 135                 140

Arg Lys Cys Asn Cys Arg Gln Glu Met Arg Thr Thr Gln Leu Gly Pro
145                 150                 155                 160

Gly Arg Phe Gln Met Thr Gln Glu Val Val Cys Asp Glu Cys Pro Asn
                165                 170                 175

Val Lys Leu Val Asn Glu Glu Arg Thr Leu Glu Val Glu Ile Glu Pro
            180                 185                 190

Gly Val Arg Asp Gly Met Glu Tyr Pro Phe Ile Gly Glu Gly Glu Pro
        195                 200                 205

His Val Asp Gly Glu Pro Gly Asp Leu Arg Phe Arg Ile Lys Val Val
    210                 215                 220

Lys His Pro Ile Phe Glu Arg Arg Gly Asp Asp Leu Tyr Thr Asn Val
225                 230                 235                 240

Thr Ile Ser Leu Val Glu Ser Leu Val Gly Phe Glu Met Asp Ile Thr
                245                 250                 255

His Leu Asp Gly His Lys Val His Ile Ser Arg Asp Lys Ile Thr Arg
            260                 265                 270

Pro Gly Ala Lys Leu Trp Lys Lys Gly Glu Gly Leu Pro Asn Phe Asp
        275                 280                 285

Asn Asn Asn Ile Lys Gly Ser Leu Ile Ile Thr Phe Asp Val Asp Phe
    290                 295                 300

Pro Lys Glu Gln Leu Thr Glu Glu Ala Arg Glu Gly Ile Lys Gln Leu
305                 310                 315                 320

Leu Lys Gln Gly Ser Val Gln Lys Val Tyr Asn Gly Leu Gln Gly Tyr
```

325 330 335

<210> SEQ ID NO 6
<211> LENGTH: 1077
<212> TYPE: DNA
<213> ORGANISM: Homo sapiens

<400> SEQUENCE: 6
atggctccgc agaacctgag caccttttgc ctgttgctgc tatacctcat cggggcggtg 60
attgccggac gagatttcta taagatcttg ggggtgcctc gaagtgcctc tataaaggat 120
attaaaaagg cctataggaa actagccctg cagcttcatc ccgaccggaa ccctgatgat 180
ccacaagccc aggagaaatt ccaggatctg ggtgctgctt atgaggttct gtcagatagt 240
gagaaacgga aacagtacga tacttatggt gaagaaggat taaaagatgg tcatcagagc 300
tcccatggag acatttttc acacttcttt ggggattttg gtttcatgtt tggaggaacc 360
cctcgtcagc aagacagaaa tattccaaga ggaagtgata ttattgtaga tctagaagtc 420
actttggaag aagtatatgc aggaaatttt gtggaagtag ttagaaacaa acctgtggca 480
aggcaggctc ctggcaaacg gaagtgcaat tgtcggcaag agatgcggac cacccagctg 540
ggccctgggc gcttccaaat gacccaggag gtggtctgcg acgaatgccc taatgtcaaa 600
ctagtgaatg aagaacgaac gctggaagta gaaatagagc ctggggtgag agacggcatg 660
gagtacccct ttattggaga aggtgagcct cacgtggatg gggagcctgg agatttacgg 720
ttccgaatca aagttgtcaa gcacccaata tttgaaagga gaggagatga tttgtacaca 780
aatgtgacaa tctcattagt tgagtcactg gttggctttg agatggatat tactcacttg 840
gatggtcaca aggtacatat ttcccgggat aagatcacca ggccaggagc gaagctatgg 900
aagaaagggg aagggctccc caactttgac aacaacaata tcaagggctc tttgataatc 960
acttttgatg tggattttcc aaaagaacag ttaacagagg aagcgagaga aggtatcaaa 1020
cagctactga aacaagggtc agtgcagaag gtatacaatg gactgcaagg atattga 1077

<210> SEQ ID NO 7
<211> LENGTH: 1968
<212> TYPE: DNA
<213> ORGANISM: Artificial Sequence
<220> FEATURE:
<223> OTHER INFORMATION: codon-optimized nucleotide sequence

<400> SEQUENCE: 7
atgaagttgt ccttggtcgc tgctatgctg ttgttgttgt ctgctgctag agctgaggaa 60
gaggacaaga aagaggacgt tggtactgtt gttggtatcg acttgggtac tacctactcc 120
tgtgtcggtg ttttcaagaa cggtagagtc gagattatcg ctaacgacca aggtaacaga 180
atcaccccat cctacgttgc tttcactcca gagggtgaga gattgattgg tgacgctgct 240
aagaaccaat tgacctccaa cccagagaac accgttttcg acgctaagag attgatcggt 300
agaacctgga acgacccatc cgttcaacaa gacatcaagt tcttgccatt caaggtcgtc 360
gagaagaaga ccaagcctta catccaagtt gacatcggtg gtggtcaaac taagaccttc 420
gctcctgaag agatctccgc tatggttttg accaagatga aagaaaccgc tgaggcttac 480
ttgggtaaga aggttactca cgctgttgtt accgtcccag cttacttcaa cgacgctcaa 540
agacaagcta ctaaggacgc tggtactatc gctggtttga acgtcatgag aatcatcaac 600
gagccaaccg ctgctgctat tgcttacggt ttggacaaaa gagaaggaga gaagaacatc 660
ttggttttcg acttgggtgg tggtactttc gacgtttcct tgttgactat cgacaacggt 720

```
gttttcgagg tcgttgctac caacggtgat actcacttgg gtggtgagga cttcgaccaa    780
agagttatgg aacacttcat caagttgtac aagaagaaga ctggtaagga cgtcagaaag    840
gacaacagag ctgtccaaaa gttgagaaga gaggtcgaga aggctaagag agctttgtcc    900
tctcaacacc aagctagaat cgagatcgag tccttctacg agggtgagga tttctctgag    960
actttgacca gagctaagtt cgaggaattg aacatggact tgttcagatc caccatgaag   1020
ccagtccaaa aggttttgga ggactccgac ttgaagaagt ctgacatcga cgagatcgtt   1080
ttggttggtg gttctaccag aatcccaaag atccaacaat tggtcaaaga attcttcaac   1140
ggtaaagaac catccagagg tatcaaccca gacgaggctg ttgcttacgg tgctgctgtt   1200
caagctggtg ttttgtctgg tgaccaagac actggtgact tggttttgtt ggacgtctgt   1260
ccattgacct tgggtatcga gactgttggt ggtgtcatga ccaagttgat cccaagaaac   1320
accgtcgtcc caactaagaa gtcccaaatc ttctctaccg cttccgacaa ccaacctacc   1380
gttaccatta aggtttacga gggtgaaaga ccattgacta aggacaacca cttgttgggt   1440
actttcgatt tgactggtat cccaccagct ccaagaggtg ttccacaaat cgaggttact   1500
ttcgagatcg acgtcaacgg tatcttgaga gttactgctg aggacaaggg tactggtaac   1560
aagaacaaga tcaccatcac caacgaccaa aacagattga cccctgaaga gattgagaga   1620
atggtcaacg acgctgagaa gttcgctgag gaagataaga agttgaaaga aagaatcgac   1680
accagaaacg agttggagtc ctacgcttac tccttgaaga accaaatcgg tgacaaagaa   1740
aagttgggag gtaagttgtc ctccgaggat aaagaaacca tggaaaaggc tgtcgaagag   1800
aagatcgagt ggttggagtc tcaccaagac gctgacattg aggacttcaa ggctaagaag   1860
aaagaattgg aggaaatcgt ccaacctatc atctccaagt tgtacggttc tgctggtcca   1920
ccaccaactg gtgaagaaga tactgctgag aaggacgagt tgtaatag                1968
```

```
<210> SEQ ID NO 8
<211> LENGTH: 2907
<212> TYPE: DNA
<213> ORGANISM: Artificial Sequence
<220> FEATURE:
<223> OTHER INFORMATION: codon-optimized nucleotide sequence

<400> SEQUENCE: 8

ttggctgtca tgtctgttga cttgggttcc gagtctatga aggtcgctat cgttaagcca     60
ggtgtcccaa tggaaatcgt cttgaacaag gaatccagaa gaaagacccc agtcatcgtc    120
accttgaagg aaaacgagag attcttcggt gactccgctg cttctatggc tatcaagaac    180
ccaaaggcta ccttgagata cttccaacac ttgttgggta agcaagctga caacccacac    240
gtcgccttgt accaagctag attcccagag cacgagttga ctttcgaccc acaaagacaa    300
accgtccact tccaaatctc ttcccaattg caattctccc cagaggaagt cttgggtatg    360
gtcttgaact actccagatc tttggctgag gacttcgctg agcaacctat taaggacgct    420
gttatcaccg tcccagtttt cttcaaccag gctgagagaa gagctgtctt gcaagctgct    480
agaatggctg gtttgaaggt cttgcaattg atcaacgaca acaccgctac cgctttgtcc    540
tacggtgttt tcagaagaaa ggacatcaac accaccgctc aaaacatcat gttctacgac    600
atgggttctg gttccaccgt ctgtactatc gtcacctacc aaatggtcaa gaccaaggaa    660
gctggtatgc aaccacaatt gcaaatcaga ggtgtcggtt tcgacagaac cttgggtggt    720
ttggagatgg aattgagatt gagagagaga ttggctggtt tgttcaacga gcaaagaaag    780
```

```
ggtcaaagag ctaaggacgt cagagaaaac ccaagagcta tggctaagtt gttgagagag    840
gctaacagat tgaagaccgt cttgtctgct aacgctgacc acatggctca aatcgagggt    900
ttgatggacg acgttgactt caaggctaag gttaccagag tcgagttcga ggaattgtgt    960
gctgacttgt tcgagagagt tccaggtcca gttcaacaag ccttgcaatc tgctgagatg   1020
tccttggacg agatcgagca agttatcttg gttggtggtg ctaccagagt cccaagagtt   1080
caagaggttt tgttgaaggc tgtcggtaag gaagagttgg gtaagaacat taacgctgac   1140
gaggctgctg ctatgggtgc tgtttaccaa gctgctgctt tgtccaaggc tttcaaggtt   1200
aagccattcg tcgtcagaga tgctgtcgtc tacccaatct tggttgagtt caccagagag   1260
gtcgaggaag aaccaggtat ccactctttg aagcacaaca agagagtctt gttctccaga   1320
atgggtccat acccacaaag aaaggtcatc accttcaaca gatactccca cgacttcaac   1380
ttccacatca actacggtga cttgggtttc ttgggtccag aggacttgag agttttcggt   1440
tcccaaaact tgaccaccgt caagttgaag ggtgttggtg actccttcaa gaagtaccca   1500
gactacgagt ccaagggtat caaggctcac ttcaacttgg acgagtctgg tgtttttgtcc  1560
ttggacagag ttgagtccgt tttcgagact ttggttgagg actctgctga agaggaatcc   1620
accttgacta agttgggtaa caccatctct tccttgttcg gtggtggtac tactccagac   1680
gctaaggaaa acggtactga caccgttcaa gaggaagagg aatctccagc tgagggttct   1740
aaggacgaac caggtgagca agttgagttg aaggaagagg ctgaagctcc agttgaggac   1800
ggttctcaac caccaccacc agaacctaag ggtgatgcta ctccagaagg tgagaaggct   1860
actgagaagg aaaacggtga caagtccgag gctcaaaagc catctgaaaa ggctgaagct   1920
ggtccagaag gtgttgctcc agctcctgaa ggtgaaaaga agcaaaagcc agctagaaag   1980
agaagaatgg tcgaagagat cggtgtcgag ttggtcgttt tggacttgcc agatttgcca   2040
gaggacaagt tggctcaatc cgtccaaaag ttgcaagact tgaccttgag agacttggag   2100
aagcaagaga gagagaaggc tgctaactct ttggaggctt tcatcttcga gactcaagac   2160
aagttgtacc aacctgagta ccaagaggtt tccaccgagg aacaaagaga ggaaatctcc   2220
ggtaagttgt ctgctgcttc tacttggttg gaggacgaag gtgttggtgc tactaccgtt   2280
atgttgaagg aaaagttggc tgagttgaga aagttgtgtc aaggtttgtt cttcagagtc   2340
gaagaaagaa agaagtggcc agagagattg tccgctttgg acaacttgtt gaaccactct   2400
tccatgttct tgaagggtgc tagattgatc ccagagatgg accaaatctt caccgaggtt   2460
gagatgacca ccttggagaa ggttatcaac gagacttggg cttggaagaa cgctactttg   2520
gctgagcaag ctaagttgcc agctaccgag aagccagttt tgttgtctaa ggacatcgag   2580
gctaagatga tggctttgga cagagaggtc caatacttgt tgaacaaggc taagttcacc   2640
aagccaagac caagacctaa ggacaagaac ggtactagag ctgagcctcc tttgaacgct   2700
tctgcttctg accaaggtga aaaggttatt ccaccagctg gtcaaactga ggacgctgag   2760
ccaatttctg agccagagaa ggttgagact ggttctgaac caggtgacac tgagccattg   2820
gaattgggtg gtccaggtgc tgaaccagag caaaaggaac aatccactgg tcaaaagaga   2880
ccattgaaga acgacgagtt gtaatag                                       2907
```

<210> SEQ ID NO 9
<211> LENGTH: 1080
<212> TYPE: DNA
<213> ORGANISM: Artificial Sequence
<220> FEATURE:
<223> OTHER INFORMATION: codon-optimized nucleotide sequence

<400> SEQUENCE: 9

```
atggctccac aaaacttgtc cactttctgt ttgttgttgt tgtacttgat cggtgctgtt     60
atcgctggta gagacttcta caagatcttg ggtgttccaa gatccgcttc catcaaggac    120
atcaagaagg cttacagaaa gttggctttg caattgcacc cagacagaaa cccagacgac    180
ccacaagctc aagagaagtt ccaagatttg ggtgctgctt acgaggtttt gtctgactcc    240
gagaagagaa agcaatacga cacctacggt gaggaaggtt tgaaggacgg tcaccaatct    300
tctcacggtg atatcttctc ccacttcttc ggtgacttcg gtttcatgtt cggtggtact    360
ccaagacaac aagacagaaa catcccaaga ggttccgaca tcatcgttga cttggaggtt    420
accttggagg aagtctacgc tggtaacttc gttgaggtcg tcagaaacaa gccagtcgct    480
agacaagctc caggtaagag aaagtgtaac tgtagacaag agatgagaac cactcaattg    540
ggtccaggta gattccaaat gacccaagag gttgtctgtg acgagtgtcc aaacgtcaag    600
ttggtcaacg aggaaagaac cttggaggtt gagattgagc caggtgtcag agatggtatg    660
gaatacccat tcattggtga gggtgagcca cacgttgatg gtgaaccagg tgacttgaga    720
ttcagaatca aggtcgtcaa gcacccaatc ttcgagagaa gaggtgacga cttgtacacc    780
aacgtcacca tttctttggt cgagtccttg gtcggtttcg agatggacat tactcacttg    840
gacggtcaca aggtccacat ctctagagac aagattacca gaccaggtgc taagttgtgg    900
aagaagggtg agggtttgcc aaacttcgat aacaacaaca tcaagggttc cttgatcatc    960
accttcgacg tcgacttccc aaaggaacaa ttgaccgagg aagctagaga gggtatcaag   1020
caattgttga agcaaggttc cgtccaaaag gtctacaacg gtttgcaagg ttactaatag   1080
```

<210> SEQ ID NO 10
<211> LENGTH: 20
<212> TYPE: PRT
<213> ORGANISM: Artificial Sequence
<220> FEATURE:
<223> OTHER INFORMATION: Signal sequence
<220> FEATURE:
<221> NAME/KEY: MISC_FEATURE
<222> LOCATION: (3)..(3)
<223> OTHER INFORMATION: X at position 3 is either F or L
<220> FEATURE:
<221> NAME/KEY: MISC_FEATURE
<222> LOCATION: (16)..(16)
<223> OTHER INFORMATION: X at position 16 is either A or T

<400> SEQUENCE: 10

```
Met Lys Xaa Ser Thr Asn Leu Ile Leu Ala Ile Ala Ala Ala Ser Xaa
1               5                   10                  15

Val Val Ser Ala
            20
```

<210> SEQ ID NO 11
<211> LENGTH: 20
<212> TYPE: PRT
<213> ORGANISM: Artificial Sequence
<220> FEATURE:
<223> OTHER INFORMATION: Signal sequence

<400> SEQUENCE: 11

```
Met Lys Phe Ser Thr Asn Leu Ile Leu Ala Ile Ala Ala Ala Ser Ala
1               5                   10                  15

Val Val Ser Ala
            20
```

<210> SEQ ID NO 12
<211> LENGTH: 60
<212> TYPE: DNA
<213> ORGANISM: Artificial Sequence
<220> FEATURE:
<223> OTHER INFORMATION: Signal sequence

<400> SEQUENCE: 12
atgaagttct ccaccaattt gattctagct attgcagcag cttccgccgt tgtctcagct 60

<210> SEQ ID NO 13
<211> LENGTH: 36
<212> TYPE: PRT
<213> ORGANISM: Artificial Sequence
<220> FEATURE:
<223> OTHER INFORMATION: Leader sequence
<220> FEATURE:
<221> NAME/KEY: MISC_FEATURE
<222> LOCATION: (3)..(3)
<223> OTHER INFORMATION: X at position 3 is either F or L
<220> FEATURE:
<221> NAME/KEY: MISC_FEATURE
<222> LOCATION: (16)..(16)
<223> OTHER INFORMATION: X at position 16 is either A or T

<400> SEQUENCE: 13

Met Lys Xaa Ser Thr Asn Leu Ile Leu Ala Ile Ala Ala Ala Ser Xaa
1 5 10 15

Val Val Ser Ala Ala Pro Val Ala Pro Ala Glu Glu Ala Ala Asn His
20 25 30

Leu His Lys Arg
35

<210> SEQ ID NO 14
<211> LENGTH: 85
<212> TYPE: PRT
<213> ORGANISM: Saccharomyces cerevisiae

<400> SEQUENCE: 14

Met Arg Phe Pro Ser Ile Phe Thr Ala Val Leu Phe Ala Ala Ser Ser
1 5 10 15

Ala Leu Ala Ala Pro Val Asn Thr Thr Thr Glu Asp Glu Thr Ala Gln
20 25 30

Ile Pro Ala Glu Ala Val Ile Gly Tyr Ser Asp Leu Glu Gly Asp Phe
35 40 45

Asp Val Ala Val Leu Pro Phe Ser Asn Ser Thr Asn Asn Gly Leu Leu
50 55 60

Phe Ile Asn Thr Thr Ile Ala Ser Ile Ala Ala Lys Glu Glu Gly Val
65 70 75 80

Ser Leu Glu Lys Arg
85

<210> SEQ ID NO 15
<211> LENGTH: 18
<212> TYPE: PRT
<213> ORGANISM: Homo sapiens

<400> SEQUENCE: 15

Met Lys Leu Ser Leu Val Ala Ala Met Leu Leu Leu Leu Ser Ala Ala
1 5 10 15

Arg Ala

<210> SEQ ID NO 16
<211> LENGTH: 32
<212> TYPE: PRT
<213> ORGANISM: Homo sapiens

<400> SEQUENCE: 16

```
Met Ala Asp Lys Val Arg Arg Gln Arg Pro Arg Arg Arg Val Cys Trp
1               5                   10                  15

Ala Leu Val Ala Val Leu Leu Ala Asp Leu Leu Ala Leu Ser Asp Thr
            20                  25                  30
```

<210> SEQ ID NO 17
<211> LENGTH: 45
<212> TYPE: PRT
<213> ORGANISM: Saccharomyces cerevisiae

<400> SEQUENCE: 17

```
Met Phe Phe Asn Arg Leu Ser Ala Gly Lys Leu Leu Val Pro Leu Ser
1               5                   10                  15

Val Val Leu Tyr Ala Leu Phe Val Val Ile Leu Pro Leu Gln Asn Ser
            20                  25                  30

Phe His Ser Ser Asn Val Leu Val Arg Gly Ala Asp Asp
        35                  40                  45
```

<210> SEQ ID NO 18
<211> LENGTH: 135
<212> TYPE: DNA
<213> ORGANISM: Saccharomyces cerevisiae

<400> SEQUENCE: 18

```
atgtttttca acagactaag cgctggcaag ctgctggtac cactctccgt ggtcctgtac      60

gcccttttcg tggtaatatt acctttacag aattctttcc actcctccaa tgttttagtt     120

agaggtgccg atgat                                                      135
```

<210> SEQ ID NO 19
<211> LENGTH: 22
<212> TYPE: PRT
<213> ORGANISM: Homo sapiens

<400> SEQUENCE: 19

```
Met Ala Pro Gln Asn Leu Ser Thr Phe Cys Leu Leu Leu Leu Tyr Leu
1               5                   10                  15

Ile Gly Ala Val Ile Ala
            20
```

<210> SEQ ID NO 20
<211> LENGTH: 4
<212> TYPE: PRT
<213> ORGANISM: Homo sapiens

<400> SEQUENCE: 20

```
Lys Asp Glu Leu
1
```

<210> SEQ ID NO 21
<211> LENGTH: 4
<212> TYPE: PRT
<213> ORGANISM: Homo sapiens

<400> SEQUENCE: 21

```
Asn Asp Glu Leu
1
```

<210> SEQ ID NO 22
<211> LENGTH: 4
<212> TYPE: PRT
<213> ORGANISM: Homo sapiens

<400> SEQUENCE: 22

Arg Asp Glu Leu
1

<210> SEQ ID NO 23
<211> LENGTH: 4
<212> TYPE: PRT
<213> ORGANISM: Homo sapiens

<400> SEQUENCE: 23

Asp Asp Glu Leu
1

<210> SEQ ID NO 24
<211> LENGTH: 491
<212> TYPE: DNA
<213> ORGANISM: Pichia pastoris

<400> SEQUENCE: 24

```
cttttttgta gaaatgtctt ggtgtcctcg tccaatcagg tagccatctc tgaaatatct      60
ggctccgttg caactccgaa cgacctgctg gcaacgtaaa attctccggg gtaaaactta     120
aatgtggagt aatggaacca gaaacgtctc ttcccttctc tctccttcca ccgcccgtta     180
ccgtccctag gaaattttac tctgctggag agcttcttct acggccccct tgcagcaatg     240
ctcttcccag cattacgttg cgggtaaaac ggaggtcgtg tacccgacct agcagcccag     300
ggatggaaaa gtcccggccg tcgctggcaa taatagcggg cggacgcatg tcatgagatt     360
attggaaacc accagaatcg aatataaaag gcgaacacct ttcccaattt tggtttctcc     420
tgacccaaag actttaaatt taatttattt gtccctattt caatcaattg aacaactatc     480
acctgcaggc c                                                          491
```

<210> SEQ ID NO 25
<211> LENGTH: 488
<212> TYPE: DNA
<213> ORGANISM: Pichia pastoris

<400> SEQUENCE: 25

```
cttttttgta gaaatgtctt ggtgtcctcg tccaatcagg tagccatctc tgaaatatct      60
ggctccgttg caactccgaa cgacctgctg gcaacgtaaa attctccggg gtaaaactta     120
aatgtggagt aatggaacca gaaacgtctc ttcccttctc tctccttcca ccgcccgtta     180
ccgtccctag gaaattttac tctgctggag agcttcttct acggccccct tgcagcaatg     240
ctcttcccag cattacgttg cgggtaaaac ggaggtcgtg tacccgacct agcagcccag     300
ggatggaaaa gtcccggccg tcgctggcaa taatagcggg cggacgcatg tcatgagatt     360
attggaaacc accagaatcg aatataaaag gcgaacacct ttcccaattt tggtttctcc     420
tgacccaaag actttaaatt taatttattt gtccctattt caatcaattg aacaactatc     480
aaaacaca                                                              488
```

<210> SEQ ID NO 26
<211> LENGTH: 985
<212> TYPE: DNA

<213> ORGANISM: Pichia pastoris

<400> SEQUENCE: 26

```
agggcatcat tgaggtttcc acaaaaggaa gaaacatgga tccagagaca tcaacagaga     60
ggaaagcggg tagtgaagcc gaagccacaa cacagcccga tttggaaggg agttcacaat    120
caaggtgagt ccagccattt tttttctttt tttttttttt attcaggtga acccacctaa    180
ctatttttaa ctgggatcca gtgagctcgc tgggtgaaag ccaaccatct tttgtttcgg    240
ggaaccgtgc tcgccccgta aagttaattt ttttttcccg cgcagcttta atctttcggc    300
agagaaggcg ttttcatcgt agcgtgggaa cagaataatc agttcatgtg ctatacaggc    360
acatggcagc agtcactatt ttgcttttta accttaaagt cgttcatcaa tcattaactg    420
accaatcaga ttttttgcat ttgccactta tctaaaaata cttttgtatc tcgcagatac    480
gttcagtggt ttccaggaca acacccaaaa aaaggtatca atgccactag gcagtcggtt    540
ttatttttgg tcacccacgc aaagaagcac ccacctcttt taggttttaa gttgtgggaa    600
cagtaacacc gcctagagct tcaggaaaaa ccagtacctg tgaccgcaat tcaccatgat    660
gcagaatgtt aatttaaacg agtgccaaat caagatttca acagacaaat caatcgatcc    720
atagttaccc attccagcct tttcgtcgtc gagcctgctt cattcctgcc tcaggtgcat    780
aactttgcat gaaaagtcca gattagggca gattttgagt ttaaaatagg aaatataaac    840
aaatataccg cgaaaaaggt ttgtttatag cttttcgcct ggtgccgtac ggtataaata    900
catactctcc tccccccccct ggttctcttt ttcttttgtt acttacattt taccgttccg    960
tcactcgctt cactcaacaa caaaa                                          985
```

<210> SEQ ID NO 27
<211> LENGTH: 1001
<212> TYPE: DNA
<213> ORGANISM: Pichia pastoris

<400> SEQUENCE: 27

```
catgttggta ttgtgaaata gacgcagatc gggaacactg aaaaataaca gttattattc     60
gagatctaac atccaaagac gaaaggttga atgaaacctt tttgccatcc gacatccaca    120
ggtccattct cacacataag tgccaaacgc aacaggaggg gatacactag cagcagaccg    180
ttgcaaacgc aggacctcca ctcctcttct cctcaacacc cacttttgcc atcgaaaaac    240
cagcccagtt attgggcttg attggagctc gctcattcca attccttcta ttaggctact    300
aacaccatga ctttattagc ctgtctatcc tggccccccct ggcgaggttc atgtttgttt    360
atttccgaat gcaacaagct ccgcattaca cccgaacatc actccagatg agggctttct    420
gagtgtgggg tcaaatagtt tcatgttccc caaatggccc aaaactgaca gtttaaacgc    480
tgtcttggaa cctaatatga caaaagcgtg atctcatcca agatgaacta agtttggttc    540
gttgaaatgc taacggccag ttggtcaaaa agaaacttcc aaaagtcggc ataccgtttg    600
tcttgtttgg tattgattga cgaatgctca aaaataatct cattaatgct tagcgcagtc    660
tctctatcgc ttctgaaccc cggtgcacct gtgccgaaac gcaaatgggg aaacacccgc    720
tttttggatg attatgcatt gtctccacat tgtatgcttc caagattctg gtgggaatac    780
tgctgatagc ctaacgttca tgatcaaaat ttaactgttc taacccctac ttgacagcaa    840
tatataaaca gaaggaagct gccctgtctt aaaccttttt ttttatcatc attattagct    900
tactttcata attgcgactg gttccaattg acaagctttt gattttaacg acttttaacg    960
acaacttgag aagatcaaaa aacaactaat tattcgaaac g                       1001
```

<210> SEQ ID NO 28
<211> LENGTH: 1000
<212> TYPE: DNA
<213> ORGANISM: Pichia pastoris

<400> SEQUENCE: 28
gcttaaagga ctccatttcc taaaatttca agcagtcctc tcaactaaat ttttttccat 60
tcctctgcac ccagccctct tcatcaaccg tccagccttc tcaaaagtcc aatgtaagta 120
gcctgcaaat tcaggttaca acccctcaat tttccatcca agggcgatcc ttacaaagtt 180
aatatcgaac agcagagact aagcgagtca tcatcaccac ccaacgatgg tgaaaaactt 240
taagcataga ttgatggagg gtgtatggca cttggcggct gcattagagt ttgaaactat 300
ggggtaatac atcacatccg gaactgatcc gactccgaga tcatatgcaa agcacgtgat 360
gtaccccgta aactgctcgg attatcgttg caattcatcg tcttaaacag tacaagaaac 420
tttattcatg ggtcattgga ctctgatgag gggcacattt ccccaatgat tttttgggaa 480
agaaagccgt aagaggacag ttaagcgaaa gagacaagac aacgaacagc aaaagtgaca 540
gctgtcagct acctagtgga cagttgggag tttccaattg gttggttttg aatttttacc 600
catgttgagt tgtccttgct tctccttgca aacaatgcaa gttgataaga catcaccttc 660
caagataggc tatttttgtc gcataaattt ttgtctcgga gtgaaaaccc cttttatgtg 720
aacagattac agaagcgtcc tacccttcac cggttgagat ggggagaaaa ttaagcgatg 780
aggagacgat tattggtata aaagaagcaa ccaaaatccc ttattgtcct tttctgatca 840
gcatcaaaga atattgtctt aaaacgggct tttaactaca ttgttcttac acattgcaaa 900
cctcttcctt ctatttcgga tcaactgtat tgactacatt gatctttttt aacgaagttt 960
acgacttact aaatccccac aaacaaatca actgagaaaa 1000

<210> SEQ ID NO 29
<211> LENGTH: 975
<212> TYPE: DNA
<213> ORGANISM: Pichia pastoris

<400> SEQUENCE: 29
gtagcttggg taggacttga caagtacggc ttccgtggtc ataccaaacg cctttgttac 60
cgttggctat acctaatgac caaggcattt gtggattata acggtatcgt agttgaaaaa 120
tatgacgtaa ccactggtac tagcccccac aaggttgatg ctgaatacgg gaatcaaggt 180
gccgatttta aaggagtagc cactgaaggg tttggctggg tcaatgcctc ttttattttg 240
ggattaacct acttagatgt ccaaggcatc cgtgcgatag gcgccgttac gtcccctgat 300
gtatttttca ggaagctcaa accttgggaa cgcgcaagtt atggcctaag gccatgtaac 360
gagatagtca agtcaaacta gaagtatacg gtttccccgc agaaatagca gaaataggcg 420
acaaatacat acaacatttt cattgtgata gggggcggcg gttcctagga gggacaaccc 480
ccagaaacct tgtagactac gttttcacga cgatgggtta ttactgtaaa ggaagaatat 540
actacccacc agttgaatgt ttgaacggat caaaggtcga agggagtaca cggcccaacc 600
aacgtagcta ccggagaaag caagactttc ccaaaccaaa tagctccggg tttcttctcc 660
ggcaacccgt cagtttttgt gtggccggac aaaaattcgc accctcagtc taattgaaag 720
gtcgggctcc gagctctagg cgtttgcgca tgtaatattg catcccctcc catagataat 780
actgcgcgaa cacagggtgc aaattatgat gaccacacat gccagtgacc aaaacagttt 840
tttagtcttt aaaaaccctc ggaacttctg agtatataaa ggcttctcat ttcctacaag 900
caaacaaaga agaaacttcc actttctaac tttttatcta tagactttag agttacaacc 960
aacgaacaat aacaa 975

<210> SEQ ID NO 30
<211> LENGTH: 699
<212> TYPE: DNA
<213> ORGANISM: Pichia pastoris

<400> SEQUENCE: 30
cgcattattt gggtcggcta ctgtcattgg ttatgatggc cttaccgagc acgaaggtgg 60
ttggatagac cacaactgga aacagttgta caaacagatt gcattcattt ttgcttgtat 120
tggatactcg atggccatca ccgctcttat ctgtttcatc ctcaaccgta ttccattttt 180
gcaactgcga gcttcagaag aggctgagga gaaaggtatg gatgaggatc agattggaga 240
gttcgcttat gactacgtgg aagtacgtcg tgattttttg gcttggggat caggcccaaa 300
caatggcttc aaggagccgg aagttctgga tcaggtagtt ccggttaatg atttcagcag 360
tgaccagaat gtgactaatc agaccaacga atctgagaag cagtagagta aatatagaga 420
tgatatttag tgtattctaa tgcttatgta atgtattaag caaaaagttg tgtttatgag 480
ttagcatttg tcttagcaaa cataaaatta tgtcgacatt tgcaacccgc atgtctagtg 540
tttttagatc gatcttcgat gtgtagaata atgcctccac gtgatgcccc gcgattttgt 600
tgggtcgcaa tgcctccaac ataaacccat cacgtataaa aagccctctt aaccctcccc 660
cctgtttcgt ttgcttcatc acttaacctg aactatcaa 699

<210> SEQ ID NO 31
<211> LENGTH: 991
<212> TYPE: DNA
<213> ORGANISM: Pichia pastoris

<400> SEQUENCE: 31
gcaaggcaac tgagaaattg aatagtggtt tcaagcccgc tgactttttg tattatctca 60
atgtcggtgt ttcacagtcc ccagaagggg gctttgcctt caagggagac ggaagagaca 120
tcgtcaaccc tggggagaag tatttcaaat ggcgcaagtt cgctaatttt tacgattaag 180
cagtgctgta tggggtagtt aataaatcgg gaatatcctt ctgacgtgac tgtaacaaat 240
ctctttttac gtggtgcgca tactggacag aggcagagtc tcaatttctt cttttgagac 300
aggctactac agcctgtgat tcctcttggt acttggattt gcttttatct ggctccgttg 360
ggaactgtgc ctgggttttg aagtatcttg tggatgtgtt tctaacactt tttcaatctt 420
cttggagtga gaatgcagga ctttgaacat cgtctagctc gttggtaggt gaaccgtttt 480
accttgcatg tggttaggag ttttctggag taaccaagac cgtcttatca tcgccgtaaa 540
atcgctctta ctgtcgctaa taatcccgct ggaagagaag ttcgaacaga agtagcacgc 600
aaagctcttg tcaaatgaga attgttaatc gtttgacagg tcacactcgt gggctatgta 660
cgatcaactt gccggctgtt gctggagaga tgacaccagt tgtggcatgg ccaattggta 720
ttcagccgta ccactgtatg gaaaatgaga ttatcttgtt cttgatctag tttcttgcca 780
ttttagagtt gccacattcg taggtttcag taccaataat ggtaacttcc aaacttccaa 840
cgcagatacc agagatctgc cgatccttcc ccaacaatag gagcttacta cgccatacat 900
atagcctatc tattttcact ttcgcgtggg tgcttctata taaacggttc cccatcttcc 960
gtttcatact acttgaattt taagcactaa a 991

<210> SEQ ID NO 32
<211> LENGTH: 864
<212> TYPE: DNA
<213> ORGANISM: Pichia pastoris

<400> SEQUENCE: 32
cttttctttg ggcaaggaaa aatcaagaaa aagcagaggt taaagttttc aggggaatgg 60
caattgcttt atatatggga gaaagttaac tacgtcggtg ctgtaggcgt agagagcgac 120
tggagaatgc gtgatgaggt cgtctctttt cgcccccccct tggcggggta aaaattgcac 180
tactgcagaa ttactacacc cctattccga ggagacggag tgcgacaaaa atggtaaagt 240
tcaccctagt ctgcgacttt taattgacgg acaccggcgt ttacatgcga aaaaaactaa 300
agtgcgcgca tttcacggcc gaggggggtc ccacttggga ctgagagggg gtgggatctg 360
aaatcgagga ggtatcaaga ccccccgttt ctcaactccc taatcaaaaa ttacgaagtc 420
ctcgttggaa aggagttaaa ataattaagc ggggtcggac gccataccga ggttatcttg 480
caggcatttt actaatattg gaattcggag ctcaacttgc aaccaggcag ggtttagcta 540
tgtaatcaat gtaatcaata taataaagca ctaccacatc gaaggtttgg gagggaggcc 600
aatagtgtcc cccacagggt gctgatatcg cgattcttgg gtgaggagac acatatttca 660
ctcctctcac caaccaacca agcggctcct cgcaagatga tttatccgat tatccggaca 720
ctatactccc atccagtttg atgccgattt catcgattgt cctaaataat ccttaaatat 780
gtatagaacg gtaccctggg gttacataat ccttatttaa taatccctcc cccaccgctt 840
ttcttttttt ttcttcttat tgtc 864

<210> SEQ ID NO 33
<211> LENGTH: 1000
<212> TYPE: DNA
<213> ORGANISM: Pichia pastoris

<400> SEQUENCE: 33
aaatggcaga aggatcagcc tggacgaagc aaccagttcc aactgctaag taaagaagat 60
gctagacgaa ggagacttca gaggtgaaaa gtttgcaaga agagagctgc gggaaataaa 120
ttttcaattt aaggacttga gtgcgtccat attcgtgtac gtgtccaact gttttccatt 180
acctaagaaa aacataaaga ttaaaaagat aaacccaatc gggaaacttt agcgtgccgt 240
ttcggattcc gaaaaacttt tggagcgcca gatgactatg gaaagaggag tgtaccaaaa 300
tggcaagtcg gggctactc accggatagc caatacattc tctaggaacc agggatgaat 360
ccaggttttt gttgtcacgg taggtcaagc attcacttct taggaatatc tcgttgaaag 420
ctacttgaaa tcccattggg tgcggaacca gcttctaatt aaatagttcg atgatgttct 480
ctaagtggga ctctacggct caaacttcta cacagcatca tcttagtagt cccttcccaa 540
aacaccattc taggtttcgg aacgtaacga aacaatgttc ctctcttcac attgggccgt 600
tactctagcc ttccgaagaa ccaataaaag ggaccggctg aaacgggtgt ggaaactcct 660
gtccagttta tggcaaaggc tacagaaatc ccaatcttgt cgggatgttg ctcctcccaa 720
acgccatatt gtactgcagt tggtgcgcat tttagggaaa atttacccca gatgtcctga 780
ttttcgaggg ctacccccaa ctccctgtgc ttatacttag tctaattcta ttcagtgtgc 840
tgacctacac gtaatgatgt cgtaacccag ttaaatggcc gaaaaactat ttaagtaagt 900
ttatttctcc tccagatgag actctccttc ttttctccgc tagttatcaa actataaacc 960
tattttacct caaatacctc caacatcacc cacttaaaca 1000

<210> SEQ ID NO 34
<211> LENGTH: 549
<212> TYPE: DNA
<213> ORGANISM: Pichia pastoris

<400> SEQUENCE: 34
aatgatataa acaacaattg agtgacaggt ctactttgtt ctcaaaaggc cataaccatc 60
tgtttgcatc tcttatcacc acaccatcct cctcatctgg ccttcaattg tggggaacaa 120
ctagcatccc aacaccagac taactccacc cagatgaaac cagttgtcgc ttaccagtca 180
atgaatgttg agctaacgtt ccttgaaact cgaatgatcc cagccttgct gcgtatcatc 240
cctccgctat tccgccgctt gctccaacca tgtttccgcc tttttcgaac aagttcaaat 300
acctatcttt ggcaggactt ttcctcctgc ctttttttagc ctcaggtctc ggttagcctc 360
taggcaaatt ctggtcttca tacctatatc aacttttcat cagatagcct ttgggttcaa 420
aaaagaacta aagcaggatg cctgatatat aaatcccaga tgatctgctt ttgaaactat 480
tttcagtatc ttgattcgtt tacttacaaa caactattgt tgattttatc tggagaataa 540
tcgaacaaa 549

<210> SEQ ID NO 35
<211> LENGTH: 1000
<212> TYPE: DNA
<213> ORGANISM: Pichia pastoris

<400> SEQUENCE: 35
attactgttt tgggcaatcc tgttgataag acgcattcta gagttgtttc atgaaagggt 60
tacgggtgtt gattggtttg agatatgcca gaggacagat caatctgtgg tttgctaaac 120
tggaagtctg gtaaggactc tagcaagtcc gttactcaaa aagtcatacc aagtaagatt 180
acgtaacacc tgggcatgac tttctaagtt agcaagtcac caagagggtc ctatttaacg 240
tttggcggta tctgaaacac aagacttgcc tatcccatag tacatcatat tacctgtcaa 300
gctatgctac cccacagaaa taccccaaaa gttgaagtga aaaaatgaaa attactggta 360
acttcacccc ataacaaact taataatttc tgtagccaat gaaagtaaac cccattcaat 420
gttccgagat ttagtatact tgcccctata agaaacgaag gatttcagct tccttacccc 480
atgaacagaa atcttccatt tacccccccac tggagagatc cgcccaaacg aacagataat 540
agaaaaaaga aattcggaca aatagaacac tttctcagcc aattaaagtc attccatgca 600
ctccctttag ctgccgttcc atccctttgt tgagcaacac catcgttagc cagtacgaaa 660
gaggaaactt aaccgatacc ttggagaaat ctaaggcgcg aatgagttta gcctagatat 720
ccttagtgaa gggttgttcc gatacttctc cacattcagt catagatggg cagctttgtt 780
atcatgaaga gacggaaacg ggcattaagg gttaaccgcc aaattatata aagacaacat 840
gtccccagtt taaagttttt ctttcctatt cttgtatcct gagtgaccgt tgtgtttaat 900
ataacaagtt cgttttaact taagaccaaa accagttaca acaaattata acccctctaa 960
acactaaagt tcactcttat caaactatca aacatcaaaa 1000

<210> SEQ ID NO 36
<211> LENGTH: 1000
<212> TYPE: DNA
<213> ORGANISM: Pichia pastoris

<400> SEQUENCE: 36

```
gtcaactgcg tactcttttg tcgaatggac tactgaatct gcctcgatag ccactatagg     60
aaggtccata gaggccagtt tttcaactag tcttggtgga aagaaaccga caaagccttt    120
catggagtca ccgatactga aaggttcaaa caaagaatgc ttgggtagtc tcttaatacc    180
catggcaacg aaaaaggggt cttcattgtt caacatgaat tcgtatccac ctttaatgta    240
gtcataaagc tgctgaagtt ccgaatcagt gatggaactg tctacagtga caatatagga    300
gttctcaatc accttatatc cagtcgaata tatctggata gggtcgggtc tcactgtgga    360
agattcaaat gggttagatc cctgtaattt cagcgatgga gactcagtat gatggggcaa    420
ggaaaacggc aattggatat tcaattggtc aagagatggt atcaaaagcg agtgtgccag    480
ggtagccacg gtagccactg atgctaatct gataattttc atttctggag tgtcaaaaca    540
gtagtgataa aaggctatga aggaggttgt ctaggggctc gcggaggaaa gtgattcaaa    600
cagacctgcc aaaaagagaa aaaagaggga atccctgttc tttccaatgg aaatgacgta    660
actttaactt gaaaaatacc ccaaccagaa gggttcaaac tcaacaagga ttgcgtaatt    720
cctacaagta gcttagagct gggggagaga caactgaagg cagcttaacg ataacgcggg    780
gggattggtg cacgactcga aaggaggtat cttagtcttg taacctcttt tttccagagg    840
ctattcaaga ttcataggcg atatcgatgt ggagaagggt gaacaatata aaaggctgga    900
gagatgtcaa tgaagcagct ggatagattt caaattttct agatttcaga gtaatcgcac    960
aaaacgaagg aatcccacca agcaaaaaaa aaaatctaag                         1000
```

<210> SEQ ID NO 37
<211> LENGTH: 704
<212> TYPE: DNA
<213> ORGANISM: Pichia pastoris

<400> SEQUENCE: 37

```
aaattaatcc ataagataag gcaaatgtgc ttaagtaatt gaaaacagtg ttgtgattat     60
ataagcatgg tatttgaata gaactactgg ggttaactta tctagtagga tggaagttga    120
gggagatcaa gatgcttaaa gaaaaggatt ggccaatatg aaagccataa ttagcaatac    180
ttatttaatc agataattgt ggggcattgt gacttgactt ttaccaggac ttcaaacctc    240
aaccatttaa acagttatag aagacgtacc gtcacttttg cttttaatgt gatctaaatg    300
tgatcacatg aactcaaact aaaatgatat cttttactgg acaaaaatgt tatcctgcaa    360
acagaaagct ttcttctatt ctaagaagaa catttacatt ggtgggaaac ctgaaaacag    420
aaaataaata ctccccagtg accctatgag caggattttt gcatccctat tgtaggcctt    480
tcaaactcac acctaatatt tcccgccact cacactatca atgatcactt cccagttctc    540
ttcttcccct attcgtacca tgcaaccctt acacgccttt tccatttcgg ttcggatgcg    600
acttccagtc tgtggggtac gtagcctatt ctcttagccg gtatttaaac atacaaattc    660
acccaaattc taccttgata aggtaattga ttaatttcat aaat                     704
```

<210> SEQ ID NO 38
<211> LENGTH: 1000
<212> TYPE: DNA
<213> ORGANISM: Pichia pastoris

<400> SEQUENCE: 38

```
agctcagatt ggaaatgatt tttgatccta ccaagaagcc tttgatttcc agaatctccg     60
ctaagtaagt aacccccgca aacgcatgca tccatgcaaa caaaatacta acaattttag    120
```

ccccgttgtt gagaaaccca gaaaattgaa tgttcaacca atccagacga tcaataagaa 180
aaaaggccca aaggctactt ccaaacctgc tgccgccaaa cctgctcctt caaaagccgg 240
tcccaaggga ggtaagaagg tgagaaagcc aaagaagaca gttgaagaat tggatcagga 300
aatggctgac tactttgaaa ataagaatta gcccaacaaa atatgtacaa gtattatata 360
aatgaatcta catggtgtgt tttatttaga tcctccaaac caaggaaaga aactaaactt 420
atctccggac ttacgagtca aataactatc cgcagttcct tggaactcag actttcttcc 480
ataagcggtc atatcatctt tggactgtgg gaatcctgga cgaatctttg aaatgtcata 540
atcttgctct ctatctccaa gcacagcgtc cggtaaatgc tggttcttct ttctcagatg 600
aatcttggat ttaacaaata aagccgtgcc tatggctaat gtactcaaaa acaaagtctg 660
cttccagaat ttcgcaaacg atggaatgcc atttcctgta aatgtactca ttgaacctat 720
gtttgattaa agttggtgtg aagtcatcaa acgagagtaa aatcagatac tcgtgcaccg 780
gccaaaattg actgagctaa tctctgcagg cttgacatcc gaacacaaca aataggcgac 840
aaatcttaac tatctaatcg taggctatgg tagaactttg tgggggtaga ggaagactac 900
aacagcaaga caaaacaaaa gagtcatagt ttgactctct gctttttctt tctttctctt 960
ctttttcttc ctccatattc gttatttatt tcgaactgga 1000

<210> SEQ ID NO 39
<211> LENGTH: 1000
<212> TYPE: DNA
<213> ORGANISM: Pichia pastoris

<400> SEQUENCE: 39
cagccattaa tctcacctca gtttttgaat cagtagaatt tttaatgaaa caaacggttg 60
gtatattatt tgatagagtt gccaaatttc caaagataaa tttttcatca ggtaatatcc 120
tgaataccgt aacatagtga ctattggaag acactgctat catattatat ttcggataaa 180
aatccaaacc ccagaccgac ctcttgagtc tcaactccaa gtcagccgca actttaatta 240
tccgtggatt gggagctagt ttggacaacg catcagtata atataacttt acggttccat 300
tatcagacgc tattgcaaga acttcctttc cattgatctc gccaatgcgg cagtaattga 360
tatcgtaggg taggtctgga aagacgctgg cgcttgtgtc ccattctgca ggaatctctg 420
gcacggtgct aatggtagtt atccaacgga gctgaggtag tcgatatatc tggatatgcc 480
gcctatagga taaaaacagg agagggtgaa ccttgcttat ggctactaga ttgttcttgt 540
actctgaatt ctcattatgg gaaactaaac taatctcatc tgtgtgttgc agtactattg 600
aatcgttgta gtatctacct ggagggcatt ccatgaatta gtgagataac agagttgggt 660
aactagagag aataatagac gtatgcatga ttactacaca acggatgtcg cactctttcc 720
ttagttaaaa ctatcatcca atcacaagat gcgggctgga aagacttgct cccgaaggat 780
aatcttctgc ttctatctcc cttcctcata tggtttcgca gggctcatgc cccttcttcc 840
ttcgaactgc ccgatgagga agtccttagc ctatcaaaga attcgggacc atcatcgatt 900
tttagagcct tacctgatcg caatcaggat ttcactactc atataaatac atcgctcaaa 960
gctccaactt tgcttgttca tacaattctt gatattcaca 1000

<210> SEQ ID NO 40
<211> LENGTH: 1000
<212> TYPE: DNA
<213> ORGANISM: Pichia pastoris

<400> SEQUENCE: 40

```
tggttccctc tcggtccaat accaaaaata ttatcaccat acaggtctcc cttcgatacc     60
agtgcaaagt tgaaccgtgg gattaccttg gaatctacaa aaatagtgtc actcacaagt    120
ttgtcatcaa ccacgctgcc gcttgcaaag gagaactgaa catgaaggtt gttagggttt    180
gttatattgg aataagtggt ggatttgttg aaggcgaacg caccaaagct acatccgtcc    240
tgagcacact gtgaatttgt cacggaattg accaagaggt cagacgatcc tgtatcccat    300
tgagccgtta tgctttgtgg gggaaaccct atttctatcg tactaagaaa accaatggtg    360
aactcatatt cggtatcaat ggcgacgatt ccagcatagc ctgtagacag taacaacact    420
agggcaacag caactaacat atcttcattg atgaaacgtt gtgatcggtg tgacttttat    480
agtaaaagct acaactgttt gaaataccaa gatatcattg tgaatggctc aaaagggtaa    540
tacatctgaa aaacctgaag tgtggaaaat tccgatggag ccaactcatg ataacgcaga    600
agtcccattt tgccatcttc tcttggtatg aaacggtaga aaatgatccg agtatgccaa    660
ttgatactct tgattcatgc cctatagttt gcgtagggtt taattgatct cctggtctat    720
cgatctggga cgcaatgtag accccattag tggaaacact gaaagggatc caacactcta    780
ggcggacccg ctcacagtca tttcaggaca atcaccacag gaatcaacta cttctcccag    840
tcttccttgc gtgaagcttc aagcctacaa cataacactt cttacttaat ctttgattct    900
cgaattgttt acccaatctt gacaacttag cctaagcaat actctggggt tatatatagc    960
aattgctctt cctcgctgta gcgttcattc catctttcta                         1000
```

<210> SEQ ID NO 41
<211> LENGTH: 1001
<212> TYPE: DNA
<213> ORGANISM: Pichia pastoris

<400> SEQUENCE: 41

```
gatatcgatc tacacttaat agtagatgac gaggcatctc tccaataggt accatatctg     60
gtgtttcttg taatttaaga atctgttggt ctatgaatgt agatttgtca tgaacaatga    120
tatatgggtc aggaggacaa gatggtttct ctgagttggg ttgttgaggt gcctggcaag    180
acttcggagc gttgatatcc ccaagacttg tagtgaccga tagttgaagc gtgtgtttgc    240
aggaacggca catcaatgca actttcgtaa ctttggaatt gagagttgat gcactgatga    300
cgatacccga aattttgacg attttaccaa tatgacttga agacaagtct ctcattgaaa    360
ccttattatc gttactaagc aaaacgagct gacaagaagg gaaggtggtc ggtatttcct    420
cgttgttcaa atatatgatt ctcctggcaa tatctgtgat ggcctgttca aaaagtggaa    480
tcatttctgc aggatcatct accaactttt tattgagctc ctcattgaat acgattaagt    540
ggtcattttg aatcgtcagt aagtacttgt ttacaagtaa attctgtctg agttgttctc    600
tgtagatgta ctgattttcc atacgaaact ccaaaatgaa cgaacggaat gccttaatga    660
cctcactgaa ctggtcatcg ttctgttctc cgggaaggac acttgtgtta aagactgatg    720
ctctatcaaa ggacattgca acaaagtata aacggttgtg agcgggaaaa agatgtgtag    780
gtaattgtcg tagatgagac tgattcagta gaaaacgcgt cctgcactat tttttctttt    840
cttcattaca tttcctaatc gggacaaaat gaatctaaag acgtggttat gtagtacacg    900
catcgatagg ctatccccat accaaaacac tattttaccc catccttgac aggttataaa    960
tatgcgatag tatgagtatc ttcaaattca gctgaaatat c                        1001
```

<210> SEQ ID NO 42

<211> LENGTH: 1000
<212> TYPE: DNA
<213> ORGANISM: Pichia pastoris

<400> SEQUENCE: 42
aataaaaaaa cgttatagaa agaaattgga ctacgatatg ctccaatcca aattgtcaaa 60
attgaccacc gaaaaagaac aattggaatt tgacaagagg aacaactcac tagattctca 120
aacggagcgt cacctagagt cagtttccaa gtcaattaca gaaagtttgg aaacagaaga 180
ggagtatcta caattgaatt ccaaacttaa agtcgagctg tccgaattca tgtcgctaag 240
gctttcttac ttggacccca tttttgaaag tttcattaaa gttcagtcaa aaattttcat 300
ggacatttat gacacattaa agagcggact accttatgtt gattctctat ccaaagagga 360
ttatcagtcc aagatcttgg actctagaat agataacatt ctgtcgaaaa tggaagcgct 420
gaaccttcaa gcttacattg atgattagag caatgatata aacaacaatt gagtgacagg 480
tctactttgt tctcaaaagg ccataaccat ctgtttgcat ctcttatcac cacaccatcc 540
tcctcatctg gccttcaatt gtggggaaca actagcatcc caacaccaga ctaactccac 600
ccagatgaaa ccagttgtcg cttaccagtc aatgaatgtt gagctaacgt tccttgaaac 660
tcgaatgatc ccagccttgc tgcgtatcat ccctccgcta ttccgccgct tgctccaacc 720
atgtttccgc ctttttcgaa caagttcaaa tacctatctt tggcaggact tttcctcctg 780 cctttttag cctcaggtct cggttagcct ctaggcaaat tctggtcttc atacctatat 840
caacttttca tcagatagcc tttgggttca aaaaagaact aaagcaggat gcctgatata 900
taaatcccag atgatctgct tttgaaacta ttttcagtat cttgattcgt ttacttacaa 960
acaactattg ttgattttat ctggagaata atcgaacaaa 1000

<210> SEQ ID NO 43
<211> LENGTH: 1000
<212> TYPE: DNA
<213> ORGANISM: Pichia pastoris

<400> SEQUENCE: 43
attgttgtga atactctcct tcatttggat ttcttggact tcggactctc ttgatctctc 60
ttcgaaagtt ttaactctgt tcatgtataa ttttacccgc tgtaggtcgc tcataatacc 120
atgagtatgc acatctttta ctccattaac tttcaggtat gcaaaataca atgaagatag 180
tatatagctc aaagaattta gcattttgca ttgatctaat tgtgacattt tctctatgat 240
atcatctagc ttcttaaact cgagaatctc gtccaacgag gcagaaacat tgtccagtct 300
tacgtcaaga ttattcacga gtttctggac cgtatcaacg ttttccatct taagattaca 360
gtaagtatcg tccttttgaa ctgcaaaggt agaaaagtta atttttgatt tggtagtaca 420
ctatgaaact tgctcacccc aatctttcct cctgacaggt tgatctttat ccctctacta 480
aattgcccca agtgtatcaa gtagactaga tctcgcgaaa gaacagccta ataaactccg 540
aagcatgatg gcctctatcc ggaaaacgtt aagagatgtg gcaacaggag ggcacataga 600
atttttaaag acgctgaaga atgctatcat agtccgtaaa aatgtgatag tactttgttt 660
agtgcgtacg ccacttattc ggggccaata gctaaaccca ggtttgctgg cagcaaattc 720
aactgtagat tgaatctctc taacaataat ggtgttcaat cccctggctg gtcacgggga 780
ggactatctt gcgtgatccg cttggaaaat gttgtgtatc cctttctcaa ttgcggaaag 840
catctgctac ttcccatagg caccagttac ccaattgata tttccaaaaa agattaccat 900
atgttcatct agaagtataa atacaagtgg acattcaatg aatatttcat tcaattagtc 960
attgacactt tcatcaactt actacgtctt attcaacaat 1000

<210> SEQ ID NO 44
<211> LENGTH: 1000
<212> TYPE: DNA
<213> ORGANISM: Pichia pastoris

<400> SEQUENCE: 44
tatacggtct atccactttg gaaacgatgt agttgaaacg gggaagtaat agtggttccc 60
aaacgacatg aagaggttat ataagtttgc aagagggtga caccatttta gttgtggttc 120
ccgggtattt ttttaatctt tttagtctaa gatagcctcc ccagatatta ccgagttggg 180
ccatttgggg cggtatcggt ggtatctgat ggtagcgcgt ttttacatgc ctgtgcattg 240
aactggcaaa gagtatacta tcgtggggcc ctgaaggagg cagcaaatgg accgtcaatt 300
ggttgatcag ggactcaaga caggtattga gcttttcaaa caaaaagagt ataggcgctg 360
ctacaaggca tttacttcta ctatcaattt cattgagaat gatcccgagt tggccgccag 420
ctgtgtatct caactgatat ctctgttaga ttgtagggca gcctgtttgg aaaagctaga 480
tcaattgaat atggccttga aagatggtct taaaatgatc aagagagagt gccacaactg 540
caagggttat ttgagaactt gcaaaatttt agacctacaa gggaagatca gtgaggcttt 600
gtctacagca agagaaggga tctccataat agaaactaga agagatcagg ataatcaatt 660
tagatattcc aaggttcttt tggaacaatt aaaggaactg aaaaatgcac tgaaaatcaa 720
attggacaag aaaaatcagc tacacttcaa agttttaaag tttgacgcac cagtgccttg 780
tacaaagaaa ctaagattag tcactccaag aacaatagat ccttccattt ttttgccgat 840
agagctagtg aagctgatct ttcgcctgtt gaatttctca gacatgtatg cctgtttatt 900
ggtctcaaca aaatggaact caattatatc ctcatcaccg gaactgtttc gaaaacttca 960
gttgaaatcc caactgtcca acaaggcgtt aaacaattgt 1000

<210> SEQ ID NO 45
<211> LENGTH: 951
<212> TYPE: DNA
<213> ORGANISM: Artificial Sequence
<220> FEATURE:
<223> OTHER INFORMATION: pG1 promoter
<220> FEATURE:
<221> NAME/KEY: misc_feature
<222> LOCATION: (578)..(578)
<223> OTHER INFORMATION: n is (T)x wherein x is 14-16

<400> SEQUENCE: 45
caaacatttg ctccccctag tctccaggga aatgtaaaat atactgctaa tagaaaacag 60
taagacgctc agttgtcagg ataattacgt tcgactgtag taaaacagga atctgtattg 120
ttagaaagaa cgagagtttt ttacggcgcc gccatattgg gccgtgtgaa aacagcttga 180
aaccccacta ctttcaaagg ttctgttgct atacacgaac catgtttaac caacctcgct 240
tttgacttga ctgaagtcat cggttaacaa tcaagtaccc tagtctgtct gaatgctcct 300
ttccatattc agtaggtgtt tcttgcactt ttgcatgcac tgcggaagaa ttagccaata 360
gcgcgtttca tatgcgcttt taccccctct tttgtcaagc gcaaaatgcc tgtaagattt 420
ggtgggggtg tgagccgtta gctgaagtac aacaggctaa ttccctgaaa aaactgcaga 480
tagacttcaa gatctcaggg attcccacta tttggtattc tgatatgttt ttcctgatat 540
gcatcaaaac tctaatctaa aacctgaatc tccgctanga tgaccccgtt ttcgtgacaa 600

```
attaatttcc aacggggtct tgtccggata agagaatttt gtttgattat ccgttcggat    660

aaatggacgc ctgctccata tttttccggt tattacccca cctggaagtg cccagaattt    720

tccggggatt acggataata cggtggtctg gattaattaa tacgccaagt cttacatttt    780

gttgcagtct cgtgcgagta tgtgcaataa taaacaagat gagccaattt attggattag    840

ttgcagcttg accccgccat agctaggcat agccaagtgc tatgggtgtt agatgatgca    900

cttggatgca gtgagttttg gagtataaaa gatccttaaa attccaccct t             951
```

<210> SEQ ID NO 46
<211> LENGTH: 1238
<212> TYPE: DNA
<213> ORGANISM: Artificial Sequence
<220> FEATURE:
<223> OTHER INFORMATION: pG1-3 promoter

<400> SEQUENCE: 46

```
caaacatttg ctccccctag tctccaggga aatgtaaaat atactgctaa tagaaaacag     60

taagacgctc agttgtcagg ataattacgt tcgactgtag taaaacagga atctgtattg    120

ttagaaagaa cgagagtttt ttacggcgcc gccatattgg gccgtgtgaa aacagcttga    180

aaccccacta ctttcaaagg ttctgttgct atacacgaac catgtttaac caacctcgct    240

tttgacttga ctgaagtcat cggttaacaa tcaagtaccc tagtctgtct gaatgctcct    300

ttccatattc agtaggtgtt tcttgcactt ttgcatgcac tgcggaagaa ttagccaata    360

gcgcgtttca tatgcgcttt tacccctct tttgtcaagc gcaaaatgcc tgtaagattt    420

ggtgggggtg tgagccgtta gctgaagtac aacaggctaa ttccctgaaa aaactgcagc    480

tcagggattc ccactatttg gtattctgat atgtttttcc tgatatgcat caaaactcta    540

atctaaaacc tgaatctccg ctattttttt tttttttgat gaccccgttt tcgtgacaaa    600

ttaatttcca acggggtctt gtccggataa gagaattttg tttgattatc cgttcggata    660

aatggacgcc tgctccatat ttttccggtt attaccccac ctggaagtgc ccagaatttt    720

ccggggatta cggataatac ggtggtctgg attaattaat acgagatctc agggattccc    780

actatttggt attctgatat gtttttcctg atatgcatca aaactctaat ctaaaacctg    840

aatctccgct attttttttt tttttgatga ccccgttttc gtgacaaatt aatttccaac    900

ggggtcttgt ccggataaga gaattttgtt tgattatccg ttcggataaa tggacgcctg    960

ctccatattt ttccggttat taccccacct ggaagtgccc agaattttcc ggggattacg   1020

gataatacgg tggtctggat taattaatac gccaagtctt acattttgtt gcagtctcgt   1080

gcgagtatgt gcaataataa acaagatgag ccaatttatt ggattagttg cagcttgacc   1140

ccgccatagc taggcatagc caagtgctat gggtgttaga tgatgcactt ggatgcagtg   1200

agttttggag tataaaagat ccttaaaatt ccaccctt                           1238
```

<210> SEQ ID NO 47
<211> LENGTH: 1425
<212> TYPE: DNA
<213> ORGANISM: Artificial Sequence
<220> FEATURE:
<223> OTHER INFORMATION: pG1-4 promoter

<400> SEQUENCE: 47

```
caaacatttg ctccccctag tctccaggga aatgtaaaat atactgctaa tagaaaacag     60

taagacgctc agttgtcagg ataattacgt tcgactgtag taaaacagga atctgtattg    120

ttagaaagaa cgagagtttt ttacggcgcc gccatattgg gccgtgtgaa aacagcttga    180
```

```
aaccccacta ctttcaaagg ttctgttgct atacacgaac catgtttaac caacctcgct    240

tttgacttga ctgaagtcat cggttaacaa tcaagtaccc tagtctgtct gaatgctcct    300

ttccatattc agtaggtgtt tcttgcactt ttgcatgcac tgcggaagaa ttagccaata    360

gcgcgtttca tatgcgcttt taccccctct tttgtcaagc gcaaaatgcc tgtaagattt    420

ggtgggggtg tgagccgtta gctgaagtac aacaggctaa ttccctgaaa aaactgcagc    480

tcagggattc ccactatttg gtattctgat atgtttttcc tgatatgcat caaaactcta    540

atctaaaacc tgaatctccg ctattttttt tttttttgat gaccccgttt tcgtgacaaa    600

ttaatttcca acggggtctt gtccggataa gagaattttg tttgattatc cgttcggata    660

aatggacgcc tgctccatat tttccggtt attaccccac ctggaagtgc ccagaatttt    720

ccggggatta cggataatac ggtggtctgg attaattaat acgccaagtc ttacattttg    780

ttgcagtctc gtgcgagtat gtgcaataat aaacaagatg agccaattta ttggattagt    840

tgcagcttga ccccgccata gctaggcata gccaagtgct atgggtgtta gatgatgcac    900

ttggatgcag tgagttttgg agtataaaag atccttaaaa ttccaccctt agatctcagg    960

gattcccact atttggtatt ctgatatgtt tttcctgata tgcatcaaaa ctctaatcta   1020

aaacctgaat ctccgctatt tttttttttt ttgatgaccc cgttttcgtg acaaattaat   1080

ttccaacggg gtcttgtccg gataagagaa ttttgtttga ttatccgttc ggataaatgg   1140

acgcctgctc catatttttc cggttattac cccacctgga agtgcccaga attttccggg   1200

gattacggat aatacggtgg tctggattaa ttaatacgcc aagtcttaca ttttgttgca   1260

gtctcgtgcg agtatgtgca ataataaaca agatgagcca atttattgga ttagttgcag   1320

cttgaccccg ccatagctag gcatagccaa gtgctatggg tgttagatga tgcacttgga   1380

tgcagtgagt tttggagtat aaaagatcct taaaattcca ccctt                   1425
```

<210> SEQ ID NO 48
<211> LENGTH: 222
<212> TYPE: PRT
<213> ORGANISM: Artificial Sequence
<220> FEATURE:
<223> OTHER INFORMATION: Heavy chain sequence

<400> SEQUENCE: 48

```
Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Ser Tyr
            20                  25                  30

Trp Ile Gly Trp Val Arg Gln Met Pro Gly Lys Gly Leu Glu Trp Met
        35                  40                  45

Gly Ile Ile Tyr Pro Gly Asp Ser Asp Thr Arg Tyr Ser Pro Ser Phe
    50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Ala Arg Phe Phe Asp Ala Asp Met Asp Ser Trp Gly Gln Gly Thr Leu
            100                 105                 110

Val Thr Val Ser Ser Ala Ser Thr Lys Gly Pro Ser Val Phe Pro Leu
        115                 120                 125

Ala Pro Ser Ser Lys Ser Thr Ser Gly Gly Thr Ala Ala Leu Gly Cys
    130                 135                 140
```

Leu Val Lys Asp Tyr Phe Pro Glu Pro Val Thr Val Ser Trp Asn Ser
145 150 155 160

Gly Ala Leu Thr Ser Gly Val His Thr Phe Pro Ala Val Leu Gln Ser
165 170 175

Ser Gly Leu Tyr Ser Leu Ser Ser Val Val Thr Val Pro Ser Ser Ser
180 185 190

Leu Gly Thr Gln Thr Tyr Ile Cys Asn Val Asn His Lys Pro Ser Asn
195 200 205

Thr Lys Val Asp Lys Arg Val Glu Pro Lys Ser Cys Asp Lys
210 215 220

<210> SEQ ID NO 49
<211> LENGTH: 215
<212> TYPE: PRT
<213> ORGANISM: Artificial Sequence
<220> FEATURE:
<223> OTHER INFORMATION: Light chain sequence

<400> SEQUENCE: 49

Glu Ile Val Leu Thr Gln Ser Pro Ala Thr Leu Ser Leu Ser Pro Gly
1 5 10 15

Glu Arg Ala Thr Leu Ser Cys Gly Ala Ser Gln Ser Val Ser Ser Ser
20 25 30

Tyr Leu Ala Trp Tyr Gln Gln Lys Pro Gly Leu Ala Pro Arg Leu Leu
35 40 45

Ile Tyr Asp Ala Ser Ser Arg Ala Thr Gly Ile Pro Asp Arg Phe Ser
50 55 60

Gly Ser Gly Ser Gly Thr Asp Phe Thr Leu Thr Ile Ser Arg Leu Glu
65 70 75 80

Pro Glu Asp Phe Ala Val Tyr Tyr Cys Gln Gln Tyr Ser Asn Asn Ser
85 90 95

Val Thr Phe Gly Gln Gly Thr Lys Val Glu Ile Lys Arg Thr Val Ala
100 105 110

Ala Pro Ser Val Phe Ile Phe Pro Pro Ser Asp Glu Gln Leu Lys Ser
115 120 125

Gly Thr Ala Ser Val Val Cys Leu Leu Asn Asn Phe Tyr Pro Arg Glu
130 135 140

Ala Lys Val Gln Trp Lys Val Asp Asn Ala Leu Gln Ser Gly Asn Ser
145 150 155 160

Gln Glu Ser Val Thr Glu Gln Asp Ser Lys Asp Ser Thr Tyr Ser Leu
165 170 175

Ser Ser Thr Leu Thr Leu Ser Lys Ala Asp Tyr Glu Lys His Lys Val
180 185 190

Tyr Ala Cys Glu Val Thr His Gln Gly Leu Ser Ser Pro Val Thr Lys
195 200 205

Ser Phe Asn Arg Gly Glu Cys
210 215

<210> SEQ ID NO 50
<211> LENGTH: 218
<212> TYPE: PRT
<213> ORGANISM: Artificial Sequence
<220> FEATURE:
<223> OTHER INFORMATION: Heavy chain sequence

<400> SEQUENCE: 50

Asp Val Gln Leu Gln Glu Ser Gly Pro Ser Leu Val Lys Pro Ser Gln

-continued

```
1               5                   10                  15

Thr Leu Ser Leu Thr Cys Ser Val Thr Gly Asp Ser Ile Thr Ser Asp
            20                  25                  30

Tyr Trp Ser Trp Ile Arg Lys Phe Pro Gly Asn Arg Leu Glu Tyr Met
        35                  40                  45

Gly Tyr Val Ser Tyr Ser Gly Ser Thr Tyr Tyr Asn Pro Ser Leu Lys
    50                  55                  60

Ser Arg Ile Ser Ile Thr Arg Asp Thr Ser Lys Asn Gln Tyr Tyr Leu
65                  70                  75                  80

Asp Leu Asn Ser Val Thr Thr Glu Asp Thr Ala Thr Tyr Tyr Cys Ala
                85                  90                  95

Asn Trp Asp Gly Asp Tyr Trp Gly Gln Gly Thr Leu Val Thr Val Ser
            100                 105                 110

Ser Ala Ser Thr Lys Gly Pro Ser Val Phe Pro Leu Ala Pro Ser Ser
        115                 120                 125

Lys Ser Thr Ser Gly Gly Thr Ala Ala Leu Gly Cys Leu Val Lys Asp
    130                 135                 140

Tyr Phe Pro Glu Pro Val Thr Val Ser Trp Asn Ser Gly Ala Leu Thr
145                 150                 155                 160

Ser Gly Val His Thr Phe Pro Ala Val Leu Gln Ser Ser Gly Leu Tyr
                165                 170                 175

Ser Leu Ser Ser Val Val Thr Val Pro Ser Ser Ser Leu Gly Thr Gln
            180                 185                 190

Thr Tyr Ile Cys Asn Val Asn His Lys Pro Ser Asn Thr Lys Val Asp
        195                 200                 205

Lys Arg Val Glu Pro Lys Ser Cys Asp Lys
    210                 215


<210> SEQ ID NO 51
<211> LENGTH: 214
<212> TYPE: PRT
<213> ORGANISM: Artificial Sequence
<220> FEATURE:
<223> OTHER INFORMATION: Light chain sequence

<400> SEQUENCE: 51

Asp Ile Val Leu Thr Gln Ser Pro Ala Thr Leu Ser Val Thr Pro Gly
1               5                   10                  15

Asn Ser Val Ser Leu Ser Cys Arg Ala Ser Gln Ser Ile Gly Asn Asn
            20                  25                  30

Leu His Trp Tyr Gln Gln Lys Ser His Glu Ser Pro Arg Leu Leu Ile
        35                  40                  45

Lys Tyr Ala Ser Gln Ser Ile Ser Gly Ile Pro Ser Arg Phe Ser Gly
    50                  55                  60

Ser Gly Ser Gly Thr Asp Phe Thr Leu Ser Ile Asn Ser Val Glu Thr
65                  70                  75                  80

Glu Asp Phe Gly Met Tyr Phe Cys Gln Gln Ser Asn Ser Trp Pro Tyr
                85                  90                  95

Thr Phe Gly Gly Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
```

-continued

```
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210


<210> SEQ ID NO 52
<211> LENGTH: 89
<212> TYPE: DNA
<213> ORGANISM: Artificial Sequence
<220> FEATURE:
<223> OTHER INFORMATION: primer

<400> SEQUENCE: 52

tactaatatt acctttacag aattctttcc actcctccaa tgttttagtt agaggtgccg      60

atgatggtag agacttctac aagatcttg                                        89
```

HELPER FACTORS FOR EXPRESSING PROTEINS IN YEAST

TECHNICAL FIELD

The invention refers to a method for the production of a heterologous protein of interest (POI) in an engineered yeast host cell by co-expressing one or more helper factors.

BACKGROUND

Most biopharmaceutical proteins are secreted from their natural producer cells to reach their site of action and also due to downstream reasons, it is reasonable to produce also the recombinant protein in a secretory manner. In the lumen of the endoplasmic reticulum (ER), the folding of the protein into its native conformation takes place with the help of molecular chaperones and other folding assistant factors. Newly synthesized polypeptides have to fold into their native conformation in the presence of many other unfolded proteins. Exposed hydrophobic patches (which are normally buried in the core of a native folded protein) or unpaired cysteines of unfolded proteins might interact with each other, forming aggregates. Molecular chaperones and other folding assistant factors associate with the nascent protein to prevent aggregation and promote correct folding. The ER chaperone system is strongly conserved from yeast to mammals, but despite this fact, there are differences between lower eukaryotes and mammals.

The key factor of the ER folding machinery is the chaperone BiP (in yeast referred to as Kar2), which binds most proteins during translocation into the lumen of the ER. Nucleotide exchange factors (NEFs), such as Lhs1 in yeast (GRP170 in human cells) or Sil1p in yeast (SIL1 in human cells) and J-proteins (such as Jem1, Scj1 in yeast (ERdj3 in human cells), or Sec63 (ERdj2)) are co-chaperons of BiP/Kar2. There are seven different ERdj proteins (J-domain proteins, JDP) present in the mammalian ER, whereas only five homologues are present in yeast.

Co-overexpression of chaperones has been performed in various studies with different hosts, different reporter proteins and with chaperones of different origins. This led in some cases to enhancement of the production of the protein of interest, but in other cases, engineering did not have significant implications. On the contrary, sometimes it even had a diminishing effect on the productivity, depending on the protein to be produced and the host cells. BiP/Kar2, a central factor with a broad client spectrum, was chosen for many co-overexpression experiments. For example, Kar2 overexpression in *S. cerevisiae* enhanced the secretion of different scFvs approximately five-fold (Shusta E et al. Nat Biotechnol 1998, 16(8):773-777).

WO2006/136831A1 discloses overexpression of two or more helper proteins for enhanced protein production, listing all possible yeast helper factors.

The individual and simultaneous overexpression of several BiP/Kar2 co-chaperones had different effects on the secretion of recombinant proteins in *S. cerevisiae* (Payne T et al. Appl Environ Microbiol 2008, 74(24):7759-7766). More chaperone co-overexpression studies are summarized in Delic et al. 2014 (Antioxid Redox Signal 2014, 21(3): 414-437).

Ruijter el al. (Microb. Cell Fact. 2016, 15:87) describe antibody folding and secretion in *S. cerevisiae*. Yeast helper factors such as ERO1, KAR2, LHS1 and SIL1 had a mild or even negative effect to antibody secretion efficiency. Combining genes for ER enhancement did not induce any additional effect compared to just one element.

Koskela et al. (Biotechnol. J. 2017, 12:1600631) describe improvements in antibody secretion in *S. cerevisiae* by co-expressing individual folding factors. Co-expressing any of the mammalian chaperone BiP, GRP170 or FKBP2 increased antibody product yields, however, it was found that overexpression of a second folding factor in a strain that had already displayed a high specific product yield did not result in an additional benefit. It was found that the combination of folding factors was not improving antibody titers, assumably because of the overload of multiple protein expression.

WO2020002494A1 discloses increased protein expression by overexpressing at least one polynucleotide encoding at least one transcription factor, preferably Msn4/2. Additionally, overexpression of one or more helper factors such as Kar2p, Lhs1p, Sil1p or Erj5p is described.

EP2210940A1 discloses high-level secretory production of a protein in a transformed yeast having one or more types of chaperone protein genes and via suppression of O sugar inherent to the yeast. Expression vectors are disclosed which comprise a combination of genes, such as genes encoding PDI, ERO1-Lα, ERO1-Lβ, or GRP78 derived from a human, or a homologous gene thereof.

EP3196304A1 discloses high-level secretory production of a protein in a transformed yeast into which a chaperone gene e.g., Kar2 derived from *Ogataea minuta* has been introduced and in which the aox1 gene and/or the protease gene have been disrupted.

WO2014011723A1 discloses production of native recombinant secreted human endoplasmic reticulum chaperones by using their native signal sequences in a yeast expression system. The human endoplasmic reticulum recombinant chaperone protein may be selected from the group consisting of BiP/GRP78, calreticulin, and ERp57.

WO2014093950A1 discloses a fusion construct comprising a polynucleotide encoding an NF-KB-activating domain of Flagellin in operable linkage with a polynucleotide encoding an ATP-binding domain truncated Grp170, and a recombinant Flagrp170 protein to treat cancer or infectious disease. The Flagrp170 protein complex can further include additional stress polypeptides, including members of the hsp70, hsp90, grp78 and grp94 stress protein families.

WO2009105357A1 discloses lower eukaryotic host cells for producing recombinant glycoproteins with reduced O-glycosylation, by disrupting or deleting the function of at least one endogenous gene encoding a chaperone protein such as Protein Disulphide Isomerase (PDI), and by expressing a nucleic acid molecule encoding at least one mammalian homolog of the endogenous chaperone protein. Further disclosed is a chimeric BiP gene, in which the human ATPase domain is replaced by the ATPase domain of *Pichia pastoris* KAR2, fused to the human BiP peptide binding domain, under the control of the KAR2, or another ER-specific promoter from *Pichia pastoris*. There is a need for host cells engineered to improve the yield of expression products.

SUMMARY OF THE INVENTION

It is the object of the invention to provide host cells which are modified to co-express a helper factor, to improve the expression of a heterologous protein of interest (POI), and to provide methods of producing a POI by co-expressing a helper factor in a host cell.

The object is solved by the subject matter as claimed and as further described herein.

The invention provides for a method for producing of a protein of interest (POI) in a yeast host cell that is modified to comprise within one or more expression cassettes heterologous nucleic acid molecules encoding helper factors and a gene of interest (GOI) encoding the POI, wherein:

a) a first helper factor comprises at least 90% sequence identity to SEQ ID NO:1;

b) a second helper factor comprises at least 90% sequence identity to SEQ ID NO:3; and c) a third helper factor comprises at least 90% sequence identity to SEQ ID NO:5;

which method comprises (i) culturing said host cell in a culture medium under conditions to co-express said heterologous nucleic acid molecules and to secrete said POI into the host cell culture; and (ii) recovering the POI from the host cell culture.

Specifically, by such method, secretion of the POI is increased.

According to a specific aspect, a method is provided for increasing the secretion of a POI in a yeast host cell, which is modified to co-express or overexpress in said host cell:

a) at least one polynucleotide encoding at least a first helper factor comprising at least 90% sequence identity to SEQ ID NO:1; and b) at least one polynucleotide encoding at least a second helper factor comprising at least 90% sequence identity to SEQ ID NO:3; and c) at least one polynucleotide encoding at least a third helper factor comprising at least 90% sequence identity to SEQ ID NO:5;

thereby increasing the secretion of the POI in comparison to a host cell which has not been modified to co-express or overexpress said polynucleotides of a), b) and c).

According to a specific aspect, the method comprises isolating and/or purifying the POI, thereby recovering the POI.

According to a specific aspect, any one, two, or three of the first, second or third helper factors is a mammalian protein, including naturally-occurring isoforms, such as for example of human, mouse, hamster, or ape origin, preferably a human protein.

According to a specific aspect, the first helper factor is a chaperone, and the second and third helper factors are co-chaperones, in particular wherein the second helper factor is a NEF (negative regulatory factor) protein, and/or the third helper factor is a Hsp40 (heat shock protein 40 kD, J protein).

According to another specific aspect, any one, two, or three of the first, second or third helper factors is an artificial protein, such as a protein which differs from a naturally-occurring protein by only a few mutations, in particular point mutations. Preferred embodiments refer to helper factors which are of at least any one of 90, 91, 92, 93, 94, 95, 96, 97, 98, or 99% sequence identity to a mammalian, in particular human protein.

Specifically, the first helper factor comprises or consists of a protein that is characterized by at least any one of 90, 91, 92, 93, 94, 95, 96, 97, 98, or 99% sequence identity to SEQ ID NO:1, or comprises or consists of a protein that is characterized by an amino acid sequence 100% identical to SEQ ID NO:1.

Specifically, the first helper factor is encoded by a nucleotide sequence comprising or consisting of:

i) any one of 90, 91, 92, 93, 94, 95, 96, 97, 98, or 99% sequence identity to SEQ ID NO:2, or a codon-optimized variant of SEQ ID NO:2 optimized for its expression in a yeast host cell, or ii) 100% sequence identity to SEQ ID NO:2, or a codon-optimized variant of SEQ ID NO:2 optimized for its expression in a yeast host cell, such as SEQ ID NO:7.

Specifically, the second helper factor comprises or consists of a protein that is characterized by at least any one of 90, 91, 92, 93, 94, 95, 96, 97, 98, or 99% sequence identity to SEQ ID NO:3, or comprises or consists of a protein that is characterized by an amino acid sequence 100% identical to SEQ ID NO:3.

Specifically, the second helper factor is encoded by a nucleotide sequence comprising or consisting of:

i) any one of 90, 91, 92, 93, 94, 95, 96, 97, 98, or 99% sequence identity to SEQ ID NO:4, or a codon-optimized variant of SEQ ID NO:4 optimized for its expression in a yeast host cell, or ii) 100% sequence identity to SEQ ID NO:4, or a codon-optimized variant of SEQ ID NO:4 optimized for its expression in a yeast host cell, such as SEQ ID NO:8.

Specifically, the third helper factor comprises or consists of a protein that is characterized by at least any one of 90, 91, 92, 93, 94, 95, 96, 97, 98, or 99% sequence identity to SEQ ID NO:5, or comprises or consists of a protein that is characterized by an amino acid sequence 100% identical to SEQ ID NO:5.

Specifically, the third helper factor is encoded by a nucleotide sequence comprising or consisting of:

i) any one of 90, 91, 92, 93, 94, 95, 96, 97, 98, or 99% sequence identity to SEQ ID NO:6, or a codon-optimized variant of SEQ ID NO:6 optimized for its expression in a yeast host cell, or ii) 100% sequence identity to SEQ ID NO:6, or a codon-optimized variant of SEQ ID NO:6 optimized for its expression in a yeast host cell, such as SEQ ID NO:9.

Specifically, said first helper factor comprises or consists of human Binding immunoglobulin Protein (hBiP) comprising the amino acid sequence SEQ ID NO:1, or a variant thereof which is naturally occurring in a human being.

Specifically, said second helper factor comprises or consists of human Grp170 nucleotide exchange factor (hGrp170) comprising the amino acid sequence SEQ ID NO:3, or a variant thereof which is naturally-occurring in a human being.

Specifically, said second helper factor comprises or consists of human ERdj3 (hERdj3) comprising the amino acid sequence SEQ ID NO:5, or a variant thereof which is naturally-occurring in a human being.

Specifically, a) said first helper factor comprises or consists of human Binding immunoglobulin Protein (hBiP) comprising the amino acid sequence SEQ ID NO:1 or a human variant thereof; and/or b) said second helper factor comprises or consists of human Grp170 nucleotide exchange factor (hGrp170) comprising the amino acid sequence SEQ ID NO:3 or a human variant thereof, and/or c) said third helper factor comprises or consists of human ERdj3 (hERdj3) comprising the amino acid sequence SEQ ID NO:5 or a human variant thereof.

Specifically, said first helper factor is encoded by SEQ ID NO:2, or a codon-optimized variant of SEQ ID NO:2 that is optimized for expressing said first helper factor in the host cell.

Specifically, said second helper factor is encoded by SEQ ID NO:4, or a codon-optimized variant of SEQ ID NO:4 that is optimized for expressing said second helper factor in the host cell.

Specifically, said third helper factor is encoded by SEQ ID NO:6, or a codon-optimized variant of SEQ ID NO:6 that is optimized for expressing said third helper factor in the host cell.

According to a specific aspect, the said one or more expression cassettes are heterologous expression cassettes, each comprising or consisting of an artificial fusion of polynucleotides, including a promoter operably linked to a heterologous polynucleotide, such as a nucleic acid molecule encoding any of the helper factors or the GOI, as described herein.

Specifically, the expression cassette(s) referred to herein include at least one promoter and the polynucleotide to be expressed under transcriptional control of said promoter, and optionally further regulatory sequences, such as selected from the group consisting of ribosomal binding sites, transcriptional start or stop sequences, translational start or stop sequences, enhancer or activator sequences, repressor or inhibitor sequences, signal or leader sequences, in particular those which control the expression and/or secretion of a protein.

Specifically, an expression cassette is used which is heterologous to the host cell, in particular wherein the expression cassette comprises a promoter operably linked to a polynucleotide, wherein the promoter and the polynucleotide are heterologous to each other, meaning that they are not occurring in such combination in nature e.g., wherein either one (or only one) of the promoter and polynucleotide is artificial or heterologous to the other and/or to the host cell described herein; the promoter is an endogenous promoter and the polynucleotide is a heterologous polynucleotide; or the promoter is an artificial or heterologous promoter and the polynucleotide is an endogenous polynucleotide; wherein both, the promoter and polynucleotide, are artificial, heterologous or from different origin, such as from a different species or type (strain) of cells compared to the host cell described herein. Specifically, the promoter is not naturally associated with and/or not operably linked to said polynucleotide in the cell which is used as a host cell described herein.

According to a specific aspect, the host cell is a recombinant host cell comprising at least one heterologous gene of interest expression cassette (GOIEC), which comprises an expression cassette promoter operably linked to the GOI, wherein at least one component or combination of components comprised in the GOIEC is heterologous to the host cell. Specifically, an artificial expression cassette is used, in particular wherein the promoter and GOI are heterologous to each other, not occurring in such combination in nature e.g., wherein either one (or only one) of the promoter and GOI is artificial or heterologous to the other and/or to the host cell described herein; the promoter is an endogenous promoter and the GOI is a heterologous GOI; or the promoter is an artificial or heterologous promoter and the GOI is an endogenous GOI; wherein both, the promoter and GOI, are artificial, heterologous or from different origin, such as from a different species or type (strain) of cells compared to the host cell described herein.

According to a specific aspect, any one or more (or all) of the heterologous expression cassettes is comprised in one or more autonomously replicating vectors or plasmids, or integrated within a chromosome of said host cell.

An expression cassette may be introduced into the host cell and integrated into the host cell genome (or any of its chromosomes) as intrachromosomal element e.g., at a specific site of integration or randomly integrated, whereupon a high producer host cell line is selected. Alternatively, an expression cassette may be integrated within an extrachromosomal genetic element, such as a plasmid or an artificial chromosome e.g., a yeast artificial chromosome (YAC). According to a specific example, an expression cassette is introduced into the host cell by a vector, in particular an expression vector, which is introduced into the host cell by a suitable transformation or transfection technique. For this purpose, the heterologous polynucleotide(s) to be expressed (in particular the GOD may be ligated into an expression vector.

A preferred yeast expression vector (which is preferably used for expression in yeast) is selected from the group consisting of plasmids derived from pPICZ, pGAPZ, pPIC9, pPICZalfa, pGAPZalfa, pPIC9K, pGAPHis, pPUZZLE or GoldenPiCS.

Techniques for transfecting or transforming host cells for introducing a vector or plasmid are well known in the art. These can include electroporation, spheroplasting, lipid vesicle mediated uptake, heat shock mediated uptake, calcium phosphate mediated transfection (calcium phosphate/DNA co-precipitation), viral infection, and particularly using modified viruses such as, for example, modified adenoviruses, microinjection and electroporation.

As used herein, the term “transforming” a yeast cell is understood to encompass “transfecting” the same.

Yeast transformants as described herein can be obtained by introducing the expression cassette, vector or plasmid DNA into a host and selecting transformants which express the relevant protein or selection marker. Host cells can be treated to introduce heterologous or foreign DNA by methods conventionally used for transformation of host cells, such as the electric pulse method, the protoplast method, the lithium acetate method, and modified methods thereof. *P. pastoris* is preferably transformed by electroporation.

Preferred methods of transformation for the uptake of the recombinant DNA fragment by the microorganism include chemical transformation, electroporation or transformation by protoplastation.

According to a specific aspect, an expression cassette is used comprising or consisting of an artificial fusion of polynucleotides, including a promoter operably linked to the heterologous polynucleotide, and optionally further sequences, such as a signal, leader, or a terminator sequence.

Specifically, the expression cassette comprises signal and leader sequences, as necessary to express and produce the helper factors and/or the POI as secreted proteins.

According to a specific aspect, the expression cassette comprising the GOI comprises a nucleotide sequence encoding a signal peptide enabling the secretion of the POI. Specifically, the nucleotide sequence encoding the signal peptide is fused adjacent to the 5'-end of the GOI.

According to a specific aspect, any one or more, preferably each of the coding heterologous nucleic acid molecules is fused at the 5'-end to a nucleotide sequence encoding a secretion signal sequence, preferably a heterologous secretion signal sequence.

According to a specific aspect, each of said helper factors is expressed employing an N-terminal secretion signal sequence. Specifically, the nucleotide sequence encoding the signal peptide is fused adjacent to the 5'-end of the nucleic acid molecule encoding the helper factor.

The signal sequence may be of a native signal sequence, herein understood as the signal sequence which is co-expressed, fused or otherwise associated with the naturally-occurring protein, to secrete such protein upon expression. For example, a native secretion signal sequence is typically a human or mammalian signal sequence co-expressed, fused or otherwise associated with the respective human and mammalian protein to be secreted. Alternatively, a yeast signal sequence, or an artificial secretion signal sequence, in particular a signal sequence which is of at least any one of 85%, 90%, or 95% sequence identity to a naturally-occurring one, can be used.

According to a specific aspect, the signal peptide is selected from the group consisting of signal sequences from *S. cerevisiae* alpha-mating factor prepro peptide, *S. cerevisiae* Kar2 signal sequence, the signal peptides from the *P. pastoris* acid phosphatase gene (PHO1) and the extracellular protein X (EPX1) (Heiss, S., V. Puxbaum, C. Gruber, F. Altmann, D. Mattanovich & B. Gasser, Microbiology 2015; 161(7):1356-68) or the signal sequences of the human factors BiP, Grp170 and ERdj3.

Specifically, any of the signal and/or leader sequences as described in WO2014067926 A1 can be used, in particular SEQ ID NO:10, SEQ ID NO:11 (such as encoded by SEQ ID NO:12), or SEQ ID NO:13, which are described herein.

Specifically, signal sequences as described in WO2012152823 A1 can be used, in particular the signal sequence of native alpha mating factor of *S. cerevisiae*, such as described herein by SEQ ID NO:14, or mutants thereof.

According to a specific aspect, any one two or three of the helper factors is expressed employing a native signal sequence, in particular a human or non-human mammalian signal sequence, or a yeast signal sequence, in particular of *S. cerevisiae* origin, such as a Kar2 signal sequence, identified by SEQ ID NO:17, or an artificial sequence comprising at least any one of 85%, 90%, or 95% sequence identity to any of the human, non-human mammalian, or yeast signal sequences, and being functional to secrete such protein upon expression.

Exemplary secretion signal sequences are selected from the group consisting of SEQ ID NO:10, 11, 13, 14, 15, 16, 17, and 19.

A specifically preferred secretion signal sequence used to secrete the first helper factor is of human origin, such as signal sequence identified by SEQ ID NO:15, or an artificial secretion signal sequence comprising at least any one of 85%, 90%, or 95% sequence identity to SEQ ID NO:15, and being functional to secrete such protein upon expression.

A specifically preferred secretion signal sequence used to secrete is of yeast origin, in particular of *S. cerevisiae* origin, such as a Kar2 signal sequence, identified by SEQ ID NO:17, or an artificial secretion signal sequence comprising at least any one of 85%, 90%, or 95% sequence identity to SEQ ID NO:17, and being functional to secrete such protein upon expression.

A specifically preferred secretion signal sequence used to secrete the third helper factor is of human origin, such as signal sequence identified by SEQ ID NO:19, or an artificial secretion signal sequence comprising at least any one of 85%, 90%, or 95% sequence identity to SEQ ID NO:19, and being functional to secrete such protein upon expression.

According to a specific aspect, any one two or three of the helper factors is expressed employing a C-terminal endoplasmic reticulum (ER) retention sequence, which is functional in said yeast host cell. Specifically, each of said first and second helper factors comprises a C-terminal ER retention sequence, which is functional in said yeast.

Specifically, the nucleotide sequence encoding the ER retention sequence is incorporated into the respective protein coding sequence as a 3'-terminal sequence, or fused adjacent to the 3'-end of the nucleic acid molecule encoding the helper factor.

The ER retention sequence may be a native ER retention sequence, herein understood as the sequence which is co-expressed, fused or otherwise associated with the naturally-occurring protein, to retain such protein at the ER upon secretion. For example, a native ER retention sequence is typically a human or mammalian signal sequence co-expressed, fused or otherwise associated with the respective human and mammalian protein to be secreted. Alternatively, a yeast ER retention sequence, or an artificial ER retention sequence, in particular an ER retention sequence which is of at least any one of 85%, 90%, or 95% sequence identity to a naturally-occurring one and being functional to retain such protein at the ER upon secretion, can be used.

Specific ER retention sequences comprise or consist of four contiguous amino acids including the C-terminus. An exemplary ER retention sequence is any one of KDEL (SEQ ID NO:20), NDEL (SEQ ID NO:21), RDEL (SEQ ID NO:22) or DDEL (SEQ ID NO:23).

According to specific examples, the first and/or second helper factor is/are expressed with a C-terminal ER retention sequence which is any one of SEQ ID NO:20, SEQ ID NO:21, SEQ ID NO:22 or SEQ ID NO:23.

Specifically, the first helper factor is expressed with the C-terminal ER retention sequence SEQ ID NO:20, though an alternative one can be used.

Specifically, the second helper factor is expressed with the C-terminal ER retention sequence SEQ ID NO:21, though an alternative one can be used.

Specifically, a heterologous promoter is used to express any of the helper factors and/or the GOI, such as heterologous to the polynucleotide to be expressed and/or heterologous to the host cell.

According to a specific aspect, any one, two or three of the helper factors, and/or the GOI is expressed employing a constitutive promoter, such as any of the promoters further described herein, in particular a strong constitutive promoter like pGAP (e.g., SEQ ID NO:24), pCS1 (e.g., SEQ ID NO:26, or a functional variant thereof, such as published in WO2014139608), pMDH3 (e.g., SEQ ID NO:29), pPOR1 (e.g., SEQ ID NO:30), or a functional variant of any of the foregoing.

Alternatively, a derepressible or repressible (herein referred to as (de)repressible), or inducible promoter may be used e.g., the native methanol-inducible promoters pAOX1 (SEQ ID NO:27) or pAOX2 (SEQ ID NO:28), or any of the native methanol-inducible promoters of *P. pastoris* (e.g., SEQ ID NO:31-44, published by Gasser, Steiger, & Mattanovich, 2015), or any other carbon source regulatable promoter, such as pG1-pG8 and pG1-x, in particular pG1 (e.g., SEQ ID NO:45), pG1-3 (e.g., SEQ ID NO:46, such as referred to as pG1-D1240, or pG1-4 (e.g., SEQ ID NO:47, such as referred to as pG1-D1427), published in WO2013050551 and WO2017021541, or a fragment of any of the foregoing with a length of at least 300, 400, or 500 bp (in particular including the 3'-end), or a functional variant of any of the foregoing.

Specifically, a functional variant of a promoter described herein comprises at least any one of 80%, 85%, 90%, 95%, or 100% sequence identity to the promoter from which it is derived, over the full-length or the part at the 3'-end of the promoter sequence which part has a length of at least 300, 400, or 500 bp, and is functional to operatively control expression of the polynucleotide to be expressed, in particular with about the same promoter activity (e.g. +/− any one of 50%, 40%, 30%, 20%, or 10%), although the promoter activity may be improved as compared to the promoter from which it is derived. Specific functional promoter variants of pG1-3 or pG1-4 are those comprising at least two main regulatory regions and/or at least two core regulatory regions, and/or at least two T motifs, as indicated in FIG. 1.

According to a specific aspect, the GOI is expressed using an inducible or (de)repressible promoter, such as any of the promoters further described herein, in particular a methanol-inducible or a carbon source (other than methanol) regulatable (inducible or (de)repressible) promoter.

Specifically, the helper factors are expressed under the control of a constitutive promoter, and the GOI is expressed under the control of an inducible or (de)repressible promoter.

Further examples of suitable promoter sequences are described in Prielhofer et al. (BMC Syst Biol. 2017. 11(1): 123. doi: 10.1186/s12918-017-0492-3) and Mattanovich et al. (Methods Mol. Biol. (2012) 824:329-58) and include glycolytic enzymes like triosephosphate isomerase (TPI), phosphoglycerate kinase (PGK), glyceraldehyde phosphate dehydrogenase (GAPDH or GAP) and variants thereof, lactase (LAC) and galactosidase (GAL), *P. pastoris* glucose-6-phosphate isomerase promoter (PPGI), the 3-phosphoglycerate kinase promoter (pPGK), the glycerol aldehyde phosphate dehydrogenase promoter (pGAP), translation elongation factor promoter (PTEF), and the promoters of *P. pastoris* enolase 1 (pENO1), triose phosphate isomerase (pTPI), ribosomal subunit proteins (pRPS2, pRPS7, pRPS31, pRPL1), alcohol oxidase promoter (pAOX1, pAOX2) or variants thereof with modified characteristics, the formaldehyde dehydrogenase promoter (pFLD), isocitrate lyase promoter (pICL), alpha-ketoisocaproate decarboxylase promoter (pTHI), the promoters of heat shock protein family members (pSSA1, pHSP90, pKAR2), 6-Phosphogluconate dehydrogenase (pGND1), phosphoglycerate mutase (pGPM1), transketolase (pTKL1), phosphatidylinositol synthase (pPIS1), ferro-02-oxidoreductase (pFET3), high affinity iron permease (pFTR1), repressible alkaline phosphatase (pPH08), N-myristoyl transferase (pNMT1), pheromone response transcription factor (pMCM1), ubiquitin (pUBl4), single-stranded DNA endonuclease (pRAD2), the promoter of the major ADP/ATP carrier of the mitochondrial inner membrane (pPET9) (WO2008/128701) and the formate dehydrogenase (FMD) promoter.

Further examples of suitable promoters include *S. cerevisiae* enolase (ENO1), *S. cerevisiae* galactokinase (GAL1), *S. cerevisiae* alcohol dehydrogenase and *S. cerevisiae* glyceraldehyde-3-phosphate dehydrogenase (ADH1, ADH2, GAP), *S. cerevisiae* triose phosphate isomerase (TPI), *S. cerevisiae* metallothionein (CUP1), and *S. cerevisiae* 3-phosphoglycerate kinase (PGK), and the maltase gene promoter (MAL).

Specifically, the GOI encodes a secreted protein. Specifically, the POI is a secreted peptide, polypeptide, or protein, i.e. secreted from the host cell into the cell culture supernatant.

Specifically, the GOI is expressed with a secretion signal sequence, preferably wherein the secretion signal peptide (or a leader comprising a secretion signal peptide) is fused to the N-terminus of the POI. Any of the secretion signal sequence further described herein with respect to secretion of a helper factor can be used to secrete the POI. A specifically preferred secretion signal sequence is any one of SEQ ID NO:10, 11, 13, 14, 15, 16, 17, or 19. In specific cases, a leader may be used, such as including any of the secretion signal sequences e.g., the leader identified as SEQ ID NO:13.

According to a specific aspect, the host cell is modified to co-express said nucleic acid molecules encoding the helper factors at a level that increases level the host cell's specific productivity for said POI (μg/g yeast dry mass (YDM) per hour) and/or volumetric productivity for said POI (μg/L per hour).

When comparing the host cell described herein for the effect of the genetic modification to produce said helper factors, it is typically compared to the comparable host cell prior to or without such genetic modification. Comparison is typically made with the same host cell species or type without such genetic modification, which is engineered to produce the heterologous POI, in particular when cultured under conditions to produce said POI. However, a comparison can also be made with the same host cell species or type which is not further engineered to produce the heterologous POI. The production of said helper factors upon expression of the respective coding sequences can be determined by the amount (e.g., the level or concentration) of said helper factors produced by the host cell. Specifically, the amount can be determined by a suitable method, such as employing a Western Blot, immunofluorescence imaging, flow cytometry or mass spectrometry, in particular wherein mass spectrometry is liquid chromatography-mass spectrometry (LC-MS), or liquid chromatography tandem-mass spectrometry (LC-MS/MS).

According to a specific aspect, the host cell described herein may undergo one or more further genetic modifications e.g., for improving protein production.

Specifically, the host cell can be further engineered to modify one or more genes influencing proteolytic activity used to generate protease deficient strains, in particular a strain deficient in carboxypeptidase Y activity. Particular examples are described in WO1992017595A1. Further examples of a protease deficient *Pichia* strain with a functional deficiency in a vacuolar protease, such as proteinase A or proteinase B, are described in U.S. Pat. No. 6,153,424A. Further examples are *Pichia* strains which have an ade2 deletion, and/or deletions of one or both of the protease genes, PEP4 and PRB1, are provided by e.g., ThermoFisher Scientific.

Specifically, the host cell can be engineered to modify at least one nucleic acid sequence encoding a functional gene product, in particular a protease, selected from the group consisting of PEP4, PRB1, YPS1, YPS2, YMP1, YMP2, YMP1, DAP2, GRHI, PRD1, YSP3, and PRB3, as disclosed in WO2010099195A1.

Overexpression or underexpression of genes encoding further helper factors can be applied to enhance expression of a Gal, e.g. as described in WO2015158800A1.

Overexpression of the following genes was shown to increase POI secretion in *P. pastoris*: PP7435_Chr3-0607, PP7435_Chr3-0933, PP7435_Chr2-0220, PP7435 Chr3-0639, PP7435 Chr4-0108, PP7435 Chr1-1232, PP7435 Chr1-1225, PP7435 Chr1-0667, and PP7435 Chr4-0448.

Underexpression of the following genes was shown to increase POI secretion in *P. pastoris*: PP7435_Chr1-0176, PP7435_Chr3-1062, and PP7435_Chr4-0252

According to a specific aspect, the POI is heterologous to the host cell species.

Specifically, the POI is a eukaryotic protein, preferably a mammalian derived or related protein such as a human protein or a protein comprising a human protein sequence, or a bacterial protein or bacterial derived protein. Any such mammalian, bacterial or artificial protein not naturally-occurring in the yeast host cell is understood to be heterologous to the host cell.

According to a specific aspect, the POI is a therapeutic or diagnostic product. Preferably, the POI is a therapeutic protein functioning in mammals.

In specific cases, the POI is a multimeric protein, specifically a dimer or tetramer.

Specifically, the POI is a peptide or protein selected from the group consisting of an antigen-binding protein, a therapeutic protein, an enzyme, a peptide, a protein antibiotic, a toxin fusion protein, a carbohydrate-protein conjugate, a structural protein, a regulatory protein, a vaccine antigen, a growth factor, a hormone, a cytokine, a process enzyme, and a metabolic enzyme.

Specifically, the antigen-binding protein is selected from the group consisting of a) antibodies or antibody fragments, such as any of chimeric antibodies, humanized antibodies, bi-specific antibodies, Fab, Fd, scFv, diabodies, triabodies, Fv tetramers, minibodies, single-domain antibodies like VH, VHH, IgNARs, or V-NAR;
b) antibody mimetics, such as Adnectins, Affibodies, Affilins, Affimers, Affitins, Alphabodies, Anticalins, Avimers, DARPins, Fynomers, Kunitz domain peptides, Monobodies, or NanoCLAMPS; or
c) fusion proteins comprising one or more immunoglobulin-fold domains, antibody domains or antibody mimetics.

A specific POI is an antigen-binding molecule such as an antibody, or a fragment thereof, in particular an antibody fragment comprising an antigen-binding domain. Among specific POIs are antibodies such as monoclonal antibodies (mAbs), immunoglobulin (Ig) or immunoglobulin class G (IgG), heavy-chain antibodies (HcAb's), or fragments thereof such as fragment-antigen binding (Fab), Fd, single-chain variable fragment (scFv), or engineered variants thereof such as for example Fv dimers (diabodies), Fv trimers (triabodies), Fv tetramers, or minibodies and single-domain antibodies like VH, VHH, IgNARs, or V-NAR, or any protein comprising an immunoglobulin-fold domain. Further antigen-binding molecules may be selected from antibody mimetics, or (alternative) scaffold proteins such as e.g., engineered Kunitz domains, Adnectins, Affibodies, Affiline, Anticalins, or DARPins.

According to a specific aspect, the POI is e.g., BOTOX, Myobloc, Neurobloc, Dysport (or other serotypes of botulinum neurotoxins), alglucosidase alpha, daptomycin, YH-16, choriogonadotropin alpha, filgrastim, cetrorelix, interleukin-2, aldesleukin, teceleulin, denileukin diftitox, interferon alpha-n3 (injection), interferon alpha-nl, DL-8234, interferon, Suntory (gamma-1a), interferon gamma, thymosin alpha 1, tasonermin, DigiFab, ViperaTAb, EchiTAb, CroFab, nesiritide, abatacept, alefacept, Rebif, eptoterminalfa, teriparatide (osteoporosis), calcitonin injectable (bone disease), calcitonin (nasal, osteoporosis), etanercept, hemoglobin glutamer 250 (bovine), drotrecogin alpha, collagenase, carperitide, recombinant human epidermal growth factor (topical gel, wound healing), DWP401, darbepoetin alpha, epoetin omega, epoetin beta, epoetin alpha, desirudin, lepirudin, bivalirudin, nonacog alpha, Mononine, eptacog alpha (activated), recombinant Factor VIII+VWF, Recombinate, recombinant Factor VIII, Factor VIII (recombinant), Alphnmate, octocog alpha, Factor VIII, palifermin, indikinase, tenecteplase, alteplase, pamiteplase, reteplase, nateplase, monteplase, follitropin alpha, rFSH, hpFSH, micafungin, pegfilgrastim, lenograstim, nartograstim, sermorelin, glucagon, exenatide, pramlintide, iniglucerase, galsulfase, Leucotropin, molgramostirn, triptorelin acetate, histrelin (subcutaneous implant, Hydron), deslorelin, histrelin, nafarelin, leuprolide sustained release depot (ATRIGEL), leuprolide implant (DUROS), goserelin, Eutropin, KP-102 program, somatropin, mecasermin (growth failure), enlfavirtide, Org-33408, insulin glargine, insulin glulisine, insulin (inhaled), insulin lispro, insulin deternir, insulin (buccal, RapidMist), mecasermin rinfabate, anakinra, celmoleukin, 99 mTc-apcitide injection, myelopid, Betaseron, glatiramer acetate, Gepon, sargramostim, oprelvekin, human leukocyte-derived alpha interferons, Bilive, insulin (recombinant), recombinant human insulin, insulin aspart, mecasenin, Roferon-A, interferon-alpha 2, Alfaferone, interferon alfacon-1, interferon alpha, Avonex' recombinant human luteinizing hormone, dornase alpha, trafermin, ziconotide, taltirelin, diboterminalfa, atosiban, becaplermin, eptifibatide, Zemaira, CTC-111, Shanvac-B, HPV vaccine (quadrivalent), octreotide, lanreotide, ancestirn, agalsidase beta, agalsidase alpha, laronidase, prezatide copper acetate (topical gel), rasburicase, ranibizumab, Actimmune, PEG-Intron, Tricomin, recombinant house dust mite allergy desensitization injection, recombinant human parathyroid hormone (PTH) 1-84 (sc, osteoporosis), epoetin delta, transgenic antithrombin III, Granditropin, Vitrase, recombinant insulin, interferon-alpha (oral lozenge), GEM-21S, vapreotide, idursulfase, omnapatrilat, recombinant serum albumin, certolizumab pegol, glucarpidase, human recombinant Cl esterase inhibitor (angioedema), lanoteplase, recombinant human growth hormone, enfuvirtide (needle-free injection, Biojector 2000), VGV-1, interferon (alpha), lucinactant, aviptadil (inhaled, pulmonary disease), icatibant, ecallantide, omiganan, Aurograb, pexigananacetate, ADI-PEG-20, LDI-200, degarelix, cintredelinbesudotox, Favld, MDX-1379, ISAtx-247, liraglutide, teriparatide (osteoporosis), tifacogin, AA4500, T4N5 liposome lotion, catumaxomab, DWP413, ART-123, Chrysalin, desmoteplase, amediplase, corifollitropinalpha, TH-9507, teduglutide, Diamyd, DWP-412, growth hormone (sustained release injection), recombinant G-CSF, insulin (inhaled, AIR), insulin (inhaled, Technosphere), insulin (inhaled, AERx), RGN-303, DiaPep277, interferon beta (hepatitis C viral infection (HCV)), interferon alpha-n3 (oral), belatacept, transdermal insulin patches, AMG-531, MBP-8298, Xerecept, opebacan, AIDSVAX, GV-1001, LymphoScan, ranpirnase, Lipoxysan, lusupultide, MP52 (beta-tricalciumphosphate carrier, bone regeneration), melanoma vaccine, sipuleucel-T, CTP-37, Insegia, vitespen, human thrombin (frozen, surgical bleeding), thrombin, TransMID, alfimeprase, Puricase, terlipressin (intravenous, hepatorenal syndrome), EUR-1008M, recombinant FGF-1 (injectable, vascular disease), BDM-E, rotigaptide, ETC-216, P-113, MBI-594AN, duramycin (inhaled, cystic fibrosis), SCV-07, OPI-45, Endostatin, Angiostatin, ABT-510, Bowman Birk Inhibitor Concentrate, XMP-629, 99 mTc-Hynic-Annexin V, kahalalide F, CTCE-9908, teverelix (extended release), ozarelix, rornidepsin, BAY-504798, interleukin4, PRX-321, Pepscan, iboctadekin, rhlactoferrin, TRU-015, IL-21, ATN-161, cilengitide, Albuferon, Biphasix, IRX-2, omega interferon, PCK-3145, CAP-232, pasireotide, huN901-DMI, ovarian cancer immunotherapeutic vaccine, SB-249553, Oncovax-CL, OncoVax-P, BLP-25, CerVax-16, multi-epitope peptide melanoma vaccine (MART-1, gp100, tyrosinase), nemifitide, rAAT (inhaled), rAAT (dermatological), CGRP (inhaled, asthma), pegsunercept, thymosinbeta4, plitidepsin, GTP-200, ramoplanin, GRASPA, OBI-1, AC-100, salmon calcitonin (oral, eligen), calcitonin (oral, osteoporosis), examorelin, capromorelin, Cardeva, velafermin, 1311-TM-601, KK-220, T-10, ularitide, depelestat, hematide, Chrysalin (topical), rNAPc2, recombinant Factor V111 (PEGylated liposomal), bFGF, PEGylated recombinant staphylokinase variant, V-10153, SonoLysis Prolyse, NeuroVax, CZEN-002, islet cell neogenesis therapy, rGLP-1, BIM-51077, LY-548806, exenatide (controlled release, Medisorb), AVE-0010, GA-GCB, avorelin, ACM-9604, linaclotid eacetate, CETi-1, Hemospan, VAL (injectable), fast-acting insulin (injectable, Viadel), intranasal insulin, insulin (inhaled), insulin (oral, eligen), recombinant methionyl human leptin, pitrakinra subcutancous injection, eczema), pitrakinra (inhaled dry powder, asthma), Multikine, RG-1068, MM-093, NBI-6024, AT-001, PI-0824, Org-39141, Cpn10 (autoimmune diseases/inflammation), talactoferrin (topical), rEV-131 (ophthalmic), rEV-131 (respiratory disease), oral recombinant human insulin (diabetes), RPI-78M, oprelvekin (oral), CYT-99007 CTLA4-Ig, DTY-001, valategrast, interferon alpha-n3 (topical), IRX-3, RDP-58, Tauferon, bile salt stimulated lipase, Merispase, alaline phosphatase, EP-2104R, Melanotan-II, bremelanotide, ATL-104, recombinant human microplasmin, AX-200, SEMAX, ACV-1, Xen-2174, CJC-1008, dynorphin A, SI-6603, LAB GHRH, AER-002, BGC-728, malaria vaccine (virosomes, PeviPRO), ALTU-135, parvovirus B19 vaccine, influenza vaccine (recombinant neuraminidase), malaria/HBV vaccine, anthrax vaccine, Vacc-5q, Vacc-4x, HIV vaccine (oral), HPV vaccine, Tat Toxoid, YSPSL, CHS-13340, PTH(1-34) liposomal cream (Novasome), Ostabolin-C, PTH analog (topical, psoriasis), MBRI-93.02, MTB72F vaccine (tuberculosis), MVA-Ag85A vaccine (tuberculosis), FARA04, BA-210, recombinant plague FIV vaccine, AG-702, OxSODrol, rBetV1, Der-p1/Der-p2/Der-p7 allergen-targeting vaccine (dust mite allergy), PR1 peptide antigen (leukemia), mutant ras vaccine, HPV-16 E7 lipopeptide vaccine, labyrinthin vaccine (adenocarcinoma), CML vaccine, WT1-peptide vaccine (cancer), IDD-5, CDX-110, Pentrys, Norelin, CytoFab, P-9808, VT-111, icrocaptide, telbermin (dermatological, diabetic foot ulcer), rupintrivir, reticulose, rGRF, HA, alpha-galactosidase A, ACE-011, ALTU-140, CGX-1160, angiotensin therapeutic vaccine, D-4F, ETC-642, APP-018, rhMBL, SCV-07 (oral, tuberculosis), DRF-7295, ABT-828, ErbB2-specific immunotoxin (anticancer), DT3SSIL-3, TST-10088, PRO-1762, Combotox, cholecystokinin-B/gastrin-receptor binding peptides, 111In-hEGF, AE-37, trasnizumab-DM1, Antagonist G, IL-12 (recombinant), PM-02734, IMP-321, rhIGF-BP3, BLX-883, CUV-1647 (topical), L-19 based radioimmunotherapeutics (cancer), Re-188-P-2045, AMG-386, DC/1540/KLH vaccine (cancer), VX-001, AVE-9633, AC-9301, NY-ESO-1 vaccine (peptides), NA17.A2 peptides, melanoma vaccine (pulsed antigen therapeutic), prostate cancer vaccine, CBP-501, recombinant human lactoferrin (dry eye), FX-06, AP-214, WAP-8294A (injectable), ACP-HIP, SUN-11031, peptide YY [3-36] (obesity, intranasal), FGLL, atacicept, BR3-Fc, BN-003, BA-058, human parathyroid hormone 1-34 (nasal, osteoporosis), F-18-CCR1, AT-1100 (celiac disease/diabetes), JPD-003, PTH(7-34) liposomal cream (Novasome), duramycin (ophthalmic, dry eye), CAB-2, CTCE-0214, GlycoPEGylated erythropoietin, EPO-Fc, CNTO-528, AMG-114, JR-013, Factor XIII, aminocandin, PN-951, 716155, SUN-E7001, TH-0318, BAY 7977, teverelix (immediate release), EP-51216, hGH (controlled release, Biosphere), OGP-I, sifuvirtide, TV4710, ALG-889, Org-41259, rhCC10, F-991, thymopentin (pulmonary diseases), r(m)CRP, hepatoselective insulin, subalin, L19-IL-2 fusion protein, elafin, NMK-150, ALTU-139, EN-122004, rhTPO, thrombopoietin receptor agonist (thrombocytopenic disorders), AL-108, AL-208, nerve growth factor antagonists (pain), SLV-317, CGX-1007, INNO-105, oral teriparatide (eligen), GEM-0S1, AC-162352, PRX-302, LFn-p24 fusion vaccine (Therapore), EP-1043, *S pneumoniae* pediatric vaccine, malaria vaccine, *Neisseria meningitidis* Group B vaccine, neonatal group B streptococcal vaccine, anthrax vaccine, HCV vaccine (gpE1+gpE2+MF-59), otitis media therapy, HCV vaccine (core antigen+ISCOMATRIX), hPTH(1-34) (transdermal, ViaDerm), 768974, SYN-101, PGN-0052, aviscumnine, BIM-23190, tuberculosis vaccine, multi-epitope tyrosinase peptide, cancer vaccine, enkastim, APC-8024, GI-5005, ACC-001, TTS-CD3, vascular-targeted TNF (solid tumors), desmopressin (buccal controlled-release), onercept, or TP-9201, adalimumab (HUMIRA), infliximab (REMICADE™), rituximab (RITUXAN™/MAB THERA™), etanercept (ENBREL™), bevacizumab (AVASTIN™), trastuzumab (HERCEPTIN™), pegrilgrastim (NEULASTA™), or any other suitable POI including biosimilars and biobetters.

According to a specific aspect, the host cell can be any yeast cell. Specifically the host cell is a cell of a genus selected from the group consisting of *Pichia, Hansenula, Komagataella, Saccharomyces, Kluyveromyces, Candida, Ogataea, Yarrowia*, and *Geotrichum*, specifically *Saccharomyces cerevisiae, Pichia pastoris, Ogataea minuta, Kluyveromces lactis, Kluyveromes marxianus, Yarrowia lipolytica* or *Hansenula polymorpha*, or of filamentous fungi like *Aspergillus awamori* or *Trichoderma reesei. Preferably, the host cell is a methylotrophic yeast, preferably Pichia pastoris*. Herein *Pichia pastoris* is used synonymously for all, *Komagataella pastoris, Komagataella phaffii* and *Komagataella pseudopastoris.*

Specific examples refer to a yeast cell of a a *Pichia* genus (e.g. *Pichia pastoris, Pichia methanolica, Pichia kluyveri*, and *Pichia angusta*), *Komagataella* genus (e.g., *Komagataella pastoris, Komagataella pseudopastoris* or *Komagataella phaffii*), *Saccharomyces* genus (e.g. *Saccharomyces cerevisae, Saccharomyces kluyveri, Saccharomyces uvarum*), *Kluyveromyces* genus (e.g. *Kluyveromyces lactis, Kluyveromyces marxianus*), the *Candida* genus (e.g. *Candida utilis, Candida cacaoi, Candida boidinii*, the *Geotrichum* genus (e.g. *Geotrichum fermentans*), *Hansenula polymorpha, Yarrowia lipolytica*, or *Schizosaccharomyces pombe.*

Preferred is the species *Pichia pastoris*. Specifically, the host cell is a *Pichia pastoris* strain selected from the group consisting of CBS704, CBS2612, CBS7435, CBS9173-9189, DSMZ 70877, X-33, GS115, KM71, KM71H and SMD1168.

Sources: CBS704 (=NRRL Y-1603=DSMZ 70382), CBS2612 (=NRRL Y-7556), CBS7435 (=NRRL Y-11430), CBS9173-9189 (CBS strains: CBS-KNAW Fungal Biodiversity Centre, Centraalbureau voor Schimmelculturen, Utrecht, The Netherlands), and DSMZ 70877 (German Collection of Microorganisms and Cell Cultures); strains from Thermo Fisher, such as X-33, GS115, KM71, KM71 H and SMD1168.

Examples of preferred *S. cerevisiae* strains include W303, CEN.PK and the BY-series (EUROSCARF collection). All of the strains described above have been successfully used to produce transformants and express heterologous genes.

The invention further provides for a method of increasing the yield of a protein of interest (POI) produced by a host cell expressing a gene of interest (GOI) encoding said POI, by co-expressing heterologous nucleic acid molecules in a cell culture, that encode a) a first helper factor comprising at least 90% sequence identity to SEQ ID NO:1;
b) a second helper factor comprising at least 90% sequence identity to SEQ ID NO:3; and
c) a third helper factor comprising at least 90% sequence identity to SEQ ID NO:5.

Specifically, the yield is increased by of at least any one of 1.2 fold, 1.3 fold, 1.4 fold, 1.5 fold, 1.6 fold, 1.7 fold, 1.8 fold, 1.9 fold, 2.0 fold, 2.1 fold, 2.2 fold, 2.3 fold, 2.4 fold, 2.5 fold, 2.6 fold, 2.7 fold, 2.8 fold, 2.9 fold, 3 fold, 3.5 fold, 4 fold, 5 fold, 5.5 fold, 6 fold, 6.5 fold, 7 fold, 7.5 fold, 8 fold, 8.5 fold, 9 fold, 9.5 fold, 10 fold, 10.5 fold, 11 fold, 11.5 fold, or 12 fold, as compared to the comparable host cell expressing said GOI, which is not engineered to produce said helper factors.

The invention further provides for a polynucleotide expression system comprising one or more expression cassettes comprising heterologous nucleic acid molecules that encode:
a) a first helper factor comprising at least 90% sequence identity to SEQ ID NO:1;
b) a second helper factor comprising at least 90% sequence identity to SEQ ID NO:3; and
c) a third helper factor comprising at least 90% sequence identity to SEQ ID NO:5;
wherein said one or more expression cassettes comprise one or more expression control sequences operably linked to said heterologous nucleic acid molecules.

Specifically, the expression system described herein is characterized by the features further described herein.

Specifically, the expression system further comprises an expression cassette comprising a GOI and one or more expression control sequences operably linked to said GOI. Specifically, the expression cassette comprising the GOI is separate from the other expression cassettes expressing the helper factor coding sequences.

Specifically, the helper factor coding sequences are each comprised in separate expression cassettes. Yet, an expression cassette may be used comprising at least two or three of the helper factor coding sequences, and optionally further comprising the GOI.

The invention further provides for a yeast host cell comprising the expression system described herein, in particular the expression system comprising expression cassettes to express the three helper factor coding sequences, and the expression cassette to express the GOI.

Specifically, the yeast host cell is characterized by one or more of the features as further described herein.

According to a specific aspect, the host cell comprises one or more (e.g. multiple) heterologous expression cassettes, including e.g., one or more expression cassette(s) expressing the helper factors, and one or more (multiple) copies of an expression cassette expressing the GOI, such as at least 2, 3, 4, or 5 copies (gene copy number, GCN). Each of the copies may comprise or consist of the same or different sequences, including the GOI operably linked to expression control sequences. Specifically, for each of the helper factors, the number of coding polynucleotides per cell is about (+/−1) the same, to ensure about the same level of expressed helper factors.

The invention further provides for a method for producing a protein of interest (POI) encoded by a gene of interest (GOI) by culturing the host cell described herein under conditions to produce said POI.

According to a specific aspect, the invention further provides for the use of the host cell described herein for the production of a POI.

Specifically, the host cell is a cell line cultured in a cell culture, in particular a production host cell line.

According to a specific embodiment, the cell line is cultured under suitable batch, fed-batch or continuous culture conditions. The culture may be performed in microtiter plates, shake-flasks, or a bioreactor, and optionally starting with a batch phase as the first step, followed by a fed-batch phase or a continuous culture phase as the second step.

Specifically, said cell culture employs growing the cells in a batch phase; and culturing the cells to produce said POI in a fed-batch or a continuous cultivation phase, optionally starting with a batch phase as the first step, followed by a fed-batch phase or a continuous culture phase as the second step.

According to a specific aspect, the method described herein comprises a growing phase and a production phase.

Specifically, the method comprises the steps:
a) culturing the host cell under growing conditions (growing phase, or “growth phase”); and a further step
b) culturing the host cell under growth-limiting conditions (production phase), during which the GOI is expressed to produce said POI.

Specifically, the second step b) follows the first step a).

According to a further specific aspect, the invention provides for a method for producing a yeast host cell described herein which is capable of producing a protein of interest (POI) in a host cell culture, by genetic engineering the host cell to introduce within one or more expression cassettes, two or more heterologous nucleic acid molecules and expression control sequences operably linked to each of the heterologous nucleic acid molecules, wherein one of the nucleic acid molecules comprises a gene of interest (GOI) encoding the POI, and further one or more nucleic acid molecules encode helper factors, wherein:
a) a first helper factor comprises at least 90% sequence identity to SEQ ID NO:1;
b) a second helper factor comprises at least 90% sequence identity to SEQ ID NO:3; and
c) a third helper factor comprises at least 90% sequence identity to SEQ ID NO:5.

Specifically, the host cell is provided by genetic engineering of a wild-type host cell.

According to a specific example, the host cell may be produced by first modifying to introduce one or more expression cassettes to express said helper factors. Such modified host cell may then be further engineered to comprise the expression cassette for POI production.

According to another specific example, the host cell may be produced by first engineering to comprise the expression cassette for POI production. Such engineered host cell may be further modified to introduce one or more expression cassettes to express the helper factors.

The invention further provides for a method for producing a protein of interest (POI) in a yeast host cell, comprising the steps:
(i) genetically engineering the host cell to comprise within one or more expression cassettes heterologous nucleic acid molecules encoding helper factors and a gene of interest (GOI) encoding the POI, wherein:
a) a first helper factor comprises at least 90% sequence identity to SEQ ID NO:1;
b) a second helper factor comprises at least 90% sequence identity to SEQ ID NO:3; and
c) a third helper factor comprises at least 90% sequence identity to SEQ ID NO:5;

(ii) culturing said host cell in a culture medium under conditions to co-express said heterologous nucleic acid molecules; and (iii) recovering the POI from the host cell or culture medium.

Specifically, step i) of the method described herein is carried out before step (ii).

According to a specific example, a wild-type host cell is genetically modified according to step i) of the method described herein. Specifically, the host cell is provided upon introducing said genetic modifications into a wild-type host cell strain for expressing the heterologous polynucleotides encoding the helper factors and the POI.

Specifically, suitable method steps are employed to produce the recombinant host cell as further described herein.

Specifically, the POI can be produced by culturing the host cell in an appropriate medium, isolating the expressed POI from the cell culture, in particular from the cell culture supernatant or medium upon separating the cells, and purifying it by a method appropriate for the expressed product, in particular upon separating the POI from the cell and purifying by suitable means. Thereby, a purified POI preparation can be produced.

Specifically, the methods described herein are characterized by the features further described herein, in particular employing a recombinant host cell and/or expression system as further described herein.

FIGURES

FIG. 1: Sequences referred to herein

DETAILED DESCRIPTION OF THE INVENTION

Specific terms as used throughout the specification have the following meaning.

The term "cell" with respect to a "host cell" as used herein shall refer to a single cell, a single cell clone, or a cell line of a host cell.

The term "cell line" as used herein refers to an established clone of a particular cell type that has acquired the ability to proliferate over a prolonged period of time. A cell line is typically used for expressing an endogenous or recombinant nucleic acid molecule or gene, or products of a metabolic pathway to produce polypeptides or cell metabolites mediated by such polypeptides. A "production host cell line" or "production cell line" is commonly understood to be a cell line ready-to-use for cell culture in a bioreactor to obtain the product of a production process, such as a POI.

Specific embodiments described herein refer to a production host cell line which is engineered to co-express at least two different heterologous polynucleotides (nucleic acid molecules), in particular wherein a protein of interest is produced in a high yield by co-expressing helper factor molecules.

The host cell producing the POI as described herein is also referred to as "production host cell", and a respective cell line a "production cell line". Specific embodiments described herein refer to such POI production host cell line which is engineered to co-express helper factors, and which is characterized by a high yield of POI production.

The term "host cell" as used herein shall particularly apply to any yeast cell, which is suitably used for recombination purposes to produce a POI or a host cell metabolite. It is well understood that the term "host cell" does not include human beings. Specifically, recombinant host cells as described herein are artificial organisms and derivatives of native (wild-type) host cells. It is well understood that the host cells, methods and uses described herein, e.g., specifically referring to those comprising one or more genetic modifications, said heterologous expression cassettes or constructs, said transfected or transformed host cells and recombinant proteins, are non-naturally occurring, "man-made" or synthetic, and are therefore not considered as a result of "law of nature". Genetic modifications described herein may employ tools, methods and techniques known in the art, such as described by J. Sambrook et al., Molecular Cloning: A Laboratory Manual (3rd edition), Cold Spring Harbor Laboratory, Cold Spring Harbor Laboratory Press, New York (2001).

The term "cell culture" or "culturing" or "cultivation" as used herein with respect to a host cell refers to the maintenance of cells in an artificial, e.g., an in vitro environment, under conditions favoring growth, differentiation or continued viability, in an active or quiescent state, of the cells, specifically in a controlled bioreactor according to methods known in the industry.

When culturing a cell culture using appropriate culture media, the cells are brought into contact with the media in a culture vessel or with substrate under conditions suitable to support culturing the cells in the cell culture. Standard cell culture media and techniques are well-known in the art.

The cell cultures as described herein particularly employ techniques which provide for the production of a secreted POI, such as to obtain the POI in the cell culture medium, which is separable from the cellular biomass, herein referred to as "cell culture supernatant", and may be purified to obtain the POI at a higher degree of purity. When a protein (such as e.g., a POI) is produced and secreted by the host cell in a cell culture, it is herein understood that such proteins are secreted into the cell culture supernatant, and can be obtained by separating the cell culture supernatant from the host cell biomass, and optionally further purifying the protein to produce a purified protein preparation.

Cell culture media provide the nutrients necessary to maintain and grow cells in a controlled, artificial and in vitro environment. Characteristics and compositions of the cell culture media vary depending on the particular cellular requirements. Important parameters include osmolality, pH, and nutrient formulations. Feeding of nutrients may be done in a continuous or discontinuous mode according to methods known in the art.

Whereas a batch process is a cell culture mode in which all the nutrients necessary for culturing the cells are contained in the initial culture medium, without additional supply of further nutrients during fermentation, in a fed-batch process, after a batch phase, a feeding phase takes place in which one or more nutrients are supplied to the culture by feeding. Although in most processes the mode of feeding is critical and important, the host cell and methods described herein are not restricted with regard to a certain mode of cell culture.

A recombinant POI can be produced using the host cell and the respective cell line described herein, by culturing in an appropriate medium, isolating the expressed product or metabolite from the culture, and optionally purifying it by a suitable method.

Several different approaches for the production of the POI as described herein are preferred. A POI may be expressed, processed and optionally secreted by transforming or transfecting a host cell with an expression vector harboring recombinant DNA encoding the relevant protein, preparing a culture of the transformed or transfected cell, growing the culture, inducing transcription and POI production, and recovering the POI.

In certain embodiments, the cell culture process is a fed-batch process. Specifically, a host cell transfected with a nucleic acid construct encoding a desired recombinant POI, is cultured in a growth phase and transitioned to a production phase in order to produce a desired recombinant POI.

In another embodiment, host cells described herein are cultured in a continuous mode, e.g., employing a chemostat. A continuous fermentation process is characterized by a defined, constant and continuous rate of feeding of fresh culture medium into a bioreactor, whereby culture broth is at the same time removed from the bioreactor at the same defined, constant and continuous removal rate. By keeping culture medium, feeding rate and removal rate at the same constant level, the cell culture parameters and conditions in the bioreactor remain constant.

A stable cell culture as described herein is specifically understood to refer to a cell culture maintaining the genetic properties, specifically keeping the POI production level high, e.g. at least at a μg level, even after about 20 generations of cultivation, preferably at least 30 generations, more preferably at least 40 generations, most preferred of at least 50 generations. Specifically, a stable recombinant host cell line is provided which is considered a great advantage when used for industrial scale production.

The cell culture described herein is particularly advantageous for methods on an industrial manufacturing scale, e.g. with respect to both the volume and the technical system, in combination with a cultivation mode that is based on feeding of nutrients, in particular a fed-batch or batch process, or a continuous or semi-continuous process (e.g. chemostat).

The host cell described herein is typically tested for its capacity to express the GOI for POI production, tested for the POI yield by any of the following tests: ELISA, activity assay, capillary electrophoresis, HPLC, or other suitable tests, such as SDS-PAGE and Western Blotting techniques, or mass spectrometry.

To determine the effect of a co-expressing one or more helper factors, e.g., the effect on POI production, the host cell line may be cultured in microtiter plates, shake flask, or bioreactor using fed-batch or chemostat fermentations in comparison with strains without such genetic modification for co-expression in the respective cell.

The production method described herein specifically allows for the fermentation on a pilot or industrial scale. The industrial process scale would preferably employ volumes of at least 10 L, specifically at least 50 L, preferably at least 1 $m^3$, preferably at least 10 $m^3$, most preferably at least 100 $m^3$.

Production conditions in industrial scale are preferred, which refer to e.g., fed batch culture in reactor volumes of 100 L to 10 $m^3$ or larger, employing typical process times of several days, or continuous processes in fermenter volumes of approximately 50-1000 L or larger, with dilution rates of approximately 0.02-0.15 $h^{-1}$.

The devices, facilities and methods used for the purpose described herein are specifically suitable for use in and with culturing any desired cell line. Further, the devices, facilities and methods are suitable for culturing any yeast host cell type, and are particularly suitable for production operations configured for production of pharmaceutical and biopharmaceutical products—such as polypeptide products (POI), nucleic acid products (for example DNA or RNA), or cells and/or viruses such as those used in cellular and/or viral therapies.

In certain embodiments, the cells express or produce a product, such as a recombinant therapeutic or diagnostic product. As described in more detail herein, examples of products produced by cells include, but are not limited to, POIs such as exemplified herein including antibody molecules (e.g., monoclonal antibodies, bispecific antibodies), antibody mimetics (polypeptide molecules that bind specifically to antigens but that are not structurally related to antibodies such as e.g. DARPins, affibodies, adnectins, or IgNARs), fusion proteins (e.g., Fc fusion proteins, chimeric cytokines), other recombinant proteins (e.g., glycosylated proteins, enzymes, hormones), or viral therapeutics (e.g., anti-cancer oncolytic viruses, viral vectors for gene therapy and viral immunotherapy), cell therapeutics (e.g., pluripotent stem cells, mesenchymal stem cells and adult stem cells), vaccines or lipid-encapsulated particles (e.g., exosomes, virus-like particles), RNA (such as e.g. siRNA) or DNA (such as e.g. plasmid DNA), antibiotics or amino acids. In embodiments, the devices, facilities and methods can be used for producing biosimilars.

As mentioned, in certain embodiments, devices, facilities and methods allow for the production of eukaryotic cells, such as for example yeast cells, and/or products of said cells, e.g., POIs including proteins, peptides, or antibiotics, amino acids, nucleic acids (such as DNA or RNA), synthesized by said cells in a large-scale manner. Unless stated otherwise herein, the devices, facilities, and methods can include any desired volume or production capacity including but not limited to bench-scale, pilot-scale, and full production scale capacities.

Moreover, and unless stated otherwise herein, the devices, facilities, and methods can include any suitable reactor(s) including but not limited to stirred tank, airlift, fiber, microfiber, hollow fiber, ceramic matrix, fluidized bed, fixed bed, and/or spouted bed bioreactors. As used herein, "reactor" can include a fermentor or fermentation unit, or any other reaction vessel and the term "reactor" is used interchangeably with "fermentor." For example, in some aspects, an example bioreactor unit can perform one or more, or all, of the following: feeding of nutrients and/or carbon sources, injection of suitable gas (e.g., oxygen), inlet and outlet flow of fermentation or cell culture medium, separation of gas and liquid phases, maintenance of temperature, maintenance of oxygen and $CO_2$ levels, maintenance of pH level, agitation (e.g., stirring), and/or cleaning/sterilizing. Example reactor units, such as a fermentation unit, may contain multiple reactors within the unit, for example the unit can have 1, 2, 3, 4, 5, 10, 15, 20, 25, 30, 35, 40, 45, 50, 60, 70, 80, 90, or 100, or more bioreactors in each unit and/or a facility may contain multiple units having a single or multiple reactors within the facility. In various embodiments, the bioreactor can be suitable for batch, semi fed-batch, fed-batch, perfusion, and/or a continuous fermentation process. Any suitable reactor diameter can be used. In embodiments, the bioreactor can have a volume between about 100 mL and about 50,000 L. Non-limiting examples include a volume of 100 mL, 250 mL, 500 mL, 750 mL, 1 liter, 2 liters, 3 liters, 4 liters, 5 liters, 6 liters, 7 liters, 8 liters, 9 liters, 10 liters, 15 liters, 20 liters, 25 liters, 30 liters, 40 liters, 50 liters, 60 liters, 70 liters, 80 liters, 90 liters, 100 liters, 150 liters, 200 liters, 250 liters, 300 liters, 350 liters, 400 liters, 450 liters, 500 liters, 550 liters, 600 liters, 650 liters, 700 liters, 750 liters, 800 liters, 850 liters, 900 liters, 950 liters, 1000 liters, 1500 liters, 2000 liters, 2500 liters, 3000 liters, 3500 liters, 4000 liters, 4500 liters, 5000 liters, 6000 liters, 7000 liters, 8000 liters, 9000 liters, 10,000 liters, 15,000 liters, 20,000 liters, and/or 50,000 liters. Additionally, suitable reactors can be multi-use, single-use, disposable, or non-disposable and can be formed of any suitable material including metal alloys such as stainless steel (e.g., 316L or any other suitable stainless steel) and Inconel, plastics, and/or glass.

In embodiments and unless stated otherwise herein, the devices, facilities, and methods described herein can also include any suitable unit operation and/or equipment not otherwise mentioned, such as operations and/or equipment for separation, purification, and isolation of such products. Any suitable facility and environment can be used, such as traditional stick-built facilities, modular, mobile and temporary facilities, or any other suitable construction, facility, and/or layout. For example, in some embodiments modular clean-rooms can be used. Additionally, and unless otherwise stated, the devices, systems, and methods described herein can be housed and/or performed in a single location or facility or alternatively be housed and/or performed at separate or multiple locations and/or facilities.

Suitable techniques may encompass culturing in a bioreactor starting with a batch phase, followed by a short exponential fed batch phase at high specific growth rate, further followed by a fed batch phase at a low specific growth rate. Another suitable culture technique may encompass a batch phase followed by a fed-batch phase at any suitable specific growth rate or combinations of specific growth rate such as going from high to low growth rate over POI production time, or from low to high growth rate over POI production time. Another suitable culture technique may encompass a batch phase followed by a continuous culturing phase at a low dilution rate.

A preferred embodiment includes a batch culture to provide biomass followed by a fed-batch culture for high yields POI production.

It is preferred to culture a host cell as described herein in a bioreactor under growth conditions to obtain a cell density of at least 1 g/L cell dry weight, more preferably at least 10 g/L cell dry weight, preferably at least 20 g/L cell dry weight, preferably at least any one of 30, 40, 50, 60, 70, or 80 g/L cell dry weight. It is advantageous to provide for such yields of biomass production on a pilot or industrial scale.

A growth medium allowing the accumulation of biomass, specifically a basal growth medium, typically comprises a carbon source, a nitrogen source, a source for sulphur and a source for phosphate. Typically, such a medium comprises furthermore trace elements and vitamins, and may further comprise amino acids, peptone or yeast extract.

Preferred nitrogen sources include $NH_4H_2PO_4$, or $NH_3$ or $(NH_4)_2SO_4$;

Preferred sulphur sources include $MgSO_4$, or $(NH_4)_2SO_4$ or $K_2SO_4$;

Preferred phosphate sources include $NH_4H_2PO_4$, or $H_3PO_4$, or $NaH_2PO_4$, $KH_2PO_4$, $Na_2HPO_4$ or $K_2HPO_4$;

Further typical medium components include KCl, $CaCl_2$), and Trace elements such as: Fe, Co, Cu, Ni, Zn, Mo, Mn, I, B;

Preferably the medium is supplemented with vitamin B7;

A typical growth medium for *P. pastoris* comprises glycerol, sorbitol or glucose, $NH_4H_2PO_4$, $MgSO_4$, KCl, $CaCl_2$), biotin, and trace elements.

In the production phase a production medium is specifically used with only a limited amount of a supplemental carbon source.

Preferably the host cell line is cultured in a mineral medium with a suitable carbon source, thereby further simplifying the isolation process significantly. An example of a preferred mineral medium is one containing an utilizable carbon source (e.g., glucose, glycerol, sorbitol, methanol, ethanol, or combinations thereof), salts containing the macro elements (potassium, magnesium, calcium, ammonium, chloride, sulphate, phosphate) and trace elements (copper, iodide, manganese, molybdate, cobalt, zinc, and iron salts, and boric acid), and optionally vitamins or amino acids, e.g., to complement auxotrophies.

Specifically, the cells are cultured under conditions suitable to effect expression of the desired POI, which can be purified from the cells or culture medium, depending on the nature of the expression system and the expressed protein, e.g., whether the protein is fused to a signal peptide and whether the protein is soluble or membrane-bound. As will be understood by the skilled artisan, culture conditions will vary according to factors that include the type of host cell and particular expression vector employed.

A typical production medium comprises a supplemental carbon source, and further $NH_4H_2PO_4$, $MgSO_4$, KCl, $CaCl_2$), biotin, and trace elements.

For example, the feed of the supplemental carbon source added to the fermentation may comprise a carbon source with up to 50 wt % utilizable sugars, or up to 100% utilizable alcohols.

The fermentation preferably is carried out at a pH ranging from 3 to 8.

Typical fermentation times are about 24 to 120 hours with temperatures in the range of 20° C. to 35° C., preferably 22-30° C.

The POI is preferably expressed employing conditions to produce yields of at least 1 mg/L, preferably at least 10 mg/L, preferably at least 100 mg/L, most preferred at least 1 g/L.

The term "expression" or "expression cassette" is herein understood to refer to nucleic acid molecules (herein also referred to as "polynucleotides"), which contain a desired coding sequence, and control sequences in operable linkage, so that hosts transformed or transfected with these molecules incorporate the respective sequences and are capable of producing the encoded proteins or host cell metabolites. One or more expression cassettes are herein also understood as "expression system". The expression system may be included in an expression construct, such as a vector; however, the relevant DNA may also be integrated into a host cell chromosome. Expression may refer to secreted or non-secreted expression products, including polypeptides or metabolites.

Expression cassettes are conveniently provided as expression constructs e.g., in the form of "vectors" or "plasmids", which are typically DNA sequences that are required for the transcription of cloned recombinant nucleotide sequences, i.e. of recombinant genes and the translation of their mRNA in a suitable host organism. Expression vectors or plasmids usually comprise an origin for autonomous replication or a locus for genome integration in the host cells, selectable markers (e.g., an amino acid synthesis gene or a gene conferring resistance to antibiotics such as zeocin, kanamycin, G418 or hygromycin, nourseothricin), a number of restriction enzyme cleavage sites, a suitable promoter sequence and a transcription terminator, which components are operably linked together. The terms "plasmid" and "vector" as used herein include autonomously replicating nucleotide sequences as well as genome integrating nucleotide sequences, such as artificial chromosomes e.g., a yeast artificial chromosome (YAC).

Expression vectors may include but are not limited to cloning vectors, modified cloning vectors and specifically designed plasmids. Preferred expression vectors described herein are expression vectors suitable for expressing of a recombinant gene in a eukaryotic host cell and are selected depending on the host organism. Appropriate expression vectors typically comprise regulatory sequences suitable for expressing DNA encoding a POI in a eukaryotic host cell. Examples of regulatory sequences include promoter, operators, enhancers, ribosomal binding sites, and sequences that control transcription and translation initiation and termination. The regulatory sequences are typically operably linked to the DNA sequence to be expressed.

To allow expression of a recombinant nucleotide sequence in a host cell, a promoter sequence is typically regulating and initiating transcription of the downstream nucleotide sequence, with which it is operably linked. An expression cassette or vector typically comprises a promoter nucleotide sequence which is adjacent to the 5' end of a coding sequence, e.g., upstream from and adjacent to the coding sequence (e.g., encoding a helper factor) or gene of interest (GOI), or if a signal or leader sequence is used, upstream from and adjacent to said signal and leader sequence, respectively, to facilitate expression and secretion of the expression product (e.g., a helper factor or the POI).

Specific expression constructs described herein comprise a promoter operably linked to a nucleotide sequence encoding a helper factor or POI under the transcriptional control of said promoter. Specifically, the promoter can be used which is not natively associated with said coding sequence.

Specific expression constructs described herein comprise a polynucleotide encoding the POI linked with a leader sequence (e.g., a secretion signal sequence) which causes transport of the POI into the secretory pathway and/or secretion of the POI from the host cell. The presence of such a secretion leader sequence in the expression vector is typically required when the POI intended for recombinant expression and secretion is a protein which is not naturally secreted and therefore lacks a natural secretion leader sequence, or its nucleotide sequence has been cloned without its natural secretion leader sequence. In general, any secretion leader sequence effective to cause secretion of the POI from the host cell may be used. The secretion leader sequence may originate from yeast source, e.g. from yeast α-factor such as MFa of *Saccharomyces cerevisiae*, or yeast phosphatase, from mammalian or plant source, or others.

In specific embodiments, multicloning vectors may be used, which are vectors having a multicloning site. Specifically, a desired heterologous polynucleotide can be integrated or incorporated at a multicloning site to prepare an expression vector. In the case of multicloning vectors, a promoter is typically placed upstream of the multicloning site.

The term "gene expression", or "expressing a polynucleotide" or "expressing a nucleic acid molecule" as used herein, is meant to encompass at least one step selected from the group consisting of DNA transcription into mRNA, mRNA processing, mRNA maturation, mRNA export, translation, protein folding and/or protein transport.

The term "polynucleotide" as used herein, refers to nucleotides, either ribonucleotides or deoxyribonucleotides or a combination of both, in a polymeric unbranched form of any length. Preferably, a polynucleotide refers to deoxyribonucleotides in a polymeric unbranched form of any length. Here, nucleotides consist of a pentose sugar (deoxyribose), a nitrogenous base (adenine, guanine, cytosine or thymine) and a phosphate group. The terms "polynucleotide (s)", "nucleic acid molecule(s)" and "nucleic acid sequence (s)" are herein used interchangeably.

The term "co-express" or "co-expression" as used herein shall mean the concomitant or consecutive (yet, while culturing the cell in the same cell culture or containment) or simultaneous expression of at least two or multiple polynucleotides (nucleic acid molecules, such as genes) in a host cell, cell line or cell culture e.g., at about the same or different amounts or ratios.

As described herein polynucleotides may be co-expressed such that at least one of the polynucleotides is overexpressed.

The term "overexpress" or "overexpression" as used herein shall refer to expression of an expression product, such as a polypeptide or protein, at a level greater than the expression of the same expression product prior to a genetic modification of the host cell or in a comparable host which has not been genetically modified at defined conditions. Helper factors being heterologous to a host cell are always understood to be overexpressed, if such host cell is expressing such helper factors. For example, because a yeast host cell as described herein does not natively express any of said helper factors, heterologous polynucleotides encoding such helper factor proteins are introduced into the host cell for expression; in this case, any detectable expression of such helper factors is encompassed by the term "overexpression."

Specific embodiments refer to co-expression of helper factors along with expressing a GOI. In some embodiments described herein, a vector or nucleic acid sequence may include one or more expression cassettes for co-expressing at least one helper factor molecule and a GOI. The vector or nucleic acid sequence may be constructed to allow for the co-expression of two or more polynucleotides using a multitude of techniques including co-transfection of two or more plasmids, the use of multiple or bidirectional promoters, or the creation of bicistronic or multicistronic vectors.

Specific embodiments refer to genetic modifications to stably co-express at least one, two or three helper factors, e.g., upon introducing the respective expression cassette(s) for stable integration within the host cell genome or chromosome.

The term "variant" or "functional variant" as used herein, means anything other than a native sequence, e.g., derived from or relates to a helper factor or nucleotide sequence or amino acid sequence of a helper factor. Herein described are specific variants of any of the (parent) helper factors hBIP (SEQ ID NO:1), hGrp170 (SEQ ID NO:3), or hERdj3 (SEQ ID NO:5) with a certain sequence identity to the parent sequence. Specific variants of a protein helper factor (with a "parent" sequence) comprise or consist of a protein with an amino acid sequence which is at least 90%, or at least 95% identical to the native (parent) sequence.

Specific variants of a polynucleotide helper factor (with a "parent" sequence) comprise or consist of a polynucleotide or nucleic acid molecule with a nucleotide sequence which is at least any one of 80, 85%, 90, 95, 96, 97, 98, or 99% identical to the native (parent) sequence.

Specific variants of a human protein (a parent protein) which are naturally-occurring in a human being, e.g., which is comprised or expressed in a native or wild-type human cell or human being, are herein also referred to as "human variants". According to a specific embodiment, the variant is an isoform or orthologue of a naturally occurring parent molecule, which orthologue is naturally occurring in a species other than the species which comprises the naturally occurring parent molecule e.g., a mammalian or fungal species.

In some embodiments, the variant of a polynucleotide or nucleic acid molecule comprises a nucleotide sequence which is sequence optimized e.g., for improving nucleic acid stability, increasing translation efficacy in the host cell, reducing the number of truncated proteins expressed, improving the folding or prevent misfolding of the expressed proteins, reducing toxicity of the expressed products, reducing cell death caused by the expressed products, or increasing and/or decreasing protein aggregation. According to a specific embodiment, the variant of a parent nucleotide sequence is a codon-optimized variant of said parent nucleotide sequence to be expressed in a host cell, which is obtainable by one or more genetic modifications of the parent nucleotide sequence for improved expression in the cellular environment of the host cell.

Variants of helper factors as described herein, are considered to be functional variants or considered to be functionally active, if having substantially the same or improved activity of the native (or parent) sequence, in particular to improve the POI production when co-expressed in a host cell.

A functionally active variant of a helper factor can be prepared by mutagenesis of a human native (wild-type) helper factor to produce a variant thereof, expressing the variant in the host cell concomitantly or simultaneously with a heterologous POI encoding gene, and assessing the activity of the variant to improve the host cell productivity to produce a POI.

The activity of a helper factor may be determined as described in Freeman et al (Analysis of molecular chaperone activities using in vitro and in vivo approaches. Methods Mol Biol. New Jersey: Humana Press; 2000; 99: 393-419).

Functional variants of a parent protein include, for instance, proteins wherein one or more amino acid residues are added, or deleted, at the N- or C-terminus, as well as within one or more internal domains. Specific functionally active variant comprise additional amino acids at the N-terminal and/or at the C-terminal end, to prolong a parent sequence, e.g. by less than 100 amino acids, specifically less than 75 amino acids, more specifically less than 50 amino acids, more specifically less than 25 amino acids, or else less than 10 amino acids. Further specific functionally active variants may be fusion proteins, wherein a sequence of the invention is prolonged by additional amino acid residues of another polypeptide or protein.

Specific functional variants are fragments of a parent protein or nucleic acid molecule.

Functional variants which are fragments of a polynucleotide or nucleic acid molecule may range from at least 20 nucleotides, preferably at least 100 nucleotides, up to the full-length nucleotide sequence encoding a helper factor as described herein. Functionally active fragments of a polynucleotide or nucleic acid molecule may comprise at least 50% of the respective nucleotide sequence, preferably at least any of 60, 70, 80 or 90%.

Functional variants which are fragments of a polypeptide or protein may comprise or consist of at least 10 amino acids, specifically at least 25 amino acids, more specifically at least 50 amino acids, more specifically at least 75 amino acids, or at least 100 contiguous amino acids, or up to the total number of amino acids present in a full-length helper factor as described herein.

The term "endogenous" as used herein is meant to include those molecules and sequences, in particular endogenous genes or proteins, which are present in the wild-type (native) host cell, prior to its modification to reduce expression of the respective endogenous genes and/or reduce the production of the endogenous proteins. In particular, an endogenous nucleic acid molecule (e.g., a gene) or protein that does occur in (and can be obtained from) a particular host cell as it is found in nature, is understood to be "host cell endogenous" or "endogenous to the host cell". Moreover, a cell "endogenously expressing" a nucleic acid or protein expresses that nucleic acid or protein as does a host of the same particular type as it is found in nature. Moreover, a host cell "endogenously producing" or that "endogenously produces" a nucleic acid, protein, or other compound produces that nucleic acid, protein, or compound as does a host cell of the same particular type as it is found in nature.

Thus, even if an endogenous protein is no more produced by a host cell, such as in a knockout mutant of the host cell, where the protein encoding gene is inactivated or deleted, the protein is herein still referred to as "endogenous".

The term "heterologous" as used herein with respect to a nucleotide sequence, construct such as an expression cassette, amino acid sequence or protein, refers to a compound which is either foreign to a given host cell, i.e. "exogenous", such as not found in nature in said host cell; or that is naturally found in a given host cell, e.g., is "endogenous", however, in the context of a heterologous construct or integrated in such heterologous construct, e.g., employing a heterologous nucleic acid fused or in conjunction with an endogenous nucleic acid, thereby rendering the construct heterologous. The heterologous nucleotide sequence as found endogenously may also be produced in an unnatural, e.g., greater than expected or greater than naturally found, amount in the cell. The heterologous nucleotide sequence, or a nucleic acid comprising the heterologous nucleotide sequence, possibly differs in sequence from the endogenous nucleotide sequence but encodes the same protein as found endogenously. Specifically, heterologous nucleotide sequences are those not found in the same relationship to a host cell in nature. Any recombinant or artificial nucleotide sequence is understood to be heterologous. An example of a heterologous polynucleotide is a nucleotide sequence not natively associated with a promoter, e.g., to obtain a hybrid promoter, or operably linked to a coding sequence, as described herein. As a result, a hybrid or chimeric polynucleotide may be obtained. A further example of a heterologous compound is a POI encoding polynucleotide operably linked to a transcriptional control element, e.g., a promoter, to which an endogenous, naturally-occurring POI coding sequence is not normally operably linked.

The term "helper factor" as used herein shall refer to the helper factor protein or polynucleotide (a nucleic acid molecule) encoding the helper factor.

Specifically, neither of the first, second and third helper factors described herein is the protein of interest (POI). It is specifically understood that the recombinant host cell described herein comprises an expression system to express the helper factors and additionally express another polynucleotide (different from said first, second and third helper factors), herein referred to as GOI.

The term "helper factor" as used herein particularly refers to a chaperone, a co-chaperone and/or a nucleotide exchange factor. Specifically, the helper factor is understood as an ER helper factor. The term "chaperone" as used herein relates to a polypeptide that assist the folding, unfolding, assembly or disassembly of other polypeptides. A chaperone refers to proteins that are involved in the correct folding or unfolding and transportation of newly translated eukaryotic cytosolic and secretory proteins. the term "co-chaperone" refers to a protein that assists a chaperone in protein folding and other functions.

BiP (binding immunoglobulin protein), also termed GRP78 or HSPAS, is the most central helper factor in the chaperone network of the mammalian ER and binds to most of the proteins that traverse the ER. It is a very ancient and conserved protein and so it is also known in yeast, where it is termed Kar2. It is a HSP70 chaperone (heat shock protein) which binds to hydrophobic patches of newly synthesized proteins and directly shields them from other hydrophobic residues to prevent aggregation. The binding and release of the substrate happens in an ATP dependent manner: If ATP is bound, the chaperone has a low affinity to the unfolded protein. When ATP gets hydrolyzed to ADP by the intrinsic ATPase domain of BiP, the substrate gets bound tightly. The ATPase activity is influenced by so called J-proteins, one group of co-factors of BiP. Nucleotide exchange factors represent the other group of co-factors of BiP. They stimulate the exchange of ADP to ATP and therefore promote the release of the substrate. Besides its function as a classical chaperone, it is also involved in targeting misfolded proteins for proteasomal degradation, it serves as a sensor for ER stress and contributes to the calcium storage in the mammalian ER. Furthermore, BiP plays an important role in translocation of newly synthesized proteins into the lumen of the ER. By interaction with ERdj2 (Sec63), which is part of the translocon pore, it binds to the entering protein and as a molecular ratchet, and it prevents passive backward movements of the polypeptide chain. Besides its function as a classical chaperone in the ER, it can also be found on the surface of cells where it plays important roles in cell signaling, antigen presentation or viral entry.

BiP belongs to the HSP70 family and contains an ATPase domain. The chaperone activity is regulated by ATP-induced allosteric coupling of the nucleotide-binding (NBD) and substrate-binding (SBD) domains. To localize in the ER, human BiP comprises an N-terminal signal sequence, and a C-terminal ER retention sequence.

Human BiP (hBiP) comprises or consists of the amino acid sequence identified as SEQ ID NO:1. The human coding sequence is identified as SEQ ID NO:2.

There are two nucleotide exchange factors (NEFs) in the mammalian ER which trigger the release of bound substrates from BiP by stimulating the exchange of ADP to ATP, SIL1 and GRP170.

According to specific examples described herein, Grp170 is co-overexpressed with BiP as a helper factor.

Grp170 contains a nucleotide-binding domain of the sugar kinase/HSP70/actin superfamily. To localize in the ER, human Grp170 comprises an N-terminal signal sequence, and a C-terminal ER retention sequence.

Human Grp170 (hGrp170) comprises or consists of the amino acid sequence identified as SEQ ID NO:3. The human coding sequence is identified as SEQ ID NO:4.

There are two isoforms (produced by alternative splicing).

GRP170, also termed "hypoxia up-regulated protein 1" (HYOU1) or "150 kDa oxygen-regulated protein" (ORP150), is a NEF of BiP and simultaneously a classical chaperone, which is classified as a large HSP70 protein. GRP170 binds for example directly to immunoglobulin chains and is known to associate with other GRPs. It is conserved among many eukaryotes and can be found from yeast (Lhs1p) to human cells. It is upregulated during various stresses, like hypoxia or perturbation of the calcium homeostasis. GRP170 possesses a "NDEL" (SEQ ID NO:21) ER retention sequence at its C-terminus.

There are at least seven different ERdj proteins (J-domain proteins, JDP) present in the mammalian ER, whereas only five homologues are present in yeast. Their common feature is a J-domain, which consist of 70 amino acids and shows similarity to the *E. coli* DnaJ protein. As mentioned above, ERdjs, also termed HSP40, are co-chaperones of BiP and stimulate its ATPase activity. They have different affinities to BiP, are present in different concentrations and sub-ER localizations. They are expressed in substoichiometric quantities relative to BiP. Due to the fact that there is only one HSP70 in the ER present, BiP/Kar2, which has shown to act in different aspects of protein folding and quality control, J-proteins may be the drivers of functional specificity and are responsible for the fine-tuning of BiP.

According to specific examples described herein, ERdj3 is co-overexpressed with BiP as a helper factor.

ERdj3 is an ER-luminal glycoprotein that forms a homotetramer and contains a conserved J domain that is essential for its interaction with BiP. Via its substrate-binding domain, ERdj3 directly binds to unfolded proteins and transfers them to BiP. To localize in the ER, human ERdj3 comprises an N-terminal signal sequence.

Human ERdj3 (hERdj3) comprises or consists of the amino acid sequence identified as SEQ ID NO:5. The human coding sequence is identified as SEQ ID NO:6.

The term "ERdj3" is herein understood as follows: ERdj3, also termed "DnaJ homolog subfamily B member 11" (DNAJB11), is a ubiquitously expressed and an abundant cofactor for BiP. It can bind directly to unfolded or misfolded proteins and seems to recruit BiP to the client. ERdj3 has been described to interact with the translocon and binds to its substrates directly during their secretion into the ER. It is lacking a "KDEL" (SEQ ID NO:20) retrieval sequence and might be held back in the ER by its interaction with the translocon complex or other ER-resident proteins such as stromal cell-derived factor 2 (SDF2). ERdj3 is transcriptionally upregulated under ER-stress conditions and the highest levels of this HSP40 are found in secretory tissues. Secreted ERdj3 binds misfolded proteins in the extracellular space and inhibits protein aggregation.

Scj1p is the proposed yeast homologue of metazoan ERdj3. According to WO2015158800A1, Scj1 has a detrimental effect on protein secretion in yeast, and underexpression of Scj1 enhances protein secretion.

The term "operably linked" as used herein refers to the association of nucleotide sequences on a single nucleic acid molecule, e.g., a vector, or an expression cassette, in a way such that the function of one or more nucleotide sequences is affected by at least one other nucleotide sequence present on said nucleic acid molecule. By operably linking, a nucleic acid sequence is placed into a functional relationship with another nucleic acid sequence on the same nucleic acid molecule. For example, a promoter is operably linked with a coding sequence of a recombinant gene, when it is capable of effecting the expression of that coding sequence. As a further example, a nucleic acid encoding a signal peptide is operably linked to a nucleic acid sequence encoding a POI, when it is capable of expressing a protein in the secreted form, such as a preform of a mature protein or the mature protein. Specifically, such nucleic acids operably linked to each other may be immediately linked, i.e. without further elements or nucleic acid sequences in between the nucleic acid encoding the signal peptide and the nucleic acid sequence encoding a POI.

A "promoter" sequence is typically understood to be operably linked to a coding sequence, if the promoter controls the transcription of the coding sequence. If a promoter sequence is not natively associated with the coding sequence, its transcription is either not controlled by the promoter in native (wild-type) cells or the sequences are recombined with different contiguous sequences.

A promoter is herein described to initiate, regulate, or otherwise mediate or control the expression of a protein coding polynucleotide (DNA), such as a POI coding DNA.

Promoter DNA and coding DNA may be from the same gene or from different genes, and may be from the same or different organisms.

The strength of a promoter specifically refers to its transcription strength, represented by the efficiency of initiation of transcription occurring at that promoter with high or low frequency. The higher transcription strength, the more frequently transcription will occur at that promoter. Promoter strength is a typical feature of a promoter, because it determines how often a given mRNA sequence is transcribed, effectively giving higher priority for transcription to some genes over others, leading to a higher concentration of the transcript. A gene that codes for a protein that is required in large quantities, for example, typically requires a relatively strong promoter. The RNA polymerase can only perform one transcription task at a time and so must prioritize its work to be efficient. Differences in promoter strength are selected to allow for this prioritization.

The promoter strength may also refer to the frequency of transcription which is commonly understood as the transcription rate, e.g. as determined by the amount of a transcript in a suitable assay, e.g. RT-PCR or Northern blotting. For example, the transcription strength of a promoter described herein is determined in the host cell which is *P. pastoris* and compared to the native pGAP promoter of *P. pastoris*.

The strength of a promoter to express a gene of interest is commonly understood as the expression strength or the capability of supporting a high expression level/rate. For example, the expression and/or transcription strength of a promoter of the invention is determined in the host cell which is *P. pastoris* and compared to the native pGAP promoter of *P. pastoris*. The expression rate may, for example, be determined by the amount of expression of a reporter gene, such as eGFP.

The comparative transcription strength compared to a reference promoter may be determined by standard methods, such as by measuring the quantity of transcripts, e.g. employing a microarray, or else in a cell culture, such as by measuring the quantity of respective gene expression products in recombinant cells. In particular, the transcription rate may be determined by the transcription strength on a microarray, Northern blot or with quantitative real time PCR (qRT-PCR) or with RNA sequencing (RNA-seq).

The term "nucleotide sequence" or "nucleic acid sequence" used herein refers to either DNA or RNA. "Nucleic acid sequence" or "polynucleotide sequence" or simply "polynucleotide" refers to a single or double-stranded polymer of deoxyribonucleotide or ribonucleotide bases read from the 5' to the 3' end. It includes expression cassettes, self-replicating plasmids, infectious polymers of DNA or RNA, and non-functional DNA or RNA.

The term "protein of interest (POI)" as used herein refers to a polypeptide or a protein that is produced by means of recombinant technology in a host cell. More specifically, the protein may either be a polypeptide not naturally occurring in the host cell, i.e. a heterologous protein, or else may be native to the host cell, i.e. a homologous protein to the host cell, but is produced, for example, by transformation or transfection with a self-replicating vector containing the nucleic acid sequence encoding the POI, or upon integration by recombinant techniques of one or more copies of the nucleic acid sequence encoding the POI into the genome of the host cell, or by recombinant modification of one or more regulatory sequences controlling the expression of the gene encoding the POI, e.g., of the promoter sequence. In some cases, the term POI as used herein also refers to any metabolite product by the host cell as mediated by the recombinantly expressed protein.

The term "sequence identity" of a variant, homologue or orthologue as compared to a parent nucleotide or amino acid sequence indicates the degree of identity of two or more sequences. Two or more amino acid sequences may have the same or conserved amino acid residues at a corresponding position, to a certain degree, up to 100%. Two or more nucleotide sequences may have the same or conserved base pairs at a corresponding position, to a certain degree, up to 100%.

Sequence similarity searching is an effective and reliable strategy for identifying homologs with excess (e.g., at least 50%) sequence identity. Sequence similarity search tools frequently used are e.g., BLAST, FASTA, and HMMER.

Sequence similarity searches can identify such homologous proteins or genes by detecting excess similarity, and statistically significant similarity that reflects common ancestry. Homologues may encompass orthologues, which are herein understood as the same protein in different organisms, e.g., variants of such protein in different different organisms or species.

"Percent (%) amino acid sequence identity" with respect to an amino acid sequence, homologs and orthologues described herein is defined as the percentage of amino acid residues in a candidate sequence that are identical with the amino acid residues in the specific polypeptide sequence, after aligning the sequence and introducing gaps, if necessary, to achieve the maximum percent sequence identity, and not considering any conservative substitutions as part of the sequence identity. Those skilled in the art can determine appropriate parameters for measuring alignment, including any algorithms needed to achieve maximal alignment over the full length of the sequences being compared.

For purposes described herein, the sequence identity between two amino acid sequences is determined using the NCBI BLAST program version BLASTP 2.8.1 with the following exemplary parameters: Program: blastp, Word size: 6, Expect value: 10, Hitlist size: 100, Gapcosts: 11.1, Matrix: BLOSUM62, Filter string: F, Compositional adjustment: Conditional compositional score matrix adjustment.

For pairwise protein sequence alignment of two amino acid sequences along their entire length the EMBOSS Needle webserver (https://www.ebi.ac.uk/Tools/psa/emboss_needle/) was used with default settings (Matrix: EBLOSUM62; Gap open:10; Gap extend: 0.5; End Gap Penalty: false; End Gap Open: 10; End Gap Extend: 0.5). EMBOSS Needle uses the Needleman-Wunsch alignment algorithm to find the optimum alignment (including gaps) of the two input sequences and writes their optimal global sequence alignment to file.

"Percent (%) identity" with respect to a nucleotide sequence e.g., of a promoter or a gene, is defined as the percentage of nucleotides in a candidate DNA sequence that is identical with the nucleotides in the DNA sequence, after aligning the sequence and introducing gaps, if necessary, to achieve the maximum percent sequence identity, and not considering any conservative substitutions as part of the sequence identity. Alignment for purposes of determining percent nucleotide sequence identity can be achieved in various ways that are within the skill in the art, for instance, using publicly available computer software. Those skilled in the art can determine appropriate parameters for measuring alignment, including any algorithms needed to achieve maximal alignment over the full length of the sequences being compared.

The term "isolated" or "isolation" as used herein with respect to a POI shall refer to such compound that has been sufficiently separated from the environment with which it would naturally be associated, in particular a cell culture supernatant, so as to exist in "purified" or "substantially pure" form. Yet, "isolated" does not necessarily mean the exclusion of artificial or synthetic mixtures with other compounds or materials, or the presence of impurities that do not interfere with the fundamental activity, and that may be present, for example, due to incomplete purification. Isolated compounds can be further formulated to produce preparations thereof, and still for practical purposes be isolated—for example, a POI can be mixed with pharmaceutically acceptable carriers or excipients when used in diagnosis or therapy.

The term "purified" as used herein shall refer to a preparation comprising at least 50% (mol/mol), preferably at least 60%, 70%, 80%, 90% or 95% of a compound (e.g., a POI). Purity is measured by methods appropriate for the compound (e.g., chromatographic methods, polyacrylamide gel electrophoresis, HPLC analysis, and the like). An isolated, purified POI as described herein may be obtained by purifying the cell culture supernatants to reduce impurities.

As isolation and purification methods for obtaining a recombinant polypeptide or protein product, methods, such as methods utilizing difference in solubility, such as salting out and solvent precipitation, methods utilizing difference in molecular weight, such as ultrafiltration and gel electrophoresis, methods utilizing difference in electric charge, such as ion-exchange chromatography, methods utilizing specific affinity, such as affinity chromatography, methods utilizing difference in hydrophobicity, such as reverse phase high performance liquid chromatography, and methods utilizing difference in isoelectric point, such as isoelectric focusing may be used.

The following standard methods are preferred: cell (debris) separation and wash by Microfiltration or Tangential Flow Filter (TFF) or centrifugation, POI purification by precipitation or heat treatment, POI activation by enzymatic digest, POI purification by chromatography, such as ion exchange (IEX), hydrophobic interaction chromatography (HIC), Affinity chromatography, size exclusion (SEC) or HPLC Chromatography, POI precipitation of concentration and washing by ultrafiltration steps.

A highly purified product is essentially free from contaminating proteins, and preferably has a purity of at least 90%, more preferred at least 95%, or even at least 98%, up to 100%. The purified products may be obtained by purification of the cell culture supernatant or else from cellular debris.

An isolated and purified POI can be identified by conventional methods such as Western blot, HPLC, activity assay, or ELISA.

The term "recombinant" as used herein shall mean "being prepared by or the result of genetic engineering. A "recombinant cell" or "recombinant host cell" is herein understood as a cell or host cell that has been genetically engineered or modified to comprise a nucleic acid sequence which was not native to said cell. A recombinant host may be engineered to delete and/or inactivate one or more nucleotides or nucleotide sequences, and may specifically comprise an expression vector or cloning vector containing a recombinant nucleic acid sequence, in particular employing nucleotide sequence foreign to the host. A recombinant protein is produced by expressing a respective recombinant nucleic acid in a host. The term "recombinant" with respect to a POI as used herein, includes a POI that is prepared, expressed, created or isolated by recombinant means, such as a POI isolated from a host cell transformed or transfected to express the POI. In accordance with the present invention conventional molecular biology, microbiology, and recombinant DNA techniques within the skill of the art may be employed. Such techniques are explained fully in the literature. See, e.g., Maniatis, Fritsch & Sambrook, "Molecular Cloning: A Laboratory Manual, Cold Spring Harbor, (1982).

Certain recombinant host cells are "engineered" host cells which are understood as host cells which have been manipulated using genetic engineering, i.e. by human intervention. When a host cell is engineered to express, co-express or overexpress a given gene or the respective protein, the host cell is manipulated such that the host cell has the capability to express such gene and protein, respectively, to a higher extent compared to the host cell under the same condition prior to manipulation, or compared to the host cells which are not engineered such that said gene or protein is expressed, co-expressed or overexpressed. As herein described, the yield of a protein of interest (POI) can be increased by co-expressing or overexpressing the helper factors described herein, when compared to the same cell expressing the same POI under the same culturing conditions, however, without the polynucleotides encoding the helper factors being co-expressed or overexpressed or without being engineered to co-express or overexpress the polynucleotide encoding the helper factors.

The foregoing description will be more fully understood with reference to the following examples. Such examples are, however, merely representative of methods of practicing one or more embodiments of the present invention and should not be read as limiting the scope of invention.

EXAMPLES

Example 1: Generation of Strains

For all the experiments, either the Puzzle vectors (pPuzzle; (Stadlmayr et al. 2010. J Biotechnol. 150(4):519-29) or the GoldenPiCs vectors were used. These vectors are composed of an origin for replication for *E. coli*, a resistance marker cassette which can be used for *P. pastoris* and *E. coli*, an expression cassette for the gene of interest (GOI) and a sequence which allows the integration of the plasmid into the genome of *P. pastoris*. There are several versions of pPuzzle available which differ in the resistance marker cassette, the promoter for the GOI, the presence of loxP sites (recognition sites for Cre recombinase), the presence of an MreI cleavage site which is used for the cloning of vectors with two expression cassettes for two different GOIs. GoldenPiCS vectors are described in Prielhofer et al. (2017. BMC Syst Biol. 11(1):123.)

1.1 Generation of Fab Secreting *P. pastoris:*

For expression of antibody Fab fragments, both the light chain (LC, vL and cL) and the heavy chain Fd fragment (HC, vH and cH1 until the amino acids CDK) were expressed under the control of the PG1 promoter (described in WO2013050551A1) and secretion was mediated through the EpxLA signal sequence (described in WO2014067926 A1). The expression cassettes for both chains (each having its own promoter and terminator) were combined on one vector prior to transformation into the *P. pastoris* genome. Therefore, the antibody LC and the HC coding sequences (codon-optimized according to the *P. pastoris* CUT (source: GeneArt, Germany) and fused to the leader sequence) were each cloned into the pPUZZLE vector pPM2dZ30_pG1 (described in WO2013050551 A1) via SbfI and SfiI. Subsequently, the expression cassette for the HC was excised (ApaI, AgeI) and ligated into the construct with the LC expression cassette (cut with ApaI and MreI), or vice versa. Linearization of the vector containing both LC and HC expression cassettes was performed with AscI to target the vector to the AOXTT locus, prior to electroporation (using a standard transformation protocol as described in Gasser et al. 2013. Future Microbiol. 8(2):191-208) into *P. pastoris*. Selection of positive transformants was performed on YPD plates (per liter: 10 g yeast extract, 20 g peptone, 20 g glucose, 20 g agar-agar) containing 25-100 µg/mL of Zeocin. After small scale screening of Fab expression, the strains HyHEL_rev #1 (25 Zeo) and H28K2 #2 (100 Zeo) was chosen for helper factor co-expression.

The HC and LC amino acid sequences of the exemplary Fab designated as H28K2 are identified as SEQ ID NO:48 and SEQ ID NO:49, respectively.

The HC and LC amino acid sequences of the exemplary Fab designated as HyHEL are identified as SEQ ID NO:50 and SEQ ID NO:51, respectively.

1.2 Generation of Strains Overexpressing Human Helper Factors

All human chaperones were initially expressed under the PGAP promoter and for the targeting to the ER, either their native human signal sequence or the yeast Kar2 signal sequence (*S. cerevisiae* Kar2-leader: amino acid sequence, SEQ ID NO:17; nucleotide sequence, SEQ ID NO:18) was used. In case of the native sequence, proteins will be termed with n_ and in case of the yeast Kar2 signal sequence K_. The coding sequences for the human chaperones were codon optimized after the CUT from Bai et al. (PLoS One. 2011; 6(8):e22577) and synthesized by GeneArt™, including their native signal sequence or synthesized directly fused to the yeast Kar2 signal sequence.

The chaperones were cut out (SbfI and SfiI) from the vector obtained from GeneArt (Germany) and ligated into the vector pPM2aK21_pGAP. To assemble the chaperones with the yeast Kar2 signal sequence, the 3' end of the Kar2 signal sequence was introduced by PCR with specific primers (see below). These PCR fragments were cut with SspI and SfiI and ligated into pPM1eH21_pGap_Kar2ss (Delic et al. FEMS Microbiol Lett 2010, 306(1):61-66), which already contained the yeast Kar2 signal sequence.

The pPM2aK21 vectors were linearized with AvrII for incorporation into the PGAP promoter and the pPM1eH21 constructs were cut with SmaI and targeted to the 5"-ENO1 locus.

Primers:

| name | sequence |
|---|---|
| Kar2\|_ERdj3_fw | TACTAATATTACCTTTACAGAATTCTTTCCACTCCTCCAATGTTTTAGTTAGAGGTGCCGATGATGGTAGAGACTTCTACAAGATCTTG (SEQ ID NO: 52) |

For their combined overexpression, the coding sequences of n_hBiP, K_hGrp170 and K_hERdj3 were introduced into BB1 of the GoldenPiCS system. The overexpression of hBiP in combination with hGRP170 and hERdj3 was assembled in the integration plasmid BB33eH, which derives from three BB2s; the first containing hBiP with the GAP promoter and the RPS3TT transcription terminator, the second BB2 containing K_hGrp170 with the PORI promoter and the IDP1TT transcription terminator and the third BB2 containing K_hERdj3 with the MDH3 promoter and the RPS25ATT transcription terminator.

The best clones in terms of yield (titer per biomass) determined in small scale screenings (Example 2) were chosen after transformation with the respective plasmid of Example 1.1 and further transformed with the respective SmaI linearized BB33eH integration plasmid mentioned above.

Example 2. Cultivation & Analyses 2.1 Small Scale Screening of *P. pastoris* with Expression Under $P_{G1}$ Promoter All screening experiments were done in 24-well plates. For the preculture, 0.5-2 mL YPG medium containing all necessary antibiotics (25 µg/mL (for HyHEL Fab) or 100 µg/mL (for all other POIs) Zeocin and 200 µg/mL Hygromycin and/or 500 µg/mL G418) were inoculated with a single colony of a clone. The preculture was incubated for 12-24 h at 25° C. and 280 rpm. Afterwards, the $OD_{600}$ was measured and the main culture was inoculated to an $OD_{600}$ of 1. For the main culture, 2 mL BM medium without C-source were used. For buffering either Na-Phosphate (pH 5.3) or K-Phosphate buffer (pH 6) was used. After the inoculation, a glucose FeedBead (glucose releasing polymer disk, Kuhner, C H) with a diameter of 6 mm was added as carbon source. After 24 h of main culture, a second FeedBead was added. After 48 h, cells were harvested by centrifugation. Biomass was determined by measuring the weight of the cell pellet derived from 1 mL cell suspension. The supernatant was used for quantification of Fab or scFv, respectively.

In some cases, a higher biomass and a higher product titer was desired. Therefore, the main culture was inoculated to an $OD_{600}$ of 4. The according amount of pre-culture was spun down, the supernatant was discarded and the pellet was resuspended in a smaller amount of medium. Instead of 6 mm feed beads, larger ones with a diameter of 12 mm were added.

2.2 Small Scale Screening of *P. pastoris* with Expression Under $P_{AOX1}$ Promoter For the pre-culture 2 mL selective YPD medium in 24-well plates were inoculated with cells from a master plate and incubated at 25° C. for ~22 h at 280 rpm. The $OD_{600}$ was measured and 2 mL M2D medium were inoculated with a starting $OD_{600}$ of 2. Additionally one glucose feed bead (12 mm diameter) per well was added and the plates were incubated at 25° C. for ~22 h at 280 rpm. For induction, 1 mL culture was transferred into a sterile tube and centrifuged at 13000 rpm for 1 min at RT. The pellet was resuspended in 1 mL M2 medium without additional C-source. The $OD_{600}$ was measured and 2 mL M2 medium without additional C-source were inoculated with a starting $OD_{600}$ of 4. 10 µL (0.5%) pure methanol were added and plates were incubated at 25° C. at 280 rpm. After ~6 hours 20 µL (1.0%) pure methanol were added and the next day, 20 µL (1.0%) methanol were added twice, 1× in the morning and 1× in the evening. After 2 days of induced culture, 1 mL of culture was transferred into a weighed Eppendorf tube and centrifuged at 13000 rpm for 5 min. The supernatant was transferred into fresh Eppendorf tubes and the wet cell weight of the pellet was determined.

Synthetic screening medium M2 contained per liter: 22.0 g Citric acid monohydrate 3.15 g $(NH_4)_2PO_4$, 0.49 g $MgSO_4*7H_2O$, 0.80 g KCl, 0.0268 g $CaCl_2*H_2O$, 1.47 mL PTM1 trace metals, 4 mg Biotin; pH was set to 5 with KOH (solid).

2.3 Bioreactor Cultivation of *P. pastoris*

100 mL of YPD medium containing all the necessary antibiotics was inoculated with one vial of a *P. pastoris* cryo stock. After 24 h of incubation at 25° C. and 180 rpm, this preculture was used to inoculate 300 mL of Gly01 batch medium to reach an initial $OD_{600}$ of 1 in the bioreactor. The fed-batch cultivations were carried out in 1 L working volume bioreactors (Dasgip) with a computer-based process control. The temperature was kept at 25° C., the pH was controlled with 25% ammonia at 5.0 and the dissolved oxygen concentration was maintained above 20% by controlling the stirrer speed and the airflow.

When the glycerol in the batch medium was completely consumed, the glucose fed batch with a constant feed rate of 2 g/h Glu01 fed-batch medium was started. The feed was maintained for 100 h and samples were taken in regular intervals. 2 mL of cell suspension were collected in pre-weighted Eppendorf tubes (3 replicates for each reactor at a sample point) and centrifuged for 5 min at full speed. The supernatant was collected (and stored at −20° C. for further analysis) and the pellet was washed in 1 mL of $ddH_2O$. After removing the water, the pellets were kept in a dryer at 100° C. for several days. The Eppendorf tubes were weight again and the dry cell weight was calculated.

2.4 SDS-PAGE & Western Blot Analysis

For protein gel analysis the NuPAGE® Novex® Bis-Tris system was used, using 12% Bis-Tris gels with MOPS running buffer or 4-12% Bis-Tris gels with MES running buffer (all from Invitrogen). After electrophoresis, the proteins were either visualized by Coomassie (PageBlue™ Protein Staining Solution) or silver staining or transferred to a nitrocellulose membrane for Western blot analysis. Therefore, the proteins were electroblotted onto a nitrocellulose membrane using the XCell II™ Blot Module for wet (tank) transfer (Invitrogen) according to the manufacturer's instructions or using the Biorad Trans-Blot® Turbo™ Transfer System with ready-to-use membranes and filter papers and the program Turbo for minigels (7 min). After blocking, the Western Blots were probed with the following antibodies: For Fab light chain: anti-human kappa light chains (bound and free)-alkaline phosphatase (AP) conjugated antibody, Sigma A3813 (1:5,000); For Fab heavy chain: Mouse Anti-Human IgG antibody (Ab7497, Abcam) diluted 1:1,000 and Anti-Mouse IgG (Fc specific)—Alkaline Phosphatase antibody produced in goat (A1418, Sigma) as secondary antibody diluted 1:5,000. For total Fab: Anti-human IgG (Fab specific)-AP antibody (A8542, Sigma). For BiP: mouse HSPAS polyclonal Antibody (abnova, H00003301-A01, 1:1000). For Grp170: rabbit Anti-ORP150 Polyclonal Antibody (Bioss, Bs-4248R, 1:1000). For ERdj3: rabbit anti-DNAJB11 Antibody (Assay bio Tech, C15492, 1:1000). Anti-Mouse IgG (Fc specific)-Alkaline Phosphatase antibody (A1418, Sigma) or Anti-Rabbit IgG (whole molecule)-Alkaline Phosphatase (A8025, Sigma) were used as secondary antibodies.

Detection was performed with the colorimetric AP detection kit (BioRad) based on the NBT/BCIP system for AP-conjugates, or the chemoluminescent Super Signal West Chemiluminescent Substrate (Thermo Scientific) for HRP-conjugates.

2.5 Quantification of Fab by ELISA

Quantification of intact Fab by ELISA was done using anti-human IgG antibody (ab7497, Abcam) as coating antibody and a goat anti-human IgG (Fab specific)-alkaline phosphatase conjugated antibody (Sigma A8542) as detection antibody. Human Fab/Kappa, IgG fragment (Bethyl P80-115) was used as standard with a starting concentration of 100 ng/mL, supernatant samples are diluted accordingly. Detection was done with pNPP (Sigma S0942). Coating-, Dilution- and Washing buffer were based on PBS (2 mM $KH_2PO_4$, 10 mM $Na_2HPO_4.2H_2O$, 2.7 mM g KCl, 8 mM NaCl, pH 7.4) and completed with BSA (1% (w/v)) and/or Tween20 (0.1% (v/v)) accordingly.

Example 3: Impact of Single Helper Factor Overexpression on Protein Secretion 3.1. Impact of BiP Overexpression The strain H28K2 #2 (100 Zeo) was transformed with pPM1e_H_1_pGap_n_BiP. To verify the correct overexpression of human BiP in *P. pastoris*, a total protein preparation was performed of cells from screening pellets. Western Blot and immunostaining with anti-BiP antibody showed a strong band of around 80 kDa in all analysed transformants, which very likely represented BiP. BiP was also found in the supernatant of the clones, indicating that in addition to being present in the ER, BiP also gets secreted. All of the clones were cultivated in duplicates in three individual small-scale screenings and the supernatants were analyzed by Fab ELISA. Table 1 shows that there was no significant effect on Fab titer and yield by BiP overexpression in comparison to the non-engineered control H28K2 #2.

TABLE 1

Effect of BiP overexpression on recombinant protein secretion in *P. pastoris*. Fold changes (FC) of titer and yield are given, the statistical significance was determined by a Student's t-test.

| POI | OE | | Titer FC ± SD | p-value (t-test) | Yield FC ± SD | p-value (t-test) |
|---|---|---|---|---|---|---|
| H28K2 Fab | n_BiP | Screening 1 | 1.08 ± 0.14 | 0.1429 | 1.08 ± 0.14 | 0.1429 |
| H28K2 Fab | n_BiP | Screening 2 | 1.05 ± 0.12 | 0.3575 | 1.05 ± 0.22 | 0.5079 |
| H28K2 Fab | n_BiP | Screening 3 | 1.00 ± 0.11 | 0.9887 | 0.82 ± 0.20 | 0.1766 |

3.2 Effect of Grp170 Overexpression

The strain H28K2 #2 (100 Zeo) was transformed with pPM2a_K21_pGap_K_GRP170. Eleven clones overexpressing human GRP170 in *P. pastoris* were cultivated in small scale screenings and the supernatants were analyzed in a Fab ELISA, three clones thereof were then re-cultivated (screening 2). As can be seen in Table 2, GRP170 overexpression reduces the average Fab titer and yield by around 20% compared to the non-engineered control.

TABLE 2

Effect of GRP170 overexpression on recombinant protein secretion in *P. pastoris*. Fold changes (FC) of titer and yield are given, the statistical significance was determined by a Student's t-test.

| POI | OE | | Titer FC ± SD | p-value (t-test) | Yield FC ± SD | p-value (t-test) |
|---|---|---|---|---|---|---|
| H28K2 Fab | K_Grp170 | Screening 1 | 0.88 ± 0.18 | 0.0899 | 0.85 ± 0.17 | 0.0589 |
| H28K2 Fab | K_Grp170 | Screening 2 | 0.80 ± 0.26 | 0.2380 | 0.63 ± 0.22 | 0.0248 |

3.3 Effect of ERdj3 Overexpression

The strain HyHEL_rev #1 (25 Zeo) was transformed with pPM2a_K21_pGap_n_ERdj3 or pPM1e_H_1_pGap_K_ERdj3. To verify the correct overexpression of human ERdj3 in *P. pastoris*, a total protein preparation was performed of cells from screening pellets. Western Blot and immunostaining with anti-ERdj3 antibody showed a strong band around 40 kDa in all tested clones, which was not present in the EVC (empty vector control) and very likely represents ERdj3. Furthermore, the supernatants of two clones from a screening were analyzed in an anti-ERdj3 Western Blot. In one of the samples overexpressing n_ERdj3, a distinct band of around 120 kDa was seen, indicating that ERdj3 got secreted to the supernatant instead of or in addition to being retained in its intended cellular localization, the ER.

Four clones each were analyzed in small scale screenings with subsequent Fab ELISA. As can be seen in Table 3, ERdj3 overexpression had a clearly negative impact on Fab secretion. All ERdj3 overexpressing clones have Fab titers and yields that are below the average titer and yield of the EVC. On average, Fab titers and yields are decreased by more than 30% by ERdj3 overexpression compared to the non-engineered control (statistically significant difference with p-values of 0.01 and 0.005, respectively).

TABLE 3

Effect of ERdj3 overexpression on recombinant protein secretion in *P. pastoris*. Fold changes (FC) of titer and yield are given, the statistical significance was determined by a Student's t-test.

| POI | OE | | Titer FC ± SD | p-value (t-test) | Yield FC ± SD | p-value (t-test) |
|---|---|---|---|---|---|---|
| HyHEL Fab | n_ERdj3 | Screening 1 | 0.84 ± 0.25 | 0.3007 | 0.80 ± 0.27 | 0.2357 |
| HyHEL Fab | K_ERdj3 | Screening 2 | 0.61 ± 0.23 | 0.0123 | 0.53 ± 0.25 | 0.0064 |

Example 4: Combined Overexpression of Helper Factors

The individual overexpression of the human chaperones did not lead to any positive effects on recombinant protein secretion. Also, secretion of at least BiP and ERdj3 in addition to their localization in the ER was observed, which is detrimental for the cells and the purity of the recombinant protein product.

However, combined expression of the helper factors surprisingly improved pretein secretion, as further shown herein.

4.1 Combined Overexpression of BiP and Grp170

In a first set of experiments, BiP and GRP170 were overexpressed simultaneously in a H28K2 Fab strain. The strain H28K2_n_BiP #5 was transformed with pPM2a_K21_pGap_K_GRP170. Eleven transformants were analyzed in small scale screenings with subsequent Fab ELISA. The results shown in Table 4 revealed that Fab titers and yields are similar for clones overexpressing BiP and GRP170 simultaneously, compared to the control clones which are only overexpressing BiP (screening 1). Also compared to the non-engineered parental strain H28K2 #2 (screening 2), the combined overexpression of BiP and GRP170 showed no statistically significant effect. Thus, the combination of BiP and GRP170 rescues the statistically significant negative effect of sole GRP170 overexpression (Table 2).

TABLE 4

Effect of combined overexpression of BiP and GRP170 on recombinant protein secretion in *P. pastoris*. Fold changes (FC) of titer and yield are given, the statistical significance was determined by a Student's t-test.

| POI | OE | | Titer FC ± SD | p-value (t-test) | Yield FC ± SD | p-value (t-test) |
|---|---|---|---|---|---|---|
| H28K2 Fab | BiP + GRP170 | Screening 1* | 1.03 ± 0.11 | 0.6579 | 1.04 ± 0.17 | 0.6267 |
| H28K2 Fab | BiP + GRP170 | Screening 2 | 0.95 ± 0.13 | 0.5515 | 0.88 ± 0.11 | 0.1128 |

*In screening 1 FC are compared to H28K2 + BiP, in screening 2 FC are compared to the non-engineered H28K2 parent.

4.2 Simultaneous Overexpression of BiP and Grp170 and ERdj3

A vector for simultaneous over-expression of BiP, GRP170 and ERdj3 was made and used for transformation. H28K2 #2 (100 Zeo) was transformed with BB33, which was constructed by Golden Gate cloning and contained expression cassettes for n_BiP, K_GRP170 and K_ERdj3. 16 transformants were analyzed in duplicates in small scale screenings with subsequent Fab ELISA. Table 5 shows that overexpression of the triplet combination increased the Fab titer and yield on average by 1.4-fold compared to the non-engineered parental strain. The titer and yield were increased up to 2-fold and 1.7-fold for the best strains in both screenings.

TABLE 5

Effect of simultaneous overexpression of BiP, GRP170 and ERdj3 on recombinant protein secretion in *P. pastoris*. Fold changes (FC) of titer and yield are given, the statistical significance was determined by a Student's t-test.

| POI | OE | | Titer FC ± SD | p-value (t-test) | Yield FC ± SD | p-value (t-test) |
|---|---|---|---|---|---|---|
| H28K2 Fab | BB33 (BiP + GRP170 + ERdj3) | Screening 1 | 1.44 ± 0.25 | 0.0002 | 1.36 ± 0.21 | 0.0025 |
| H28K2 Fab | BB33 (BiP + GRP170 + ERdj3) | Screening 2 | 1.40 ± 0.19 | 0.0000 | 1.26 ± 0.22 | 0.0112 |

CONCLUSIONS

The overexpression of BiP did not have any effect on recombinant protein secretion in *P. pastoris*, whereas the overexpression of only one of GRP170 or ERdj3 had a negative impact on Fab secretion (Example 3). The overexpression of BiP together with its NEF did not lead to a further improvement of Fab secretion compared to a strain which only overexpresses BiP (Example 4.1). When expressed together with BiP, GRP170 did not have a detrimental effect on Fab secretion (Example 3.2). The experiments in Example 4.2 clearly show, that the triple expression of human chaperones GRP170, NEF and ERdj led to a stable secretion promoting effect. This indicates that individual human chaperone might not be able to act together with others from yeast, or that overexpressing only one of the three factors might lead to an imbalanced stoichiometry, which would explain negative effects of overexpressing only one of the factors.

The invention claimed is:

1. A method for producing a protein of interest (POI) in a yeast host cell that is modified to comprise one or more expression cassettes comprising heterologous nucleic acid molecules encoding helper factors and a gene of interest (GOI) encoding the POI, wherein:

a) a first helper factor comprises at least 90% sequence identity to SEQ ID NO:1;

b) a second helper factor comprises at least 90% sequence identity to SEQ ID NO:3; and c) a third helper factor comprises at least 90% sequence identity to SEQ ID NO:5;

which method comprises (i) culturing said yeast host cell in a culture medium under conditions to co-express said heterologous nucleic acid molecules and to secrete said POI into said yeast host cell culture; and (ii) recovering the POI from said yeast host cell culture.

2. The method of claim 1, wherein each of said helper factors is expressed employing an N-terminal secretion signal sequence.

3. The method of claim 1, wherein each of said first and second helper factors comprises a C-terminal endoplasmic reticulum (ER) retention sequence, which is functional in said yeast host cell.

4. The method of claim 1, wherein said first helper factor comprises or consists of human Binding immunoglobulin Protein (hBiP) comprising the amino acid sequence SEQ ID NO: 1 or a variant thereof which is naturally-occurring in a human being.

5. The method of claim 1, wherein said second helper factor comprises or consists of human Grp170 nucleotide exchange factor (hGrp170) comprising the amino acid sequence SEQ ID NO:3 or a variant thereof which is naturally-occurring in a human being.

6. The method of claim 1, wherein said third helper factor comprises or consists of human ERdj3 (hERdj3) comprising the amino acid sequence SEQ ID NO: 5 or a variant thereof which is naturally-occurring in a human being.

7. The method of claim 1, wherein said first helper factor is encoded by SEQ ID NO:2, or a codon-optimized variant of SEQ ID NO:2 that is optimized for expressing said first helper factor in said yeast host cell.

8. The method of claim 1, wherein said second helper factor is encoded by SEQ ID NO:4, or a codon-optimized variant of SEQ ID NO:4 that is optimized for expressing said second helper factor in said yeast host cell.

9. The method of claim 1, wherein said third helper factor is encoded by SEQ ID NO:6, or a codon-optimized variant of SEQ ID NO:6 that is optimized for expressing said third helper factor in said yeast host cell.

10. The method of claim 1, wherein said yeast host cell is modified to co-express said nucleic acid molecules encoding the helper factors at a level that increases the level of said yeast host cell's specific productivity for said POI (ug/g yeast dry mass (YDM) per hour) and/or volumetric productivity for said POI (ug/L per hour) compared to a comparable yeast host cell prior to or without such modification to co-express said nucleic acid molecules.

11. The method of claim 1, wherein the POI is a therapeutic or diagnostic product.

12. The method of claim 1, wherein said yeast host cell is a yeast cell of a genus selected from the group consisting of *Pichia, Hansenula, Komagataella, Saccharomyces, Kluyveromyces, Candida, Ogataea, Yarrowia*, and *Geotrichum.*

13. The method of claim 11, wherein the therapeutic or diagnostic product is a peptide or protein selected from the group consisting of an antigen-binding protein, a therapeutic protein, an enzyme, a peptide, a protein antibiotic, a toxin fusion protein, a carbohydrate-protein conjugate, a structural protein, a regulatory protein, a vaccine antigen, a growth factor, a hormone, a cytokine, a process enzyme, and a metabolic enzyme.

14. The method of claim 12, wherein said yeast host cell is a yeast cell of a species selected from the group consisting of *Pichia pastoris, Komagataella phaffii, Komagataella pastoris, Komagataella pseudopastoris, Saccharomyces cerevisiae, Ogataea minuta, Kluyveromces lactis, Kluyveromes marxianus, Yarrowia lipolytica* and *Hansenula polymorpha.*

15. A method of increasing the yield of a protein of interest (POI) produced by a host cell expressing a gene of interest (GOI) encoding said POI, by co-expressing heterologous nucleic acid molecules in a cell culture, that encode a) a first helper factor comprising at least 90% sequence identity to SEQ ID NO:1;

b) a second helper factor comprising at least 90% sequence identity to SEQ ID NO:3; and c) a third helper factor comprising at least 90% sequence identity to SEQ ID NO:5;

wherein said increase in the yield of the POI produced by said host cell is compared to a comparable yeast host cell prior to or without such co-expressing.

16. A method for producing a protein of interest (POI) in a yeast host cell, comprising the steps:

(i) genetically engineering said yeast host cell to comprise within one or more expression cassettes comprising heterologous nucleic acid molecules encoding helper factors and a gene of interest (GOI) encoding the POI, wherein:

a) a first helper factor comprises at least 90% sequence identity to SEQ ID NO:1;

b) a second helper factor comprises at least 90% sequence identity to SEQ ID NO:3; and c) a third helper factor comprises at least 90% sequence identity to SEQ ID NO:5;

(ii) culturing said yeast host cell in a culture medium under conditions to co-express said heterologous nucleic acid molecules; and (iii) recovering the POI from said yeast host cell or culture medium.

17. A polypeptide expression system comprising one or more expression cassettes comprising heterologous nucleic acid molecules that encode:

a) a first helper factor comprising at least 90% sequence identity to SEQ ID NO:1;

b) a second helper factor comprising at least 90% sequence identity to SEQ ID NO:3; and c) a third helper factor comprising at least 90% sequence identity to SEQ ID NO:5, wherein said one or more expression cassettes comprise one or more expression control sequences operably linked to said heterologous nucleic acid molecules, wherein the expression system comprises an expression cassette comprising a GOI and a heterologous promoter that controls expression of said GOI.

18. The expression system of claim 17, wherein each of the encoding heterologous nucleic acid molecules is fused at the 5'-end to a nucleotide sequence encoding a heterologous secretion signal sequence.

19. A yeast host cell comprising the expression system of claim 17.

20. The yeast host cell of claim 19, which is of a genus selected from the group consisting of *Pichia, Hansenula, Komagataella, Saccharomyces, Kluyveromyces, Candida, Ogataea, Yarrowia*, and *Geotrichum.*

21. The yeast host cell of claim 20, wherein said yeast host cell is a yeast cell of a species selected from the group consisting of *Pichia pastoris, Komagataella phaffii, Komagataella pastoris, Komagataella pseudopastoris, Saccharomyces cerevisiae, Ogataea minuta, Kluyveromces lactis, Kluyveromes marxianus, Yarrowia lipolytica* and *Hansenula polymorph.*

22. A method for producing a protein of interest (POI) encoded by a gene of interest (GOI) by culturing the host cell of claim 19 under conditions to produce said POI.

* * * * *